(12) United States Patent
Bono et al.

(10) Patent No.: US 8,566,371 B1
(45) Date of Patent: Oct. 22, 2013

(54) RECLAIMING STORAGE FROM A FILE SYSTEM IN A FILE SERVER

(75) Inventors: Jean-Pierre Bono, Westboro, MA (US); John M. Hayden, Holliston, MA (US); Sairam Veeraswamy, Westborough, MA (US); Sachin Mullick, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 36 days.

(21) Appl. No.: 13/210,334

(22) Filed: Aug. 15, 2011

Related U.S. Application Data

(62) Division of application No. 11/772,138, filed on Jun. 30, 2007, now Pat. No. 8,285,758.

(51) Int. Cl.
*G06F 17/30* (2006.01)

(52) U.S. Cl.
USPC .......................................... 707/822

(58) Field of Classification Search
USPC .......................................... 707/822
See application file for complete search history.

(56) References Cited

U.S. PATENT DOCUMENTS

| | | | |
|---|---|---|---|
| 5,715,221 A | 2/1998 | Ito et al. | |
| 5,893,140 A | 4/1999 | Vahalia et al. | |
| 6,324,581 B1 | 11/2001 | Xu et al. | |
| 6,356,915 B1 | 3/2002 | Chtchetkine et al. | |
| 6,434,681 B1 | 8/2002 | Armangau | |
| 6,571,261 B1 | 5/2003 | Wang-Knop et al. | |
| 6,574,705 B1 | 6/2003 | Peloquin et al. | |
| 6,883,063 B2 | 4/2005 | Blumenau et al. | |
| 7,328,307 B2 | 2/2008 | Hoogterp | |
| 7,415,506 B2 | 8/2008 | Gajjar et al. | |
| 7,555,504 B2 | 6/2009 | Bixby et al. | |
| 7,631,155 B1 | 12/2009 | Bono et al. | |
| 7,653,832 B2 | 1/2010 | Faibish et al. | |
| 7,680,987 B1 | 3/2010 | Clark et al. | |
| 7,694,191 B1 | 4/2010 | Bono et al. | |
| 7,818,535 B1 | 10/2010 | Bono et al. | |
| 7,822,927 B1 | 10/2010 | Scheer | |
| 7,870,356 B1 | 1/2011 | Veeraswamy et al. | |
| 7,882,386 B1 | 2/2011 | Potnis et al. | |
| 8,037,345 B1 * | 10/2011 | Iyer et al. | 714/6.12 |
| 2002/0002661 A1 | 1/2002 | Blumenau et al. | |

(Continued)

OTHER PUBLICATIONS

Uresh Vahalia, Unix Internals: The New Frontiers, 1996, p. 187-290, 338-371, Prentice-Hall, Inc., Upper Saddle River, New Jersey.

*Primary Examiner* — Khanh Pham
*Assistant Examiner* — Johnese Johnson
(74) *Attorney, Agent, or Firm* — Richard Auchterlonie; Novak Druce Connolly Bove + Quigg LLP

(57) ABSTRACT

A file server provides access to a file system built on a logical volume of data storage. The file system includes multiple cylinder groups of file system blocks, and the logical volume includes slices of the cylinder groups. The file server has a storage reorganizer for identifying allocated file system blocks in a selected slice, and evacuating the identified allocated file system blocks from the selected slice. The selected slice is evacuated by reverse mapping each identified allocated block to identify a file to which the identified allocated block is allocated, allocating a new block in another slice, copying data from the identified allocated block to the new block, and substituting the new block for the identified allocated block in the file.

20 Claims, 57 Drawing Sheets

(56) References Cited

U.S. PATENT DOCUMENTS

| | | |
|---|---|---|
| 2004/0059822 A1 | 3/2004 | Jiang et al. |
| 2005/0044162 A1 | 2/2005 | Liang et al. |
| 2005/0065986 A1 | 3/2005 | Bixby et al. |
| 2005/0066095 A1 | 3/2005 | Mullick et al. |
| 2005/0193245 A1 | 9/2005 | Hayden et al. |
| 2006/0174075 A1 | 8/2006 | Sutoh |
| 2006/0206603 A1 | 9/2006 | Rajan et al. |
| 2006/0212746 A1 | 9/2006 | Amegadzie et al. |
| 2006/0288026 A1 | 12/2006 | Zayas et al. |
| 2007/0067256 A1 | 3/2007 | Zayas et al. |
| 2007/0159897 A1 | 7/2007 | Wang |
| 2007/0260830 A1 | 11/2007 | Faibish et al. |
| 2007/0260842 A1 | 11/2007 | Faibish et al. |
| 2008/0005468 A1 | 1/2008 | Faibish et al. |

* cited by examiner

RECLAIMING STORAGE FROM A FILE SYSTEM IN A FILE SERVER

RELATED APPLICATIONS

The present application is a divisional of U.S. patent application Ser. No. 11/772,138 filed Jun. 30, 2007 by Jean-Pierre Bono, et al., entitled "Tiering Storage Between Multiple Classes of Storage on the Same Container File System," which is incorporated herein by reference, and which issued on Oct. 9, 2012 as U.S. Pat. No. 8,285,758.

FIELD OF THE INVENTION

The present invention relates generally to file servers, and more particularly to a data structure hierarchy and layered programming for a network file server providing protocols for client access to file systems and for client access to network attached storage.

BACKGROUND OF THE INVENTION

Network data storage is most economically provided by an array of low-cost disk drives integrated with a large semiconductor cache memory. A number of data mover computers are used to interface the cached disk array to the network. The data mover computers perform file locking management and mapping of the network files to logical block addresses of storage in the cached disk array, and move data between network clients and the storage in the cached disk array. See, for example, Vahalia et al. U.S. Pat. No. 5,893,140 issued Apr. 6, 1999, entitled "File Server Having a File System Cache and Protocol for Truly Safe Asynchronous Writes," incorporated herein by reference.

Typically the logical block addresses of storage are subdivided into logical volumes. Each logical volume is mapped to the physical storage using a respective striping and redundancy scheme. The data mover computers typically use the Network File System (NFS) protocol to receive file access commands from clients using the UNIX (Trademark) operating system or the LINUX (Trademark) operating system, and the data mover computers use the Common Internet File System (CIFS) protocol to receive file access commands from clients using the MicroSoft (MS) WINDOWS (Trademark) operating system. The NFS protocol is described in "NFS: Network File System Protocol Specification," Network Working Group, Request for Comments: 1094, Sun Microsystems, Inc., Santa Clara, Calif., March 1989, 27 pages, and in S. Shepler et al., "Network File System (NFS) Version 4 Protocol," Network Working Group, Request for Comments: 3530, The Internet Society, Reston, Va., April 2003, 262 pages. The CIFS protocol is described in Paul J. Leach and Dilip C. Naik, "A Common Internet File System (CIFS/1.0) Protocol," Network Working Group, Internet Engineering Task Force, The Internet Society, Reston, Va., Dec. 19, 1997, 121 pages.

The data mover computers may also be programmed to provide clients with network block services in accordance with the Internet Small Computer Systems Interface (iSCSI) protocol, also known as SCSI over IP. The iSCSI protocol is described in J. Satran et al., "Internet Small Computer Systems Interface (iSCSI)," Network Working Group, Request for Comments: 3720, The Internet Society, Reston, Va., April 2004, 240 pages. The data mover computers use a network block services protocol in a configuration process in order to export to the clients logical volumes of network attached storage, which become local pseudo-disk instances. See, for example, Jiang et al., Patent Application Publication US 2004/0059822 A1 published Mar. 25, 2004, entitled "Network Block Services for Client Access of Network-Attached Storage in an IP Network," incorporated herein by reference.

A storage object such as a virtual disk drive or a raw logical volume can be contained in a file compatible with the UNIX (Trademark) operating system so that the storage object can be exported using the NFS or CIFS protocol and shared among the clients. In this case, the storage object can be replicated and backed up using conventional file replication and backup facilities without disruption of client access to the storage object. See, for example, Liang et al., Patent Application Publication US 2005/0044162 A1 published Feb. 24, 2005, entitled "Multi-Protocol Sharable Virtual Storage Objects," incorporated herein by reference. The container file can be a sparse file. As data is written to a sparse file, the size of the file can grow up to a pre-specified maximum number of blocks, and the maximum block size can then be extended by moving the end-of-file (eof). See, for example, Bixby et al., Patent Application Publication US 2005/0065986 A1 published Mar. 24, 2005, entitled "Maintenance of a File Version Set Including Read-Only and Read-Write Snapshot Copies of a Production File," incorporated herein by reference, and Mullick et al., Patent Application Publication 2005/0066095 A1 published Mar. 24, 2005, entitled "Multi-Threaded Write Interface and Methods for Increasing the Single File Read and Write Throughput of a File Server," incorporated herein by reference.

The storage technology described above, in combination with a continuing increase in disk drive storage density, file server processing power, and network bandwidth at decreasing cost, has provided network clients with more than an adequate supply of network storage capacity at affordable prices. The cost of the network file server and its attached storage, however, is becoming a small fraction of the total cost of ensuring fast and reliable access to a vast and ever increasing mass of stored information. The total cost is becoming dominated by the cost of administering the mass of stored information over its lifetime, including the cost of software tools for hierarchical storage, data backup, remote replication, and other kinds of information lifecycle management (ILM). See, for example, Amegadzie et al, Patent Application Publication US 2006/0212746 published Sep. 21, 2006, entitled "Selection of Migration Methods Including Partial Read Restore in Distributed Storage Management," incorporated herein by reference. The vast amount of stored information is also interfering with quick recovery from hardware or software errors that require storage to be taken offline for a file system consistency check.

SUMMARY OF THE INVENTION

In accordance with one aspect, the invention provides a computer-implemented method of operating a file server. The file server includes data storage and a data processor. The data storage stores a logical volume and a file system built on the logical volume. The file system includes multiple cylinder groups. Each of the cylinder groups includes file system blocks. The file system blocks include allocated blocks of the data storage allocated to files in the file system, and free blocks of the data storage that are not allocated to the files in the file system. The logical volume includes slices of the data storage. Each of the slices of the data storage stores a number of the cylinder groups. The method includes the data processor executing computer instructions stored on a non-transitory computer-readable storage medium to perform the steps of: (a) selecting one of the slices of the data storage for evacuation; and then (b) evacuating the selected one of the slices of the data storage. The selected one of the slices of the data storage is evacuated by identifying allocated blocks of the data storage in the selected one the slices of the data storage, and for each of the identified allocated blocks of the data storage in the selected one the slices of the data storage, (1) reverse mapping the identified allocated block to identify a file to which the identified allocated block is allocated, (2) allocating a new block of the data storage in another one of the slices of the data storage in the logical volume upon which the file system is built, (3) copying data from the identified allocated block to the allocated new block of the data storage in another one of the slices of the data storage in the logical volume upon which the file system is built, and (4) in the identified file to which the identified allocated block is allocated, substituting the allocated new block of the data storage for the identified allocated block.

In accordance with another aspect, the invention provides a file server including data storage, and a data processor coupled to the data storage for accessing data stored in the data storage. The data storage stores a logical volume and a file system built on the logical volume. The file system includes multiple cylinder groups. Each of the cylinder groups includes file system blocks. The file system blocks include allocated blocks of the data storage allocated to files in the file system, and free blocks of the data storage that are not allocated to the files in the file system. The logical volume includes slices of the data storage, and each of the slices of the data storage stores a number of the cylinder groups. The data processor has a non-transitory computer-readable storage medium storing computer instructions that, when executed by the data processor, perform the steps of: (a) selecting one of the slices of the data storage for evacuation; and then (b) evacuating the selected one of the slices of the data storage. The selected one of the slices of the data storage is evacuated by identifying allocated blocks of the data storage in the selected one the slices of the data storage, and for each of the identified allocated blocks of the data storage in the selected one the slices of the data storage: (1) reverse mapping the identified allocated block to identify a file to which the identified allocated block is allocated, (2) allocating a new block of the data storage in another one of the slices of the data storage in the logical volume upon which the file system is built, (3) copying data from the identified allocated block to the allocated new block of the data storage in another one of the slices of the data storage in the logical volume upon which the file system is built, and (4) in the identified file to which the identified allocated block is allocated, substituting the allocated new block of the data storage for the identified allocated block.

BRIEF DESCRIPTION OF THE DRAWINGS

Additional features and advantages of the invention will be described below with reference to the drawings, in which.

Figure 1:
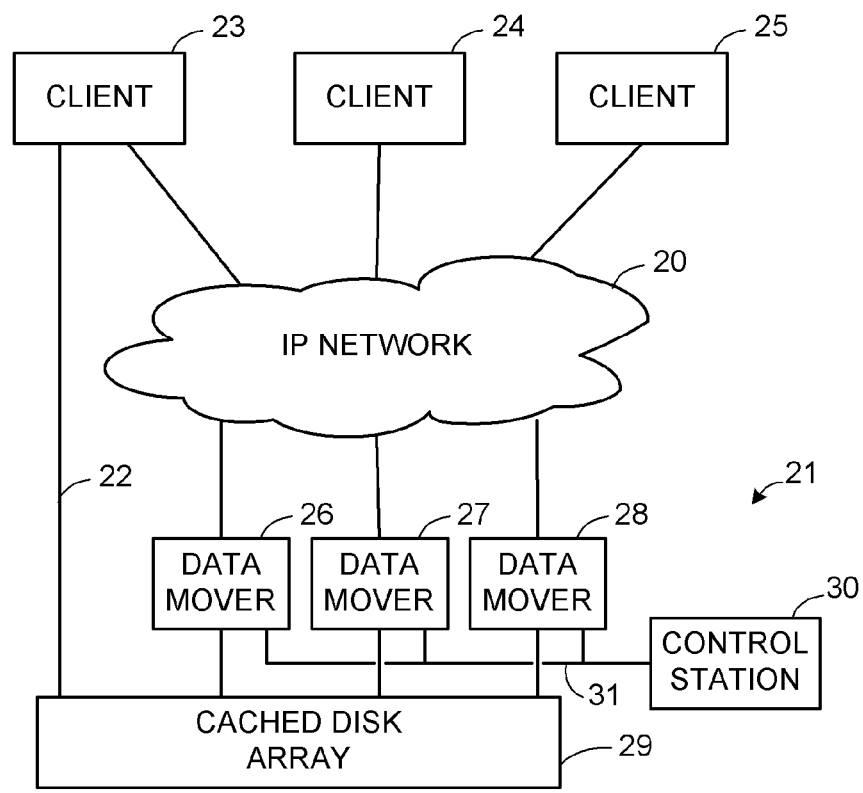
FIG. 1 is a block diagram of a data processing system including multiple clients and a network file server.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

1. High-Level Architecture of a Multi-Protocol Network File Server

FIG. 1 shows an Internet Protocol (IP) network 20 including a multi-protocol network file server 21 and multiple clients 23, 24, 25. The network file server 21, for example, has multiple data mover computers 26, 27, 28 for moving data between the IP network 20 and a cached disk array 29. The network file server 21 also has a control station 30 connected via a dedicated dual-redundant data link 31 among the data movers for configuring the data movers and the cached disk array 29.

Further details regarding the network file server 21 are found in Vahalia et al., U.S. Pat. No. 5,893,140, incorporated herein by reference, and Xu et al., U.S. Pat. No. 6,324,581, issued Nov. 27, 2001, incorporated herein by reference. The network file server 21 is managed as a dedicated network appliance, integrated with popular network operating systems in a way, which, other than its superior performance, is transparent to the end user. The clustering of the data movers 26, 27, and 28 as a front end to the cached disk array 29 provides parallelism and scalability. Each of the data movers 26, 27, 28 is a high-end commodity computer, providing the highest performance appropriate for a data mover at the lowest cost. The data mover computers 26, 27, 28 may communicate with the other network devices using standard file access protocols such as the Network File System (NFS) or the Common Internet File System (CIFS) protocols, but the data mover computers do not necessarily employ standard operating systems. For example, the network file server 21 is programmed with a Unix-based file system that has been adapted for rapid file access and streaming of data between the cached disk array 29 and the data network 20 by any one of the data mover computers 26, 27, 28.

Figure 2:
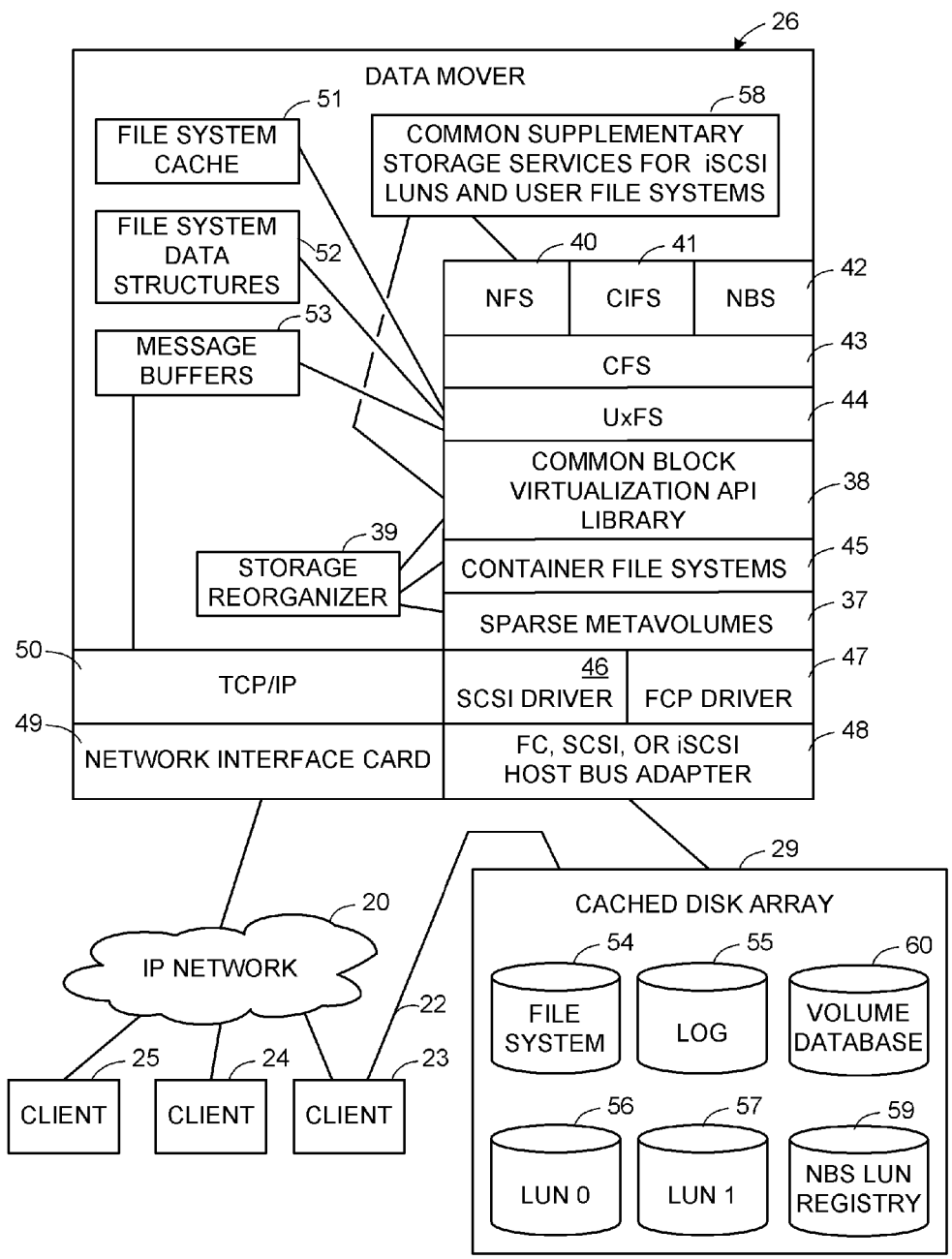
FIG. 2 is a block diagram showing further details of the network file server in the data processing system of FIG. 1.

FIG. 2 shows software modules in the data mover 26 introduced in FIG. 1. The data mover has a Network File System (NFS) module 40 for supporting communication among the clients and data movers of FIG. 1 over the IP network 20 using the NFS file access protocol, and a Common Internet File System (CIFS) module 41 for supporting communication over the IP network using the CIFS file access protocol. The data mover 26 also has a network block services (NBS) module 42 for exporting to the clients logical volumes 56, 57 of network attached storage in the cached disk array 29. These logical volumes 56, 57 then become pseudo-disk instances that appear local to the clients. The clients may then use the Internet Small Computer Systems Interface (iSCSI) protocol with the data mover 26 to access these logical volumes as iSCSI logical unit number (LUNs), as further described in Jiang et al., Patent Application Publication US 2004/0059822 A1 published Mar. 25, 2004, incorporated herein by reference. The NBS module has a LUN registry 59 in storage to provide a mapping of a (target, LUN) specifier in a client request to the logical storage address of the LUN 56, 57 in the cached disk array.

The NFS module 40, the CIFS module 41, and the NBS module 42 are layered over a Common File System (CFS) module 43, and the CFS module is layered over a Universal File System (UxFS) module 44. The UxFS module supports a UNIX-based file system, and the CFS module 43 provides higher-level functions common to NFS, CIFS, and NBS.

Figure 5:
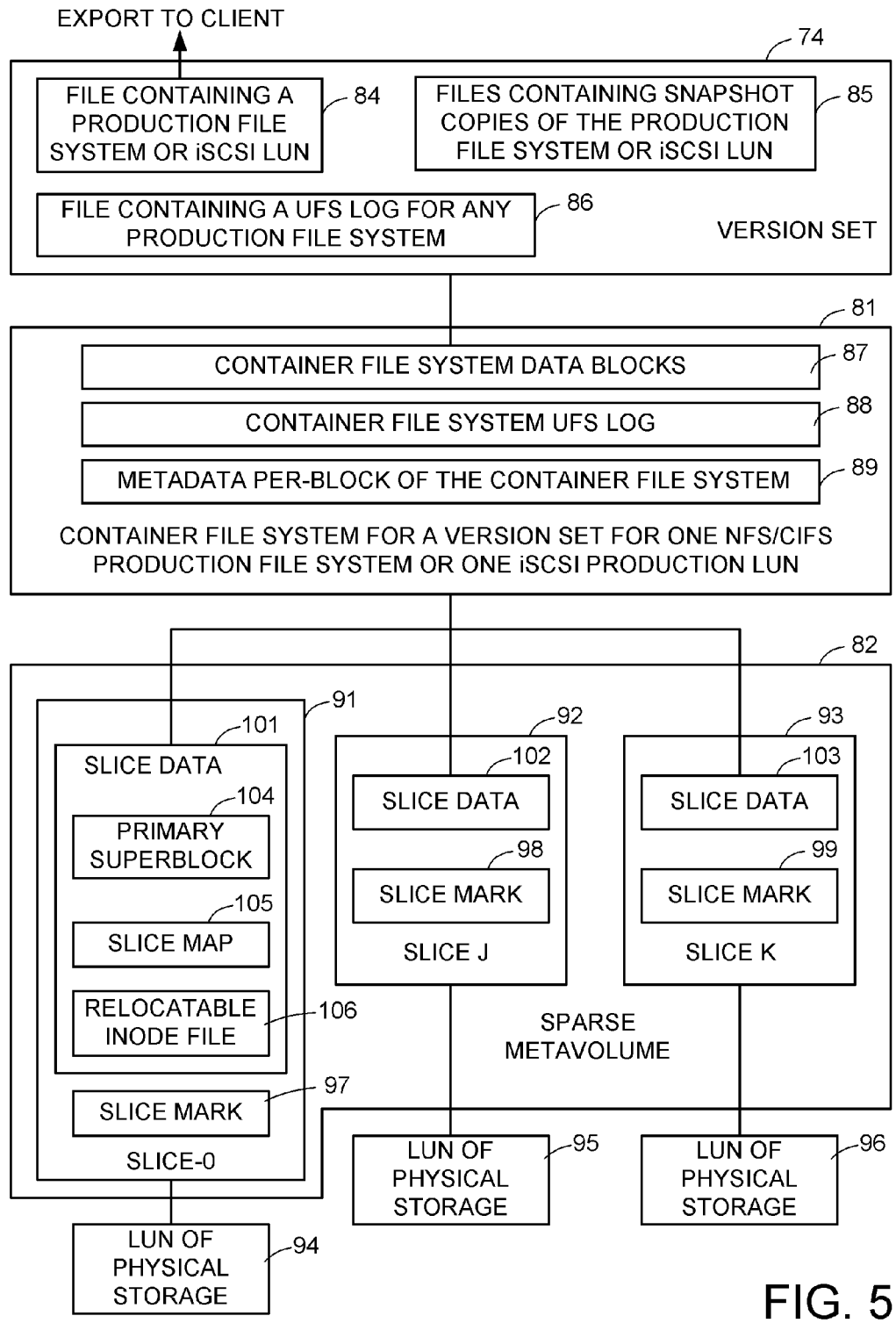
FIG. 5 is a block diagram showing a new file server storage architecture including a sparse metavolume and a container file system built on the sparse metavolume for containing a production file system or an iSCSI LUN, and snapshot copies of the production file system or iSCSI LUN.

As further described below with reference to FIG. 5, the data mover 26 provides enhanced decoupling of logical storage from physical storage by storing version sets of an iSCSI LUN or a user file system in a container file system built upon a sparse metavolume. A container file systems layer 45 provides access to the container file systems, and a sparse metavolumes layer 37 provides access to the sparse metavolumes. A common block virtualization library 38 provides an application interface to the container file systems layer 45 and the sparse metavolumes layer 37 by translating from asynchronous to synchronous operation and implementing exchange semantics. The common block virtualization library 38 also provides utility programs for various features of the container file systems and the sparse metavolumes in order to reduce the total cost of ownership of the file server and enhance data availability and storage scalability. These features include use of a storage reorganizer 39 for improved thin provisioning and enhanced data mobility between levels of tiered storage, more flexible redundant data elimination, improved fault detection and finer granularity of fault containment, and seamless integration of common supplementary storage services 58 for iSCSI LUNs and user file systems, such as services for backup, recovery, and information lifecycle management (ILM). For example, the common supplementary storage services 58 use the NFS module 40 for access to the container file systems in a conventional fashion, and call application program interface (API) routines in the library 38 for access to unconventional features of the container file systems and for control and access to metadata of the sparse metavolumes 37.

The sparse metavolume layer 37 provides a free mapping from certain slices of the logical extents of the metavolumes to configured slices of logical storage in the cached disk array 29. The configured slices of logical storage are defined by storage configuration information in a volume database 60 in the cached disk array 29. The sparse metavolumes layer 37 is layered over a SCSI driver 46 and a Fibre-channel protocol (FCP) driver 47 in order to access the configured slices of logical storage in the cached disk array 29. The data mover 26 sends storage access requests through a host bus adapter 48 using the SCSI protocol, the iSCSI protocol, or the Fibre-Channel protocol, depending on the physical link between the data mover 26 and the cached disk array 29.

A network interface card 49 in the data mover 26 receives IP data packets from the IP network 20. A TCP/IP module 50 decodes data from the IP data packets for the TCP connection and stores the data in message buffers 53. For example, the UxFS layer 44 writes data from the message buffers 53 to a file system 54 in the cached disk array 29. The UxFS layer 44 also reads data from the file system 54 or a file system cache 51 and copies the data into the message buffers 53 for transmission to the network clients 23, 24, 25.

To maintain the file system 54 in a consistent state during concurrent writes to a file, the UxFS layer maintains file system data structures 52 in random access memory of the data mover 26. To enable recovery of the file system 54 to a consistent state after a system crash, the UxFS layer writes file metadata to a log 55 in the cached disk array during the commit of certain write operations to the file system 54. The network file server 21 also provides metadata services to the client 23 so that the client may perform read and write operations directly to the cached disk array 29 over a data link 22. For example, as described in Vahalia et al. U.S. Pat. No. 6,973,455 issued Dec. 6, 2005, incorporated herein by reference, the client 23 sends to the file server 21 at least one request for access to a file. In response, the file server 21 grants a lock to the client 23, and returns to the client metadata of the file including information specifying data storage locations in the cached disk array 29 for storing data of the file. The client 23 receives the metadata, and uses the metadata to produce at least one data access command for accessing the data storage locations in the cached disk array 29. The client sends the data access command to the cached disk array 29 to read or write data to the file. For a write operation, the client 23 may modify the metadata. When the client 23 is finished writing to the file, the client returns any modified metadata to the file server 21.

2. A Conventional Storage Object Hierarchy in a Network File Server

Figure 3:
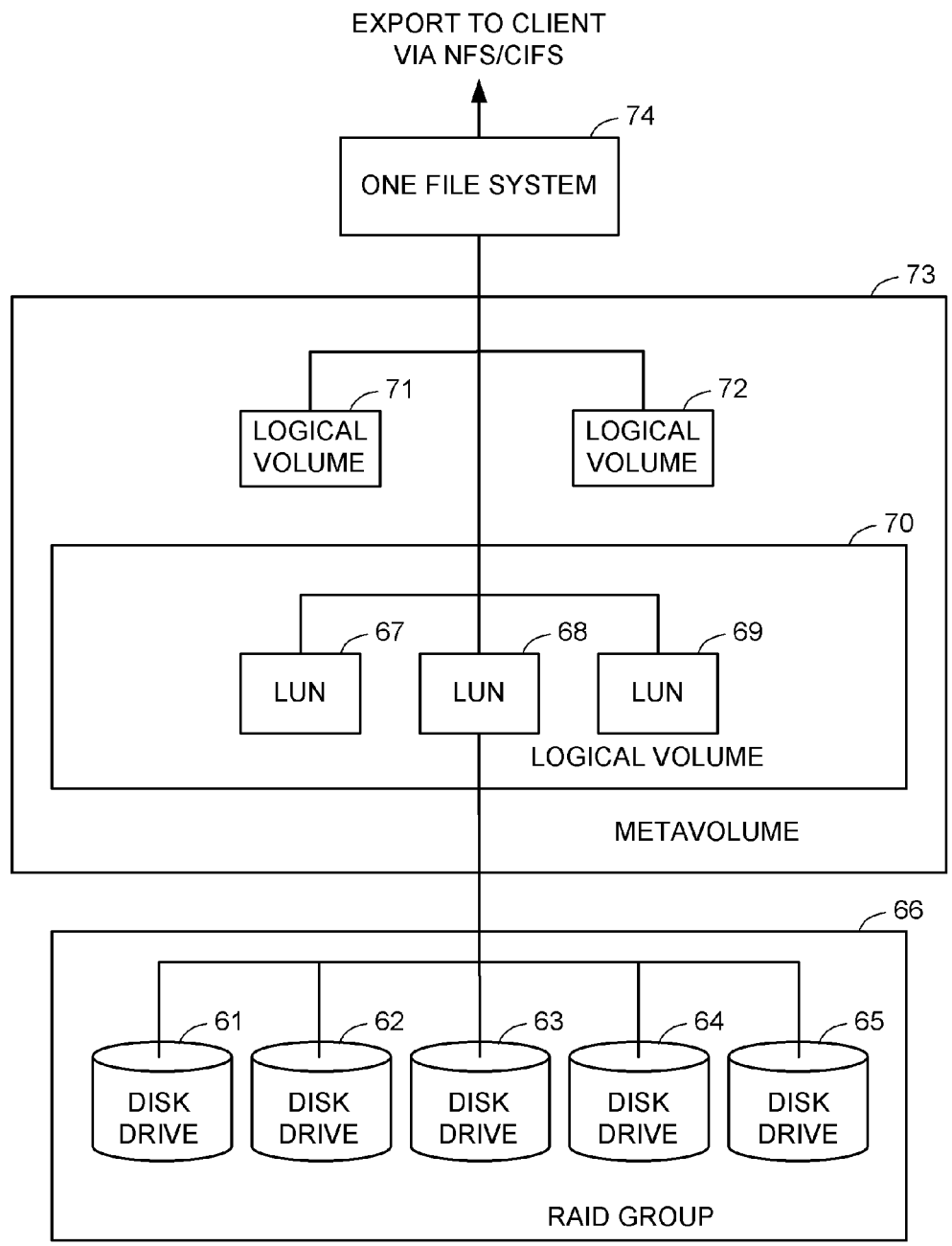
FIG. 3 is a block diagram showing a conventional organization of physical storage in one file system.

FIG. 3 shows a conventional storage object hierarchy in a network file server. Disk drives 61, 62, 63, 64, and 65 are arranged in a group to form a redundant array of inexpensive disks (RAID). The RAID group provides a logical unit number (LUN) of storage 68. A plurality of such LUNS 67, 68, and 69 are combined to form a logical volume 70 of storage having contiguous logical storage addresses. A plurality of such logical volumes 70, 71, and 72 are combined to form a metavolume 73 of storage having contiguous logical storage addresses. One client file system 74 is built upon the metavolume 73. The file system 74 is exported to a client via the NFS or CIFS file access protocol.

Figure 4:
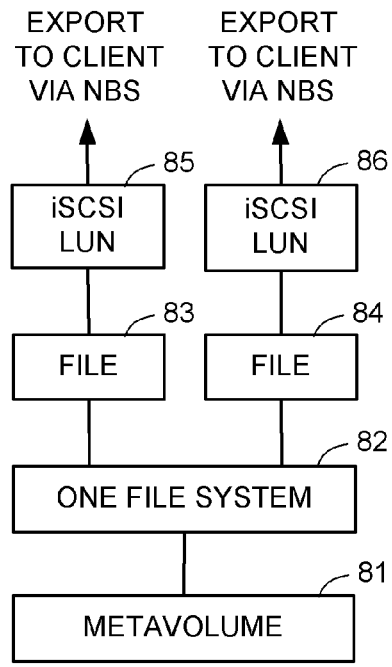
FIG. 4 is a block diagram showing a conventional organization of storage for iSCSI LUNs.

FIG. 4 shows how one file system 82 built upon a metavolume 81 has been used to provide a client with network block services. The file system 82 includes a plurality of files 83, 84, each providing storage for a respective iSCSI LUN 85, 86 exported to the client. For thin provisioning, the files 83, 84 have been sparse files.

3. Thin Provisioning of a File System and an iSCSI LUN Through a Common Mechanism It is desired to provide a common mechanism for thin provisioning of a production file system or an iSCSI LUN exported to a client. As shown in FIG. 5, this is done by providing a new file server architecture including a container file system 81 built on a sparse metavolume 82 for enhanced decoupling of logical storage from physical storage and for providing common supplementary storage services for iSCSI block access and for NFS or CIFS file system access.

The container file system 81 provides a container for a version set 83 for one production file system or iSCSI LUN 84. The version set 83 may also include any number of snapshot copies 85 of the production file system or iSCSI LUN 84. If the production object 84 is a production file system, then the version set 83 may also include a UFS log 86 for the production file system. By including the UFS log in the version set, an instantaneous snapshot or backup copy of the UFS log together with the production file system 84 can be made without pausing the production file system for flushing the UFS log prior to making the snapshot or backup copy. Instead, the UFS log can be flushed into the snapshot or backup copy anytime after the snapshot copy is made, prior to or during any restore of the production file system with the snapshot or backup copy.

The container file system 81 manages storage space among the production file system or iSCSI LUN and its snapshot copies 85. It is possible for the container file system to provide storage into the hundreds of Terabytes, for supporting thousands or more snapshots of a single production file system or iSCSI LUN.

The container file system 81 also provides improved fault containment because it is hosting a single production file system or iSCSI LUN and its snapshots. In addition to the container file system data blocks 87, the container file system 81 includes a container file system UFS log 88 and metadata 89 per-block of the container file system for enhanced detection, isolation, recovery, and reporting of any erroneous or unstable file system metadata.

For thin provisioning of the container file system 81, the sparse metavolume 82 has the ability to aggregate a plurality of N slices of the same size of logical storage space together into a contiguous logical extent while some of these slices may or may not be provisioned. A slice-0 at an offset zero in the logical extent is always provisioned. Each provisioned slice has a corresponding configured storage slice object 91, 92, 93 that is mapped to a corresponding LUN of physical storage 94, 95, 96. Each configured storage slice object 91, 92, 93 has a respective slice mark 97, 98, 99 containing metadata and state information for the provisioned slice, and a respective area of storage 101, 102, 103 for containing slice data. For example, the slice mark occupies the first two sectors (of 256 K bytes per sector) of the provisioned LUN of physical storage, and the slice data occupies the remaining sectors of the provisioned LUN of physical storage. The slice data comprise the sectors of storage backing the container file system.

An initial slice 91, referred to as slice-0, is always provisioned with backing store, so that some of the slice data 101 is available to store metadata and management information for the sparse metavolume 82 and the container file system 81. This metadata and management information includes a primary superblock 104, a slice map 105, and a relocatable inode file 106. The primary superblock 104 includes metavolume metadata such as the size of the sparse multivolume and the constant size of each slice in the sparse metavolume 82. The slice map 105 indicates whether or not any given slice of the sparse metavolume is provisioned, and if so, the slice identifier of the configured slice object. The slice identifier identifies a slice of logical storage configured from the same kind of storage in the cached disk array.

The kind of storage backing each slice is indicated by a particular value of a parameter called the automatic volume management (AVM) type of the storage. Storage having a similar group of performance characteristics (such as access time, bandwidth, and read-write capability) is indicated by the same value for the AVM type. The slice map 105 includes the AVM type of each slice provisioned in the metavolume. The slice map also provides a way of quickly searching for a free block of storage in a provisioned slice of a given AVM type in the metavolume.

Thus, the slice map is used for allocating backing storage to the metavolume for provisioning data blocks to the container file system, and for reading data from or writing data to the metavolume or the container file system. In addition, the slice map is used for deallocating blocks from a slice in a shrink process, for selecting a slice for deallocation in the shrink process, for fault detection, and for fault containment.

The shrink process may remove a provisioned slice from anywhere in the sparse metavolume except slice-0 which may only be relocated to storage of a different type but which should be present at all times during the relocation process. In a shrink process, statistics maintained in the slice map are used to determine which provisioned slice should be selected to have its blocks deallocated, without having to search all of the cylinder groups of the container file system. When a provisioned slice is selected for deallocation in accordance with a configured shrink policy, the storage reorganizer is invoked to migrate the data of allocated file system blocks to free file system blocks of other provisioned slices in the container file system, and to remap the migrated file system blocks in the cylinder group. After all the data of all of the container file system blocks have been vacated from the slice, then the storage slice object is removed from the sparse metafile system and returned to a pool of free slices.

The fault containment logic uses the slice map for marking slices or cylinder groups which are unstable to prevent any subsequent access until the object becomes stable again. The slice map is also used to ensure that the container view of the sparse metavolume matches the state of the sparse metavolume itself (as indicated in the slice marks of the provisioned slices). If an inconsistency is found, then it is caught before further damage is done.

The relocatable inode file 106 is provided for use in connection with the remapping of in-use inodes of the container file system which belong to a slice that needs to be evacuated. While remapping these inodes, the inode number initially assigned to each of these inodes will not change or else it will defeat the container file system's directory logic as well as applications such as NFS which use the inode number within the file handle. So, as soon as at least one inode is remapped, the relocatable inode file is created, and from then on, any inode lookup first checks the relocatable inode file to find out whether an inode is at its original location or whether the inode has been remapped. The inode number that this inode is known by UxFS is used as an index in the file, and if there is no corresponding entry for this number in the file, it means that this inode has not been remapped and may be found at its original location. Conversely, if there is an entry for this inode number in the file, then it will contain the storage location that this inode number has been remapped to.

Figure 6:
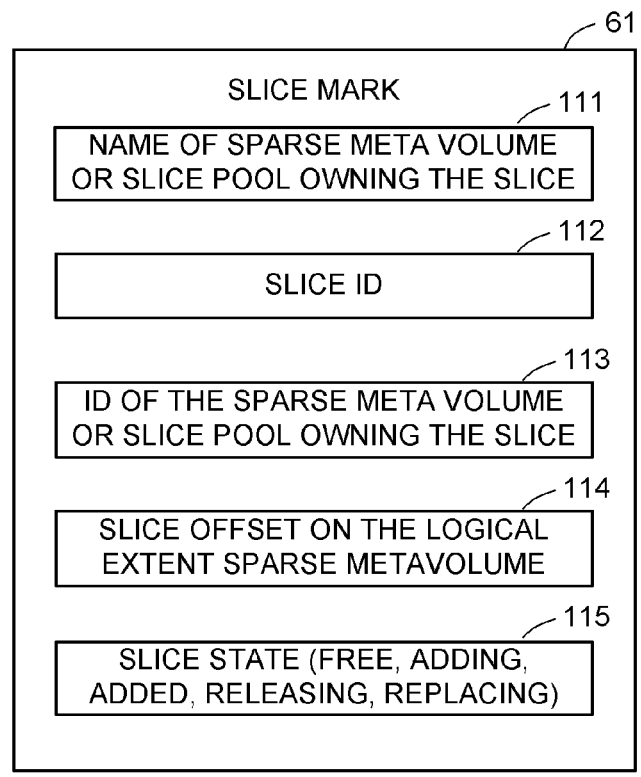
FIG. 6 is a block diagram of a slice mark introduced in FIG. 5.

FIG. 6 shows the contents of the slice mark 99. The slice mark includes a field 111 for storing the name of the sparse metavolume or slice pool that that owns the configured slice object. The slice mark 99 contains a slice ID 112 that identifies the slice object so that the slice object can be mapped (in the slice map 105 in FIG. 5) to the logical extent of the sparse metavolume and also mapped to a LUN of physical storage of a particular AVM type. The slice mark includes a field 113 for containing an identification (ID) number of the sparse metavolume or slice pool that owns the provisioned slice object. The slice mark further includes a field 114 for containing the offset of the provisioned slice on the extent of the sparse metavolume when the slice is not free. The slice mark 99 further includes a slice state 115 of free, adding, added, releasing, or replacing.

The slice mark assigned to each slice object of configured storage is maintained during the lifecycle of the slice to keep track of the state that the slice is meant to be in. The slice mark is checked for consistency any time that a slice is transitioning to a different state. Should there be any inconsistencies between the slice's state and its slice mark, the action on the slice is stopped and then appropriate measures are taken immediately in order to prevent further damage to the system.

When a sparse metavolume is provisioned with a configured slice object, the configured slice object is taken from a pool of configured slices having the same size and AVM type, and when a configured slice object is removed from the sparse metavolume, the configured slice object is returned to a pool of configured slices having the same size and AVM type. In a network file server 21 having a cached disk array, multiple data movers, and a control station, as shown in FIG. 1, it is convenient for the control station to configure the slices, maintain pools of free configured slices of various sizes and AVM types, and allocate the free slices from the pools to the data movers.

Figure 7:
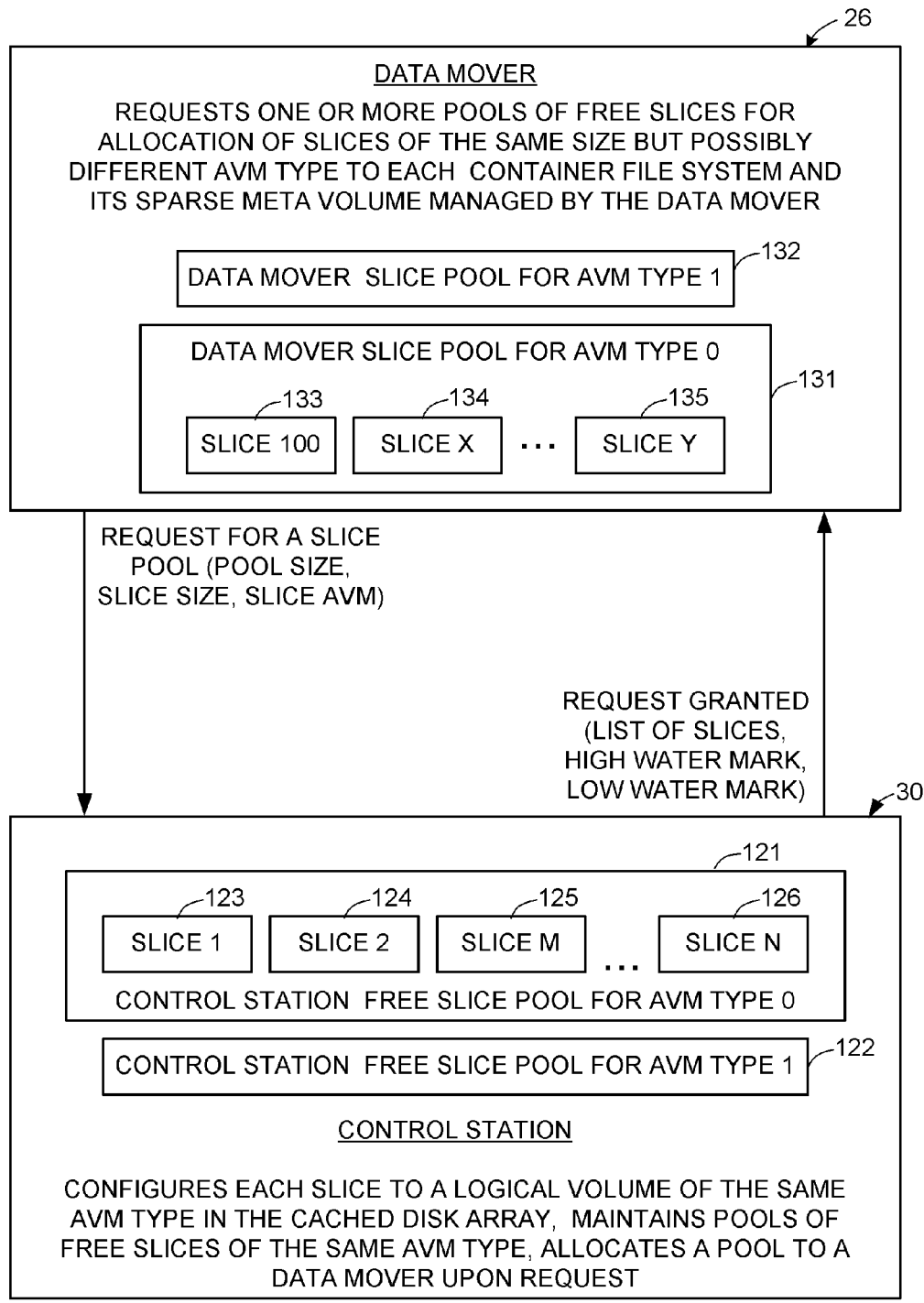
FIG. 7 is a block diagram of a control station and a data mover showing data structures for allocation of configured slices of storage.

As shown in FIG. 7, the control station configures each slice to a logical volume of storage having the same AVM type in the cached disk array. The control station also maintains pools 121 of free slices of the same size and configured from storage of the same AVM type. For example, the control station has a free slice pool 121 for AVM type 0, and a free slice pool 122 for AVM type. AVM type 0 is relatively fast and expensive storage of fibre-channel disk drives, and AVM type 1 is relatively slow and inexpensive storage of Advanced Technology Attachment (ATA) disk drives. The pool 121 has a multiplicity of free slice objects 123, 124, 125, and 126 of the same size, such as one gigabyte. The pool 122 also has a multiplicity of free slices of the same size, although the size for the slices in another pool may be different, such as ten gigabytes.

Initially or when the data mover 26 needs more free slices for provisioning of slices to a sparse metavolume, the data mover sends a request for a slice pool to the control station 30. The request for a slice pool specifies a pool size (such as the desired number of free slices to include in the pool), a slice size, and a slice AVM type. The control station grants the request by allocating a pool of free slices to the data mover and returning a list or map of the allocated slices in the pool, and also returning a high water mark and a low water mark. The low water mark is a recommended number of slices in the data mover's slice pool under which the data mover should request more free slices from the control station, and the high water mark is a recommended number of slices in the data mover's slice pool over which the data mover should return free slices to the control station. For example, in FIG. 7, the control station 30 has been allocated a slice pool 131 for the AVM type 0 and a slice pool 132 for the AVM type 2. The slice pool 131 for the AVM type 0 includes a plurality of slices 133, 134, 135 of the same size.

Figure 8:
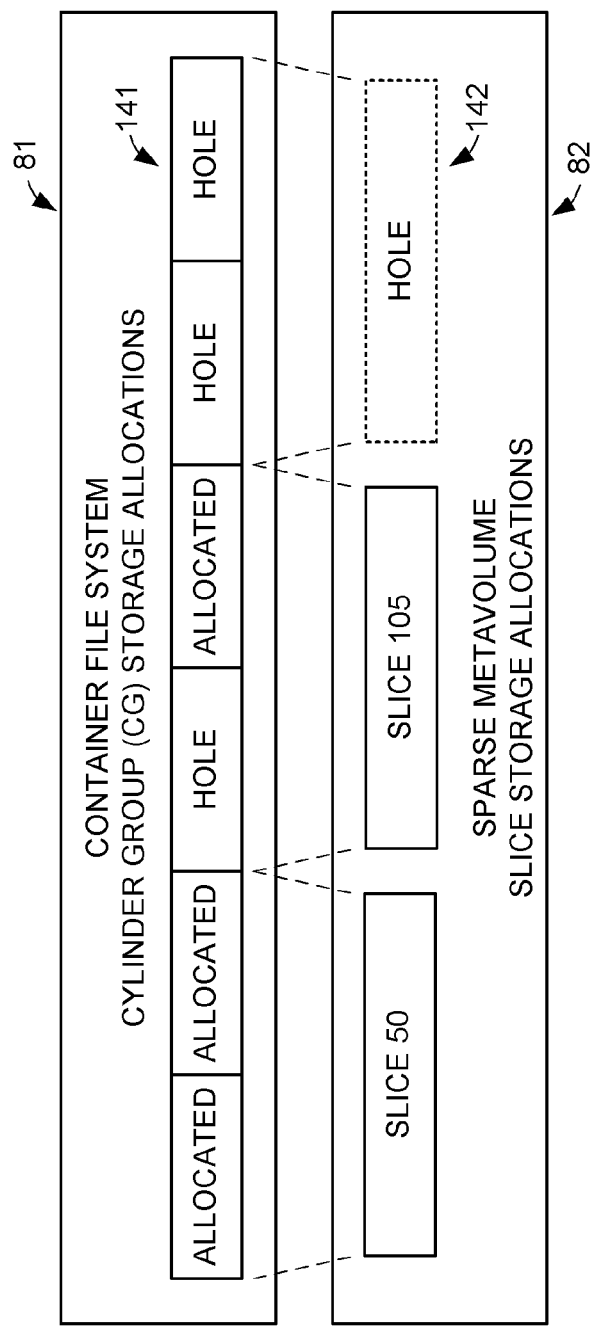
FIG. 8 is a block diagram showing a specific mapping of cylinder groups in a container file system to slices in the logical extent of a sparse metavolume.

FIG. 8 shows a relationship between cylinder group storage allocations 141 in the container file system 81 and slice storage allocations 142 in the sparse metavolume. The logical extent of the container file system is subdivided into self-contained cylinder groups of file system blocks. For a given container file system, each cylinder group has the same size, so that the cylinder group size is the granularity of storage provisioning for the container file system. For example, the file system block size is 4 kilobytes or 8 kilobytes, and the cylinder group size is 64 megabytes. At any given time, storage for each cylinder group of the container file is either allocated or not. If storage for a cylinder group is not allocated, then there is said to be a hole at that location in the logical extent of the file system. Each provisioned slice of the sparse metavolume 82 contains a certain multiple of cylinder groups of the container file system 81. None, some, or all of the cylinder groups contained in a provisioned slice can be allocated at any given time. If all of the cylinder groups in a particular provisioned slice are not allocated, then the slice can be deallocated, so that a hole will then appear in the logical extent of the sparse metavolume.

Figure 9:
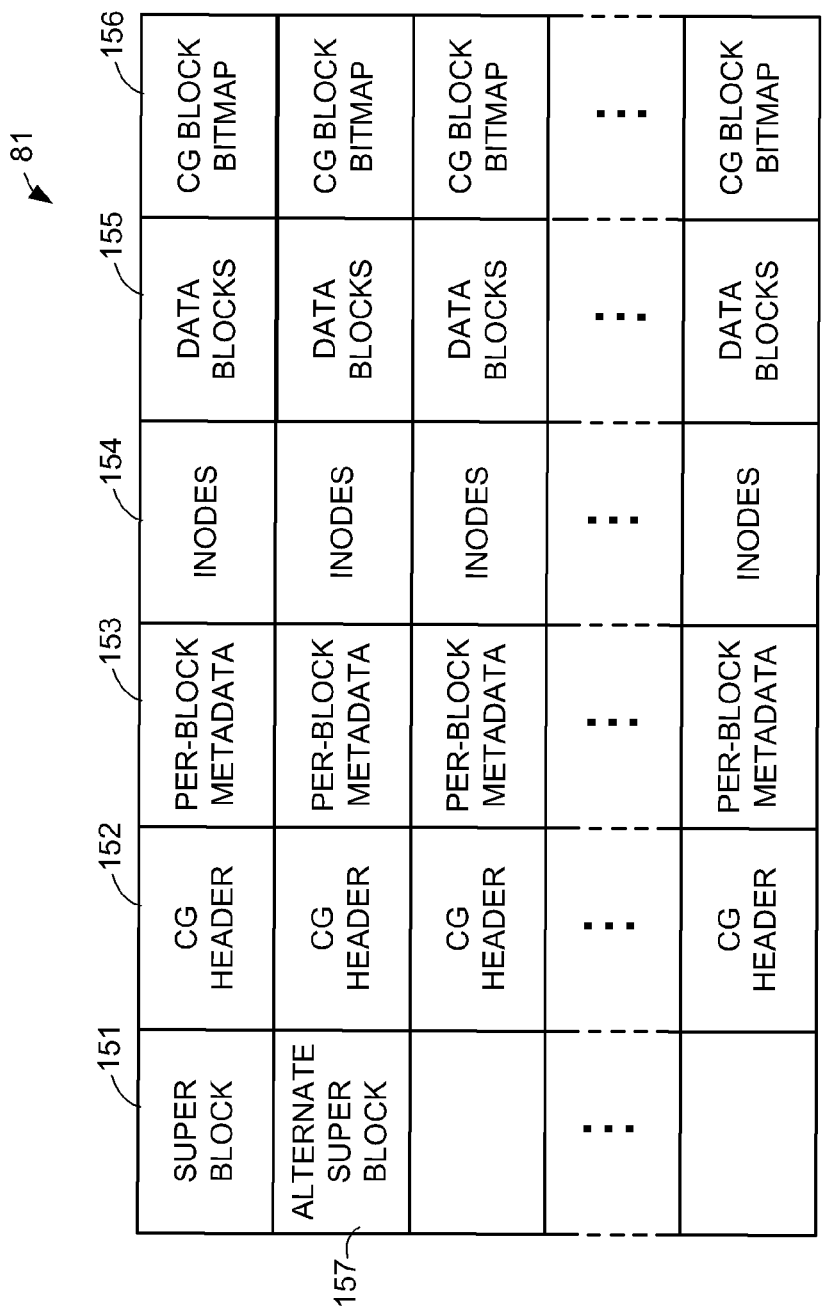
FIG. 9 is a block diagram showing components of cylinder groups of a container file system.

FIG. 9 shows a memory map of the logical extent of the container file system 81. Each cylinder group (CG) of the container file system is a respective row in this memory map. The first cylinder group contains a superblock 151 of container file system metadata, a cylinder group header 152, file system blocks for per-block metadata 153 for the file system blocks in the cylinder group, inodes 154 of the cylinder group, file system data blocks 155 for the cylinder group, and a cylinder group block bitmap 156 for indicating whether or not each file system block in the cylinder group is allocated or not. The second cylinder group has the same format as the first cylinder group. The alternate superblock 157 of the second cylinder group is a copy of the superblock 151 of the first cylinder group. Other cylinder groups have the same format except they do not have a superblock.

Figure 10:
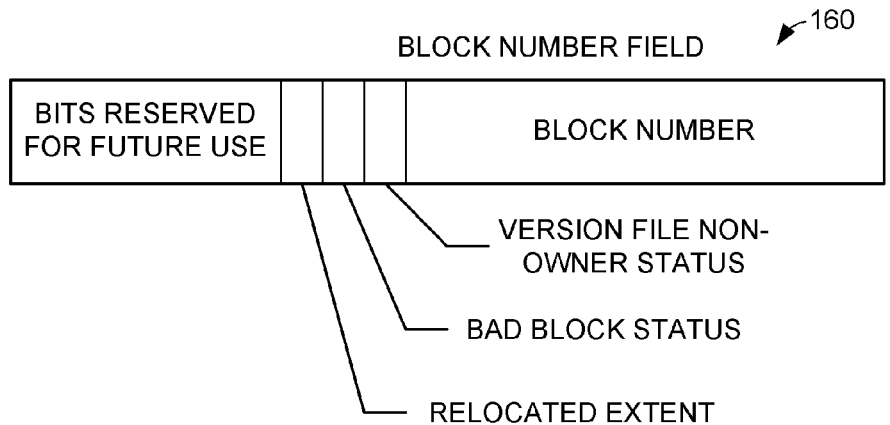
FIG. 10 is a block diagram showing information encoded into a block number field in a container file system.

FIG. 10 shows that a few bits in the block number field 160 are reserved for indicating block state. One bit has always been used to indicate the non-owner status of a block in a version file. A second bit is reserved to indicate bad block status, for example upon detection of a media sector error, duplicate allocation, or other corruption. A third bit is reserved to indicate that the block is in a relocated extent of the container file system. A few more bits are reserved for future use.

Figure 11:
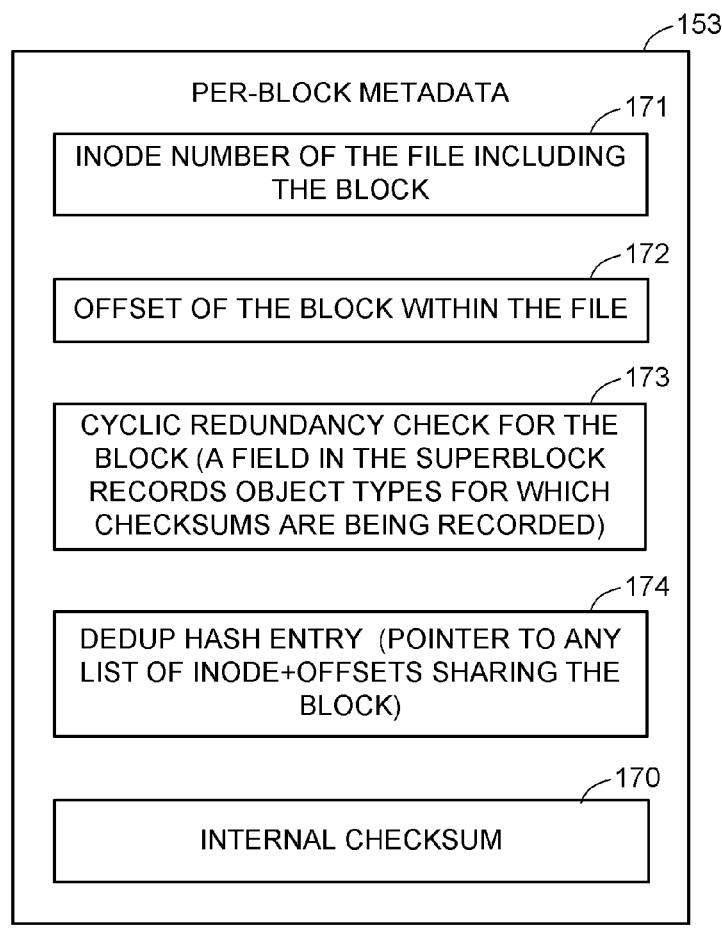
FIG. 11 is a block diagram of per-block metadata for a file system block in a container file system.

FIG. 11 shows the per-block metadata 153 for a file system block of the cylinder group. The per-block metadata 153 consists of 256 bits for each file system block of the cylinder group. The per-block metadata includes an inode number 171 of the file in the container file system including the file system block, the offset 172 of the block within the file in the container file system, a cyclic redundancy check 173 for the block, and a deduplication hash entry 174 for the block. The deduplication hash entry, for example, is a pointer to any list of inode and offsets sharing the block, or else a null or zero value if the block is not shared. The per-block metadata for each file system block also includes an internal checksum 170 protecting the integrity of the 256 bits of per-block metadata.

The inode number 171 and offset 172 for the block are updated in the same transaction that updates the allocation state in the cylinder group block bitmap (156 in FIG. 9). A block can be in one of three states: allocated, free, or reserved. A reserved block cannot be allocated or freed. The allocated/free state is tracked in the block bitmap, and the reserved state is implicit in the block number. For debugging purposes, additional special states can be recorded in the owner inode field 171 for free and reserved blocks.

A new field in the cylinder group superblock (151 in FIG. 9) records the object types whose checksums are recorded in the pre-block metadata. For example, checksums are most important for indirect blocks and slicemap blocks. When used, the cyclic redundancy check is updated in synchronization with updating of the file system block.

The per-block metadata 153 is not directly accessible to a network client, and instead it is implicitly accessed in the process of a file system operation that makes use of the cylinder group or block contents. For example, the process of allocating or freeing a block of the cylinder group validates and updates block metadata owner state. A process of allocating a new pointer in an indirect block updates the block metadata checksum for the indirect block, and adding or removing a slice updates the checksum on the slicemap block.

Figure 12:
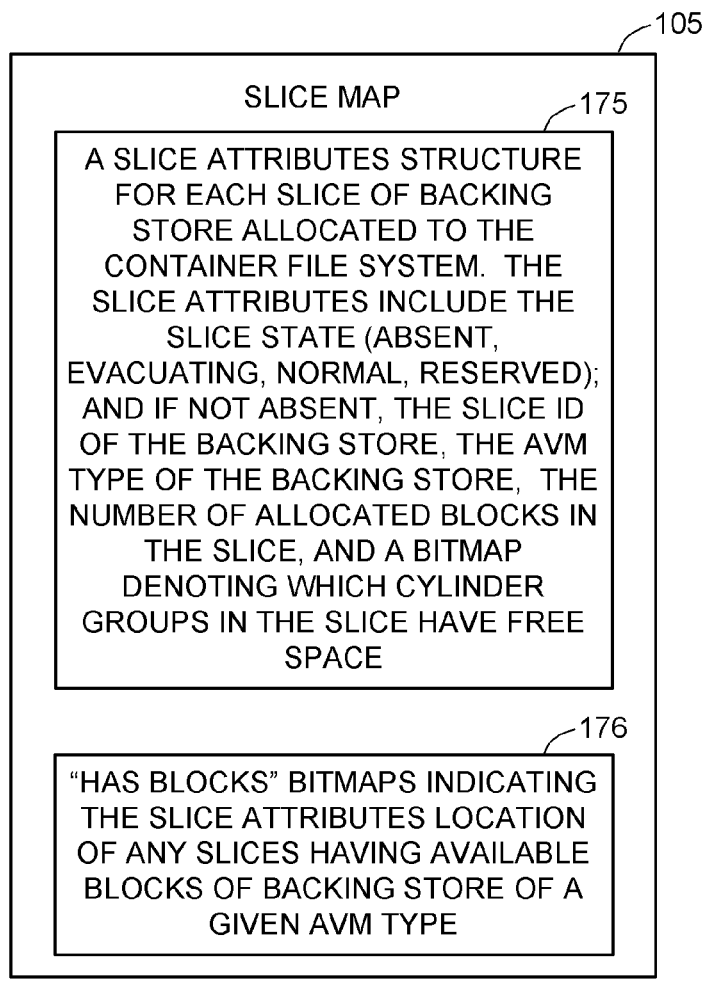
FIG. 12 is a block diagram of a slice map for a sparse metavolume.

FIG. 12 shows the slice map 105. The slicemap includes a slice attributes structure 175 for each slice of backing store allocated to the container file system. The state of each slice of the sparse metavolume is either absent, evacuating, normal, or reserved, and if the slice is not absent, then the slicemap indicates the slice ID of the configured slice object, the AVM type of the configured slice object, the number of allocated blocks in the configured slice object, and a bitmap denoting which cylinder groups in the slice have free space. The slicemap also includes "has blocks" bitmaps 176 indicating the slice attributes location having available blocks of backing store of a given AVM type.

In a preferred implementation, the slice attributes structures 175 and the "has blocks" bitmaps 176 are designed as lookup tables for efficient paging from disk into memory. The slice attributes structures for all slices (absent or not) are stored on disk as a contiguous sequence, with the attributes for each slice aligned on a 2**N byte boundary.

The "has blocks" bitmaps 176 shadow the file system blocks that contain the slice attributes structures. There is a segment in the sequence of bitmaps for each AVM type potentially provisioned in the sparse metavolume. In effect, the sequence of bitmaps is a two-dimensional array of bits, hasBlocks[NAVM, NSAB], where NAVM is the number of the AVM type that the container file system can support, and NSAB is the number of file system blocks of slice attributes structures in the container file system. hasBlocks[q, b] is true if and only if the specified file system block=b contains a slice attributes structure for a provisioned slice having available storage blocks of the specified AVM type=q. Maintaining this compact representation helps allocation by allowing it to locate free provisioned storage space without much searching.

Figure 13:
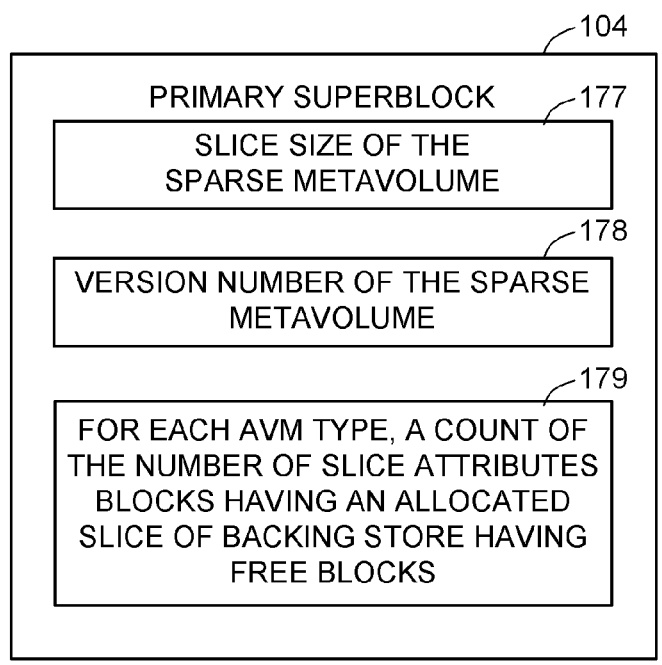
FIG. 13 is a block diagram of a primary superblock of a metavolume.

As shown in FIG. 13, the primary superblock (104 in FIG. 5) contains the slice size 177 of the sparse metavolume, a version number 178 of the sparse metavolume, and for each AVM type, a count 179 of the number of slice attributes blocks having an allocated slice of backing store having free blocks.

Figure 14:
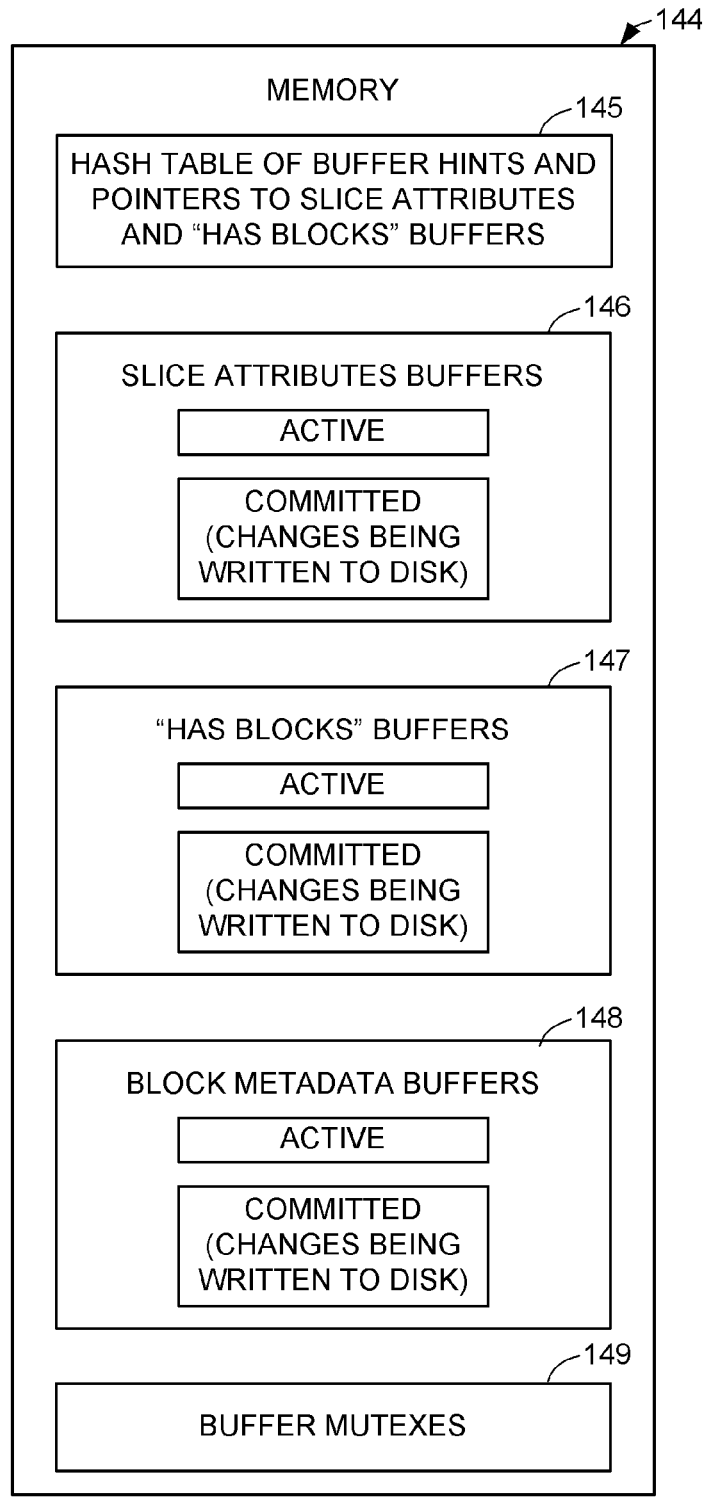
FIG. 14 is a block diagram of mapped-in-memory portions of an on-disk slice map and block metadata.

As shown in FIG. 14, the mapped-in-memory portions 144 of the on-disk slice map and block metadata includes a static least recently used (LRU) managed hash table 145 containing buffer hints and pointers to slice attributes and "has blocks" buffers, slice attributes buffers 146 including active and committed copies, "has blocks" buffers 147 including active and committed copies, block metadata buffers 148 including active and committed copies, and buffer mutexes 149 for serializing access to the buffers or ranges of entries in the buffers. The buffers are managed in active/committed pairs for transactional consistency. The active buffer is maintained while an operation is in progress, and changes are written to the committed buffer, which is held until a sync thread writes it to disk. The buffer hints facilitate re-reading of the active buffers.

Figures 15, 16:
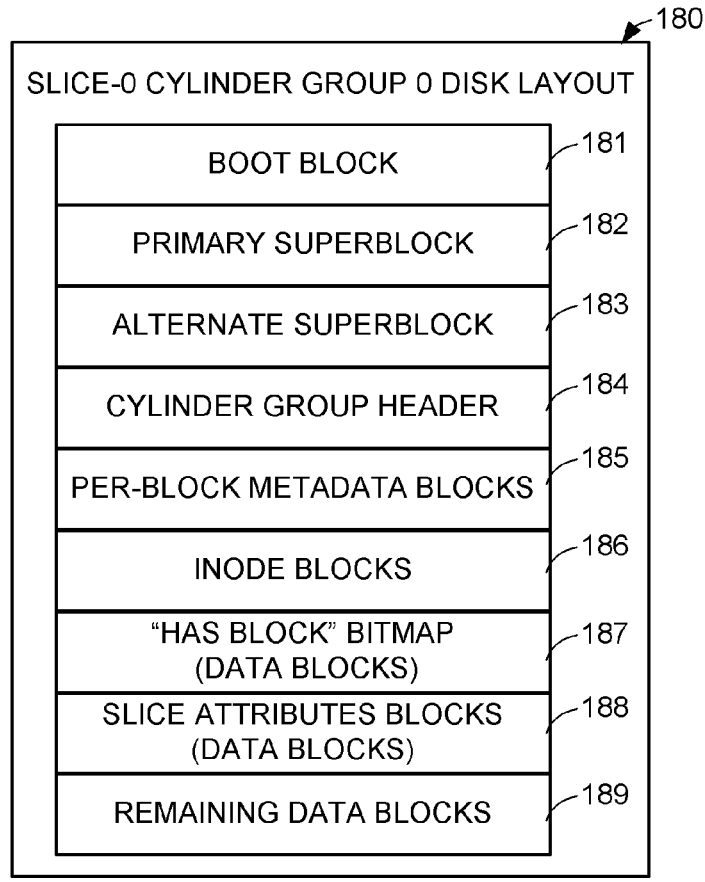
FIG. 15 is a block diagram of in-core data structures for a sparse metavolume and a container file system built upon the sparse metavolume.
FIG. 16 is a block diagram of a relocatable inode file for a container file system.

FIG. 15 shows a more specific format for the slice-0 cylinder group 0 disk layout. The disk layout includes a boot block 181, a primary superblock 182, an alternate superblock 183, a cylinder group header 184, per-block metadata blocks 185, inode blocks 186, "has block" bitmap blocks (treated as data blocks of the container file system), slice attributes blocks 188 (treated as data blocks of the container file system), and remaining data blocks 189 of the container file system.

FIG. 16 shows a specific format for the relocatable inode file 106. Each record in the file includes an old inode number and an associated new inode number. The old inode number is a primary key for searching of the records in the file.

Figure 17:
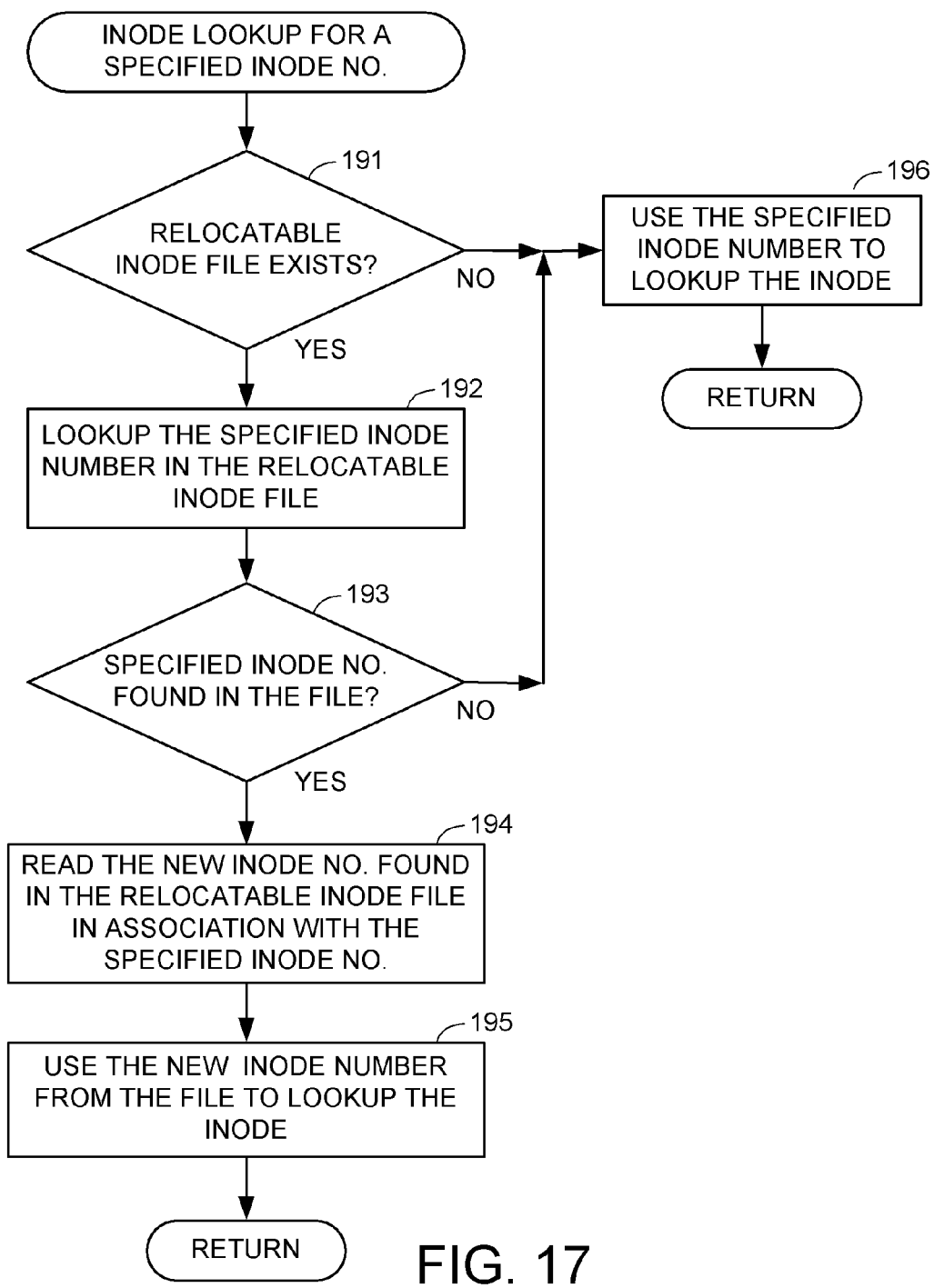
FIG. 17 is a flowchart of a procedure for using the relocatable inode file during lookup of an inode in a container file system.

FIG. 17 shows how the relocatable inode file 106 is used for an inode lookup given a specified inode number. In a first step 191, if the relocatable inode file exists, then execution continues to step 192. In step 192, the relocatable inode file is searched for a record having the specified inode number as the old inode number in the record. If such a record is found, then execution continues from step 193 to step 194. In step 194, the new inode number associated with the specified inode number is read from the record having the specified inode number as the old inode number in the record. In step 195, the new inode number from the file is used to lookup the inode, and execution returns.

In step 191, if the relocatable inode file does not exist, then execution branches to step 196 to use the specified inode number to lookup the inode, and execution returns. In step 193, if the specified inode number is not found in the file as an old inode number, then execution branches to step 196 to use the specified inode number to lookup the inode, and execution returns.

4. Implicit Container Per Version Set

As described above with respect to FIG. 5, a container file system 81 contains a version set including a production file system or iSCSI LUN 84 and snapshot copies 85 of the production file system or iSCSI LUN. Using a container file system enables all of the file system features for end user objects including production file systems block LUNs. By implicitly creating one container file system for each production file system or iSCSI LUN, it is possible to hide the management of the container file system from the client or end user. The creation of snapshot copies in the container file system can also be hidden from the client or end user. The management of the container file system and the underlying sparse metavolume can also automatically provision the production file system or iSCSI LUN with storage of an appropriate AVM type as needed in accordance with configured storage policies and usage history or express desire of a particular client.

The one-to-one mapping between the production file system or iSCSI LUN and its container file system and sparse metavolume also improves fault containment so that corruption of one client's production file system is less likely to extend to another client's production file system, and access to one clients' production file system or LUN is less likely to be disrupted by recovery of another clients' production file system or LUN.

Figure 18:
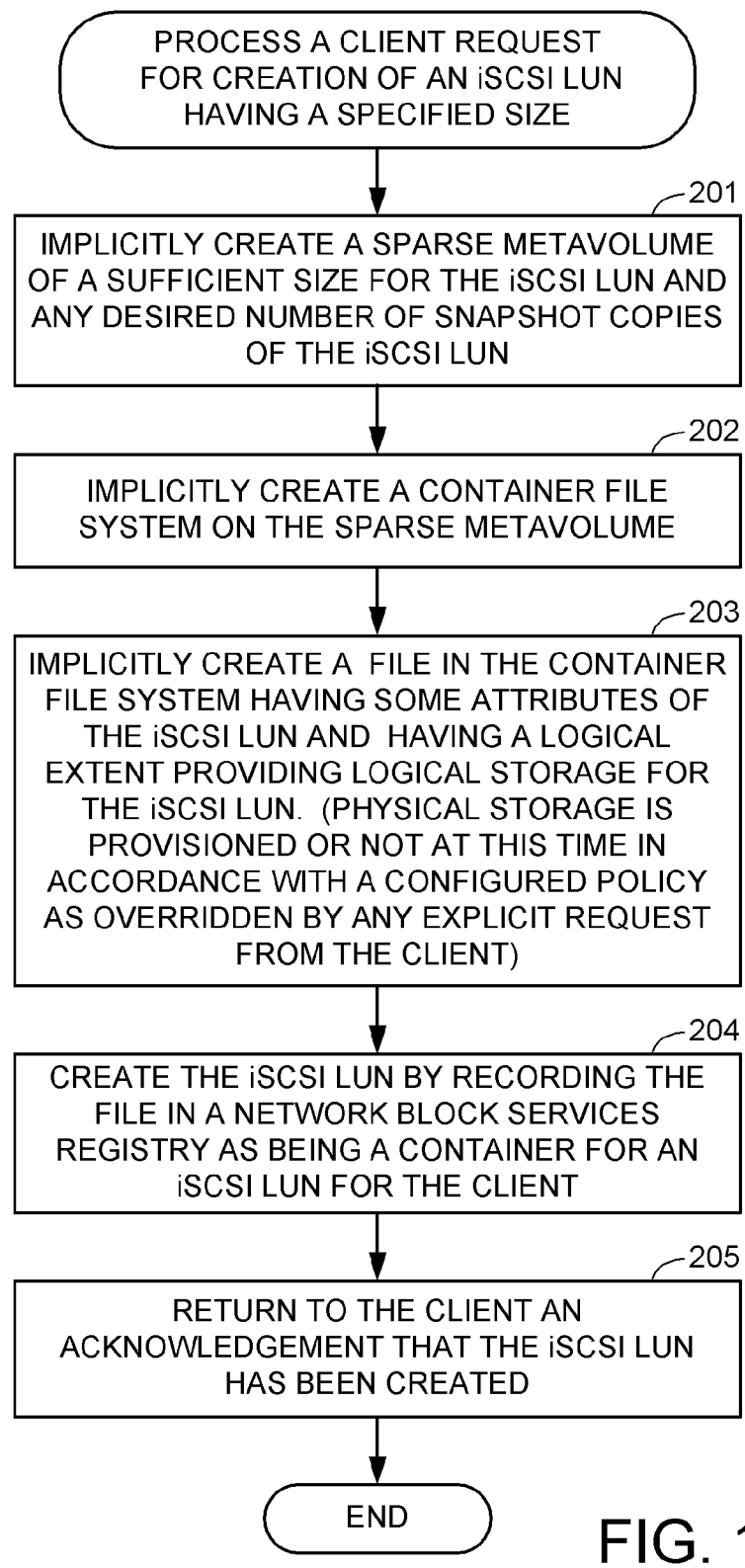
FIG. 18 is a flowchart of a procedure for implicitly creating a sparse metavolume and a container file system built on the sparse metavolume when a client requests creation of an iSCSI LUN.

FIG. 18 shows how the container file systems and sparse metavolumes program layers (45 and 37 in FIG. 2) are called by the NBS module (42 in FIG. 2) to implicitly create a sparse metavolume and a container file system when a client requests the NBS nodule to create an iSCSI LUN having a specified size. In a first step 201, the sparse metavolumes layer implicitly (i.e., without an explicit request from the client) creates a sparse metavolume having a logical extent of a sufficient size for the iSCSI LUN and any desired number of snapshot copies of the iSCSI LUN. In step 202, the container file systems layer implicitly creates a container file system on the sparse metavolume. In step 203, the container file systems layer implicitly creates a file in the container file system having some attributes of the iSCSI LUN (such as the client as owner and file type as LUN container) and having a logical extent providing logical storage for the iSCSI LUN. Physical storage for the file containing the iSCSI LUN is provisioned or not at this time in accordance with a configured policy as overridden by any explicit request from the client. In step 204, the NBS module creates the iSCSI LUN by recording the file in the network block services registry (59 in FIG. 2) as being a container for an iSCSI LUN for the client. In step 205, the NBS module returns to the client an acknowledgement that the iSCSI LUN has been created, and the procedure is finished.

Figure 19:
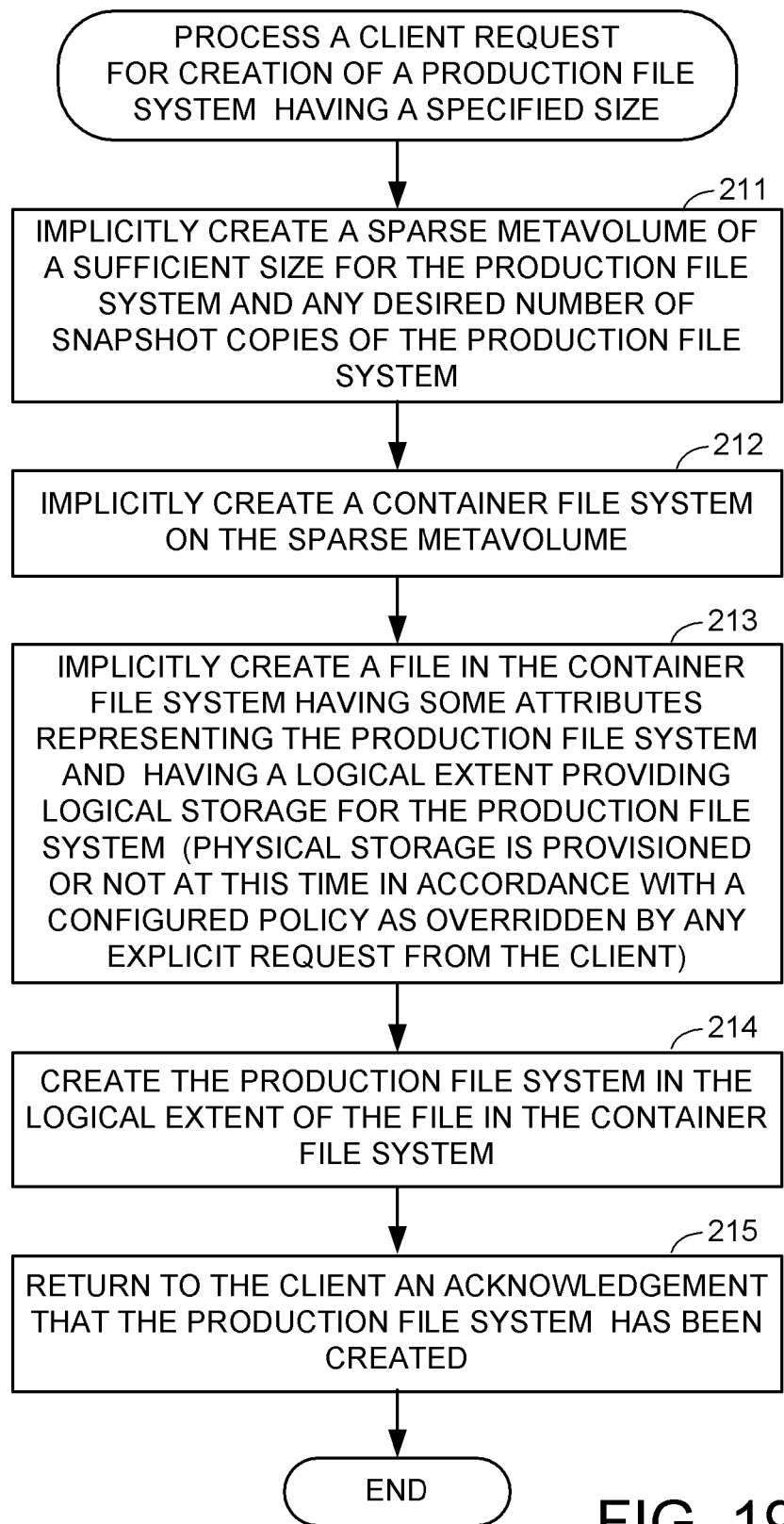
FIG. 19 is a flowchart of a procedure for implicitly creating a sparse metavolume and a container file system built on the sparse metavolume when a client requests creation of a production file system.

FIG. 19 shows how the container file systems and sparse metavolumes program layers (45 and 37 in FIG. 2) are called by the UxFS module (44 in FIG. 2) to implicitly create a sparse metavolume and a container file system when a client requests the UxFS module to create a production file system. In a first step 211, the sparse metavolumes layer implicitly creates a sparse metavolume having a logical extent of a sufficient size for the production file system and any desired number of snapshot copies of the production file system. In step 212, the container file systems layer implicitly creates a container file system on the sparse metavolume. In step 213, the container file systems layer implicitly creates a file in the container file system having some attributes of the production file system (such as the client as owner and file type as file system container) and having a logical extent providing logical storage for the production file system. Physical storage for the file containing the production file system is provisioned or not at this time in accordance with a configured policy as overridden by any explicit request from the client. In step 214, the UxFS module creates the production file system in the logical extent of the file in the container file system. In step 215, the UxFS module returns to the client an acknowledgement that the production file system has been created, and the procedure is finished.

5. Tiering Storage Between Multiple Classes of Storage on the Same Container File System The ability to provision the sparse metavolume with slices of different AVM type provides a mechanism for storage tiering using file system awareness of storage class to provide convenient policy based migration of objects contained in the file system from one class of storage to another. The contained objects can be an iSCSI LUN, a production file system, or snapshot copies of these objects. The slice map stores the AVM type of each slice in the container file system itself. The storage reorganizer determines which slices should be migrated based on policy. For example, for storage tiering, the following policies can be used: (a) move snapshots off the class of storage of the production object and onto a different class of storage; (b) direct new writes to a specified class of storage; or (c) writes targeting a particular storage object are targeted to a particular type of storage slice.

The tiering of storage for one container file system can use different classes of storage in a more cost effective manner as the service level expectations change during the lifetime of a data object. This tiering of storage enables data to be migrated from one class of storage to another while read and write access is maintained in order to move the data object to a class of storage that is more cost effective for the required level of performance. A different class of storage can become more cost effective because the required service level of the data object typically decreases as a data object approaches the end of its active lifetime. A different class of storage can also become more cost effective because improvements in storage technology have been making new classes of storage commercially available for expansion or replacement of storage in existing file servers.

Figure 20:
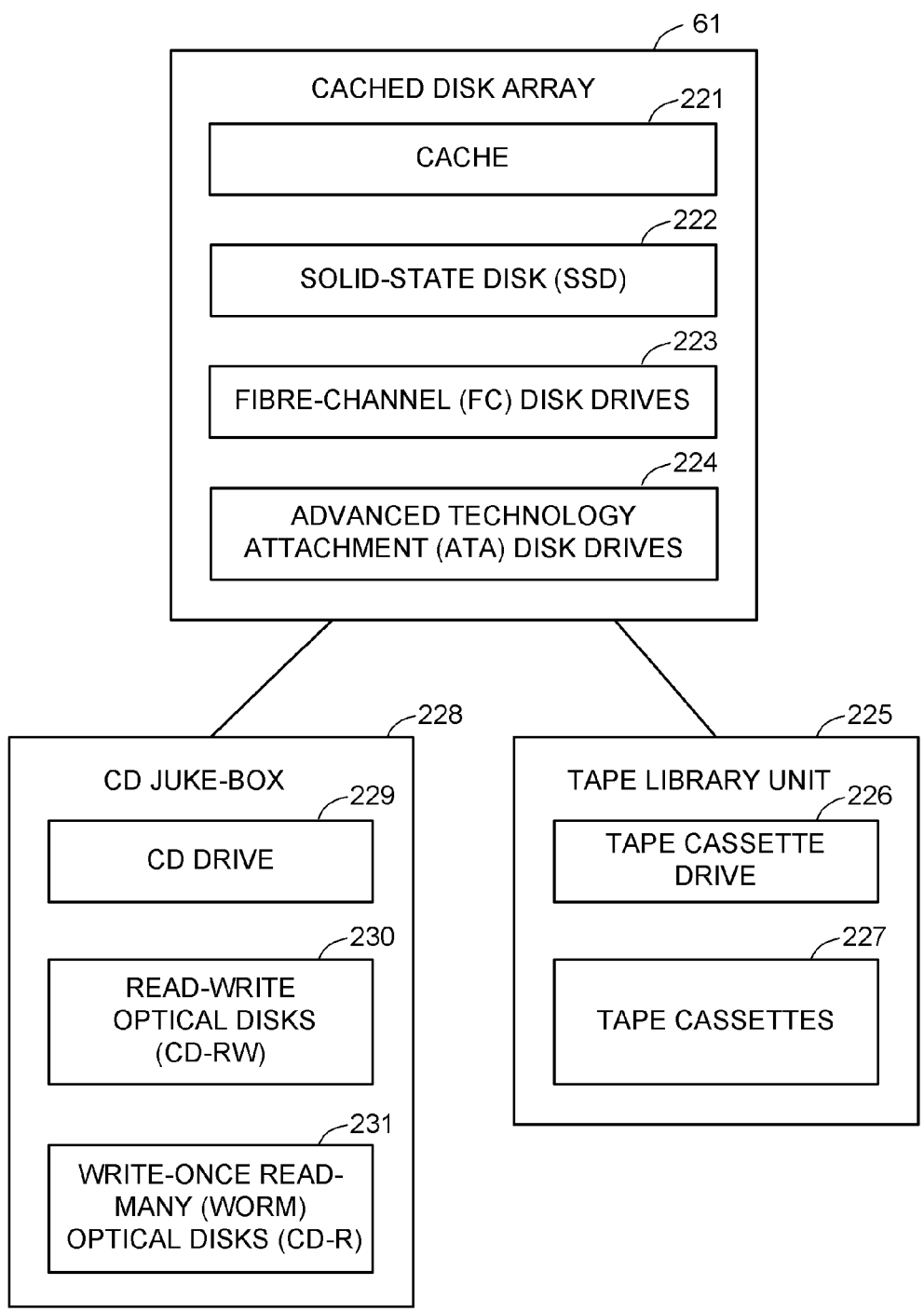
FIG. 20 is a block diagram showing various kinds of storage provided by a cached disk array and attached backup storage devices.

FIG. 20 shows different classes of storage in the cached disk array 61 and associated backup storage systems. The cached disk array 61 includes a random-access cache memory 221, solid-state storage 222 emulating disk storage (SSD), Fibre-Channel disk drives 223, and advanced technology (ATA) disk drives. Thus, the AVM type could designate a tier in the storage hierarchy such as AVM=0 for slices pinned in the cache 221, AVM=1 for slices stored in the solid-state disk 122, AVM=3 for slices stored in the Fibre-Channel disk, and AVM=4 for slices stored in the ATA disk drives. A higher AVM type indicates a decrease in performance and also a decrease in the cost of storage.

Performance and cost, however, are not the sole characteristics of storage relevant to policy based data migration. For example, disk drives with a relatively slow seek time and no on-board cache but relatively high bandwidth might be entirely suitable for data streaming applications such as video-on-demand, but unsuitable for random access applications such as storage and retrieval of business enterprise documents.

A variety of mass storage devices are available for backup storage. Some of these devices are rather inexpensive but have a limited re-write capability. For example, FIG. 20 shows that the cached disk array 61 is attached to a tape unit 225 having a tape cassette drive 226 and tape cassettes 227. Such tape library units have traditionally been used for all kinds of backup applications. The cached disk array 61 is also attached to a compact disk (CD) juke-box 228 including read-write optical disks (CD-RW) 230 and write-once read-many (WORM) optical disks (CD-R) 231. By assigning a particular value of the AVM type parameter to each type of backup storage media, it is possible for the storage reorganizer to perform policy-based archiving of storage objects such as snapshot copies from a container file system to a class of backup storage most suited to the desired degree of permanence of the backup.

Figure 21:
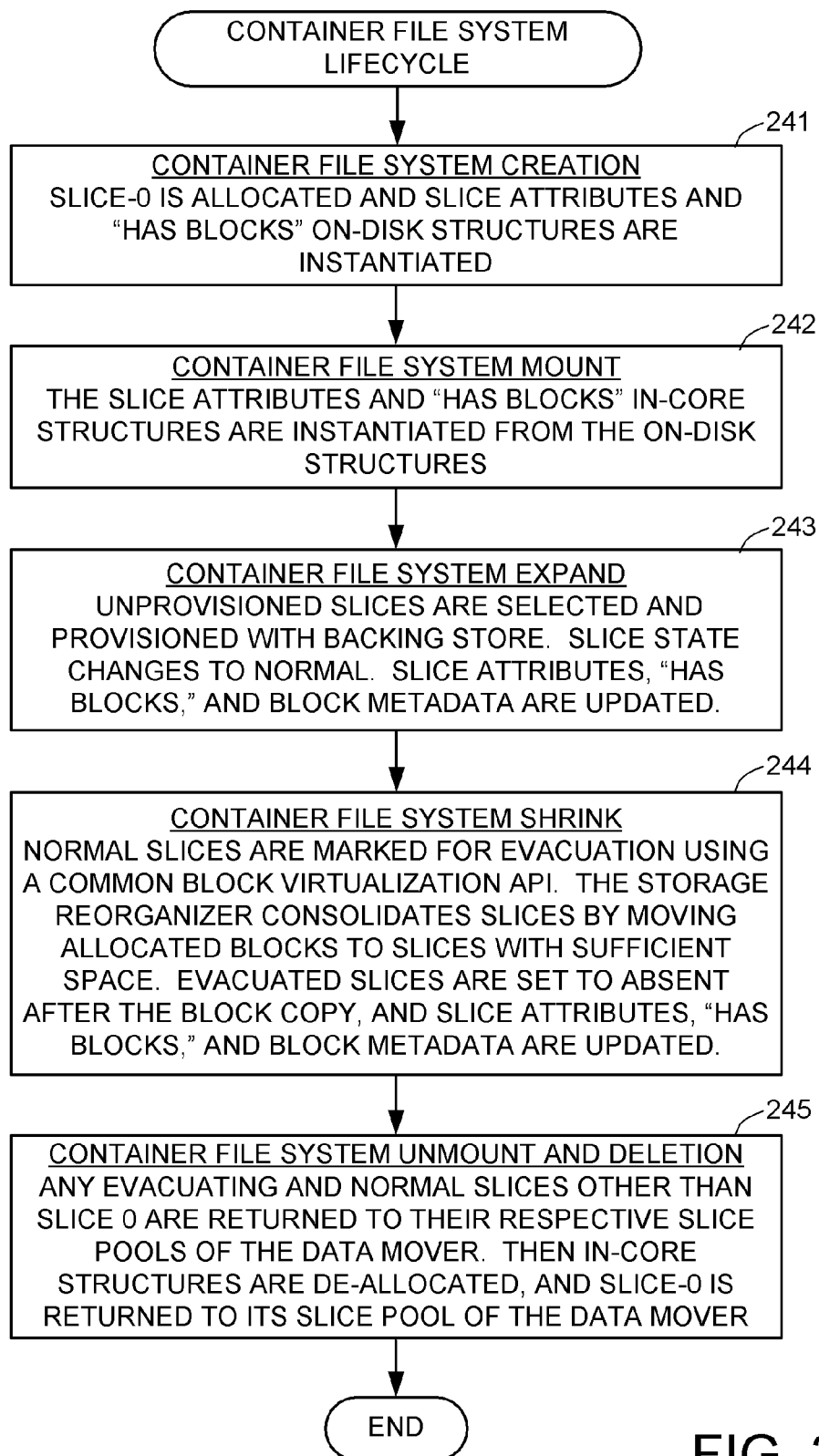
FIG. 21 is a flowchart showing a container file system lifecycle.

FIG. 21 shows the typical lifecycle of a container file system. In a first step 241, the container file system is created. A slice-0 for the container file system is allocated, and slice attributes and "has blocks" on-disk structures are instantiated. In step 242, the container file system is mounted. The slice attributes and "has blocks" in-core structures are instantiated from their respective on-disk structures.

In step 243, the container file system is expanded, as data is written to a production file system or iSCSI LUN in the container file system, and as snapshot copies of the production file system or iSCSI LUN are created. Unprovisioned slices in the underlying sparse metavolume are selected and provisioned with backing store. When a slice has been provisioned, the state of the slice changes to normal. Slice attributes, "has blocks," and block metadata are updated.

In step 244, the container file system is shrunk, typically in response to deletion of snapshot copies or in preparation for deletion of the container file system when the production file system or iSCSI LUN (and its snapshot copies, if any) are deleted. Slices having the state of "normal" are marked for evacuation using a common block virtualization API. The storage reorganizer consolidates slices by moving allocated blocks to slices with sufficient space. Evacuated slices are set to absent after the block copy, and slice attributes, "has blocks," and block metadata are updated.

In step 245, the container file system is unmounted and then deleted. Any evacuating and normal slices other than slice-0 are returned to their respective slice pools of the data mover. Then in-core structures are deallocated, and slice-0 is returned to its slice pool of the data mover. At this time the life of the container file system has ended.

Figure 22:
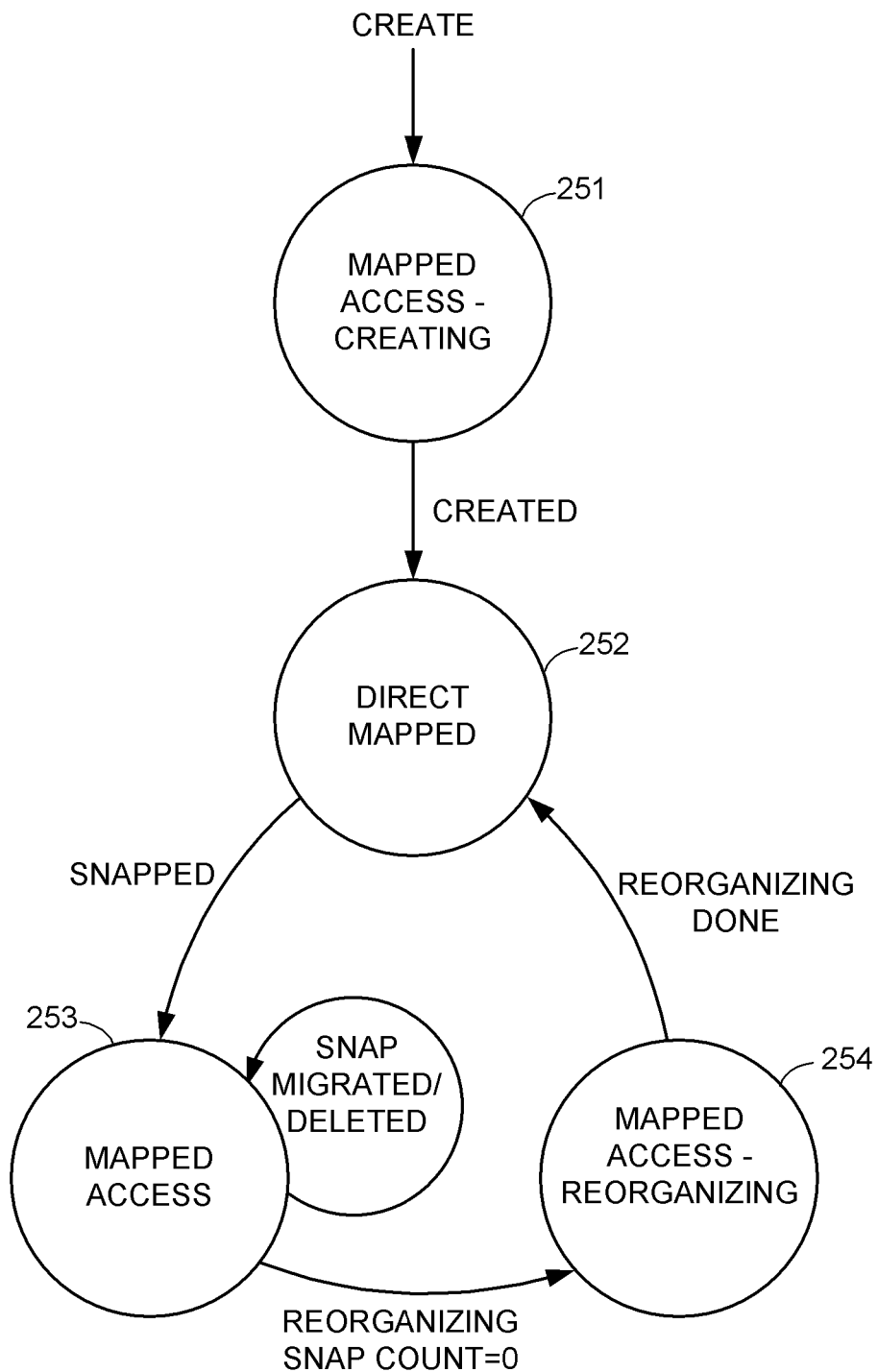
FIG. 22 is a state transition diagram for a container file for a production file system or iSCSI LUN.

FIG. 22 shows a state transition diagram for the container file (84 in FIG. 5) of a production file system or iSCSI LUN. During the creation of the production file system, file system blocks are allocated to the container file during a state 251 of creating a mapped access. When the container file has been created, but before making any snapshot copy of the container file, the container file is in a direct mapped state 252.

When a snapshot copy of the production file system or iSCSI LUN is made, the mapping for access to blocks in the file becomes more complex, because blocks become shared with the production file system or iSCSI LUN and its snapshot copy. Therefore, the state of container file changes to a mapped access state 253. In a preferred implementation, the snapshot copy method is "write somewhere else" for the first write since the snapshot at the level of the file (84 in FIG. 5) containing the production file system or iSCSI LUN. Therefore, once this container file has been snapped and the snapshot copy is to be maintained, a first write to a block in the container file is made to a newly allocated block if the existing block in the container file is indicated as shared. For example, the "version file non-owner status" bit in the block number field (160 in FIG. 10) of the inode or indirect block that points to the block indicates whether or not a first write has occurred to the block. The newly allocated block is selected from the set of blocks indicated as free in a cylinder group block bitmap for the container file system (e.g., 156 in FIG. 9).

Typically the likelihood of access to a snapshot copy decreases with the age of the snapshot copy so that it is desirable to migrate the block to storage of a different AVM type having a lower cost and lower performance. Eventually the snapshot copy is deleted, with or without migration of the snapshot copy to backup storage media such as magnetic tape or optical compact disk prior to deletion. Once a block is no longer included in any snapshot copy, the block becomes free, and can be used as a newly allocated block for the production file system or iSCSI LUN.

Often all of the snapshot copies of the production file system or iSCSI LUN are deleted, without deleting the production file system or iSCSI LUN, for example, after migrating the snapshot copies to archival storage. In this situation, the state of the container file can be changed back to direct mapped 252. However, the deletion of all of the snapshot copies tends to cause a high level of defragmentation of the storage allocated to the container file system. Therefore, before reaching the "direct mapped" state, the container file is kept in a mapped access-reorganizing state 254 in which the storage reorganizer performs a defragmentation and space reclamation process of selecting configured slice objects to be removed and migrating blocks from the configured slice objects to be removed to configured slice objects to be kept. This defragmentation and space reclamation process can also be used whenever one or more snapshot copies are deleted, whenever a file is truncated, or at periodic intervals when the file server is lightly loaded by client activity.

Figure 23:
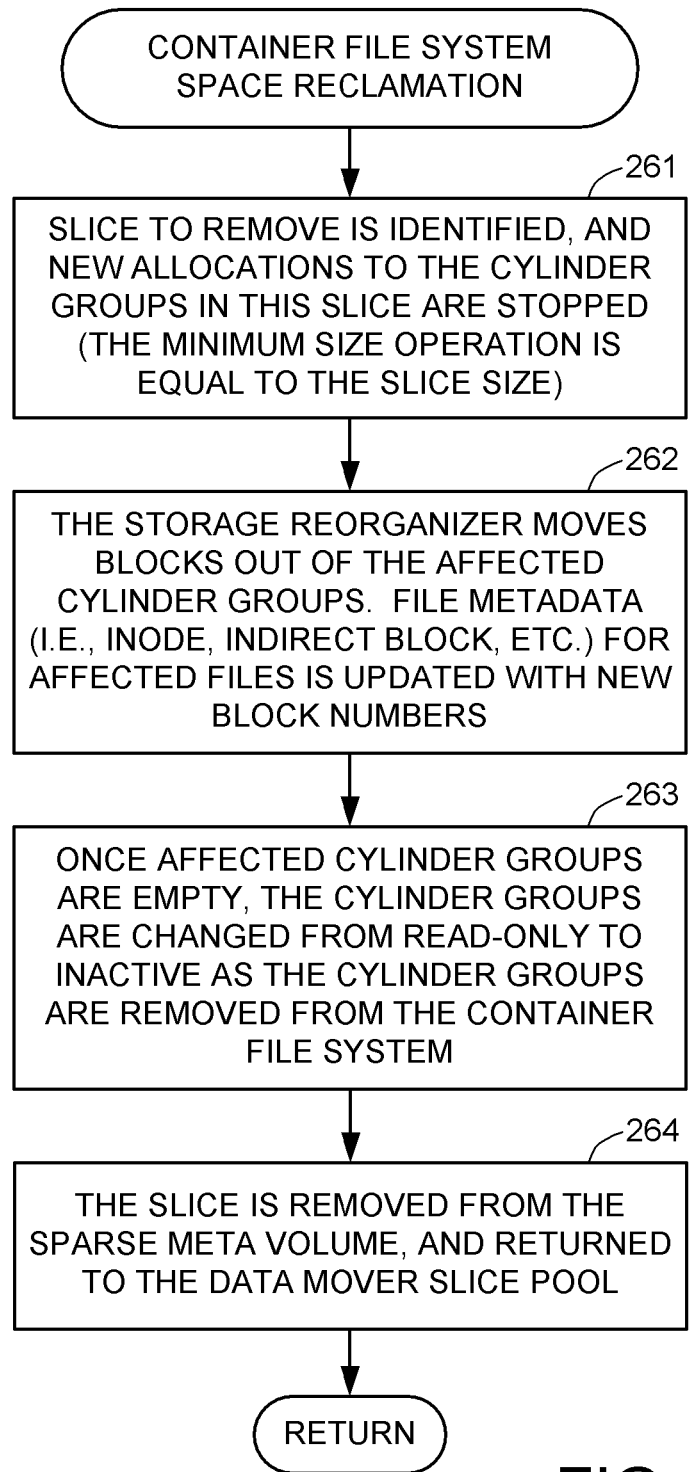
FIG. 23 is a flowchart of a procedure for container file system space reclamation.

FIG. 23 shows the container file system space reclamation process. In a first step 261, a slice to remove is identified, and new allocations to the cylinder groups in this slice are stopped. (The minimum size for the space reclamation is the slice size.) In step 262, the storage reorganizer moves blocks out of the affected cylinder groups. The storage reorganizer copies the contents of each block in the slice to be removed to a newly allocated block in another provisioned slice. The storage reorganizer updates file metadata (i.e., inode, indirect block, etc.) for affected files with the new block numbers. In step 263, once the affected cylinder groups are empty, the cylinder groups are changed from a state of read-only to inactive as the cylinder groups are removed from the container file system. Finally, in step 264, the slice is removed from the sparse metavolume, and returned to the data mover slice pool.

Figure 24:
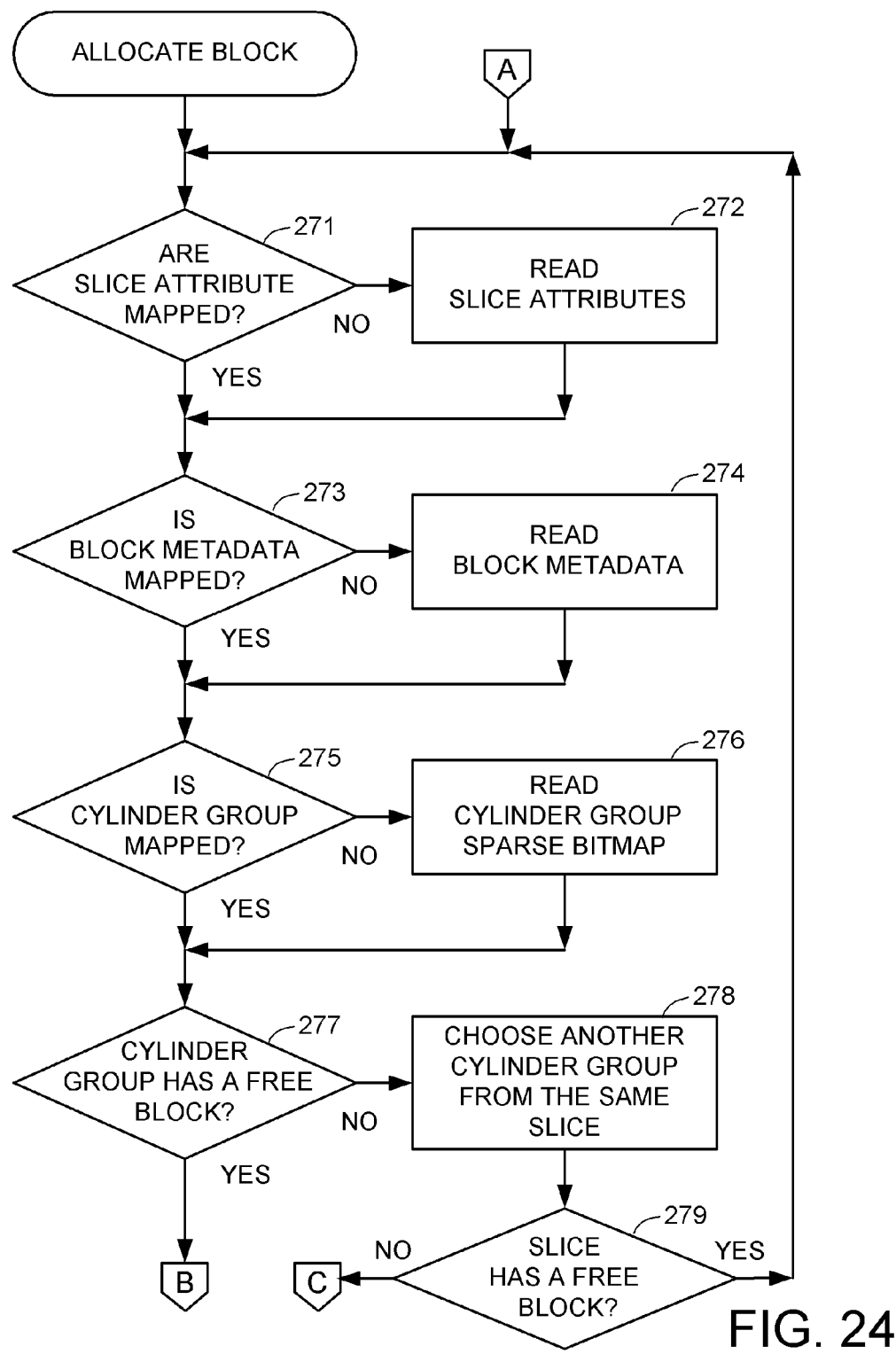
FIGS. 24, 25 and 26 together comprise a flowchart of a procedure for allocation of a block to a container file system.
Figure 25:
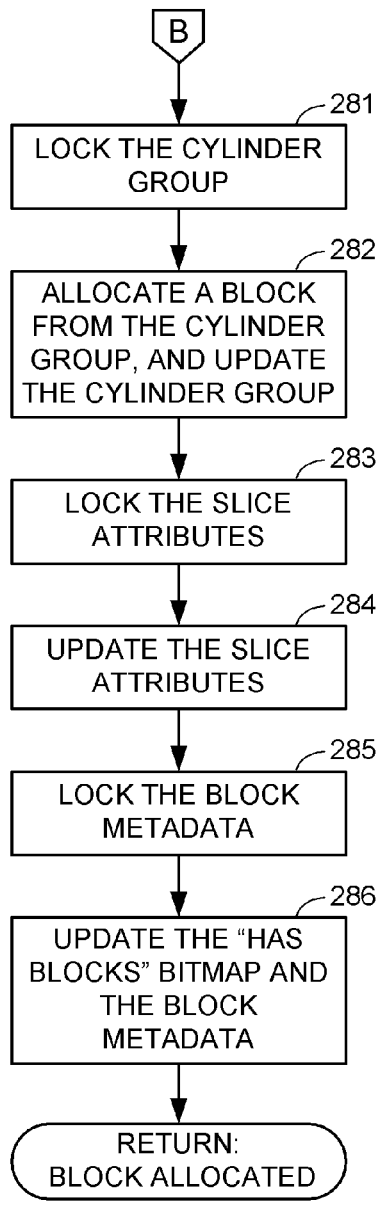
Figure 26:
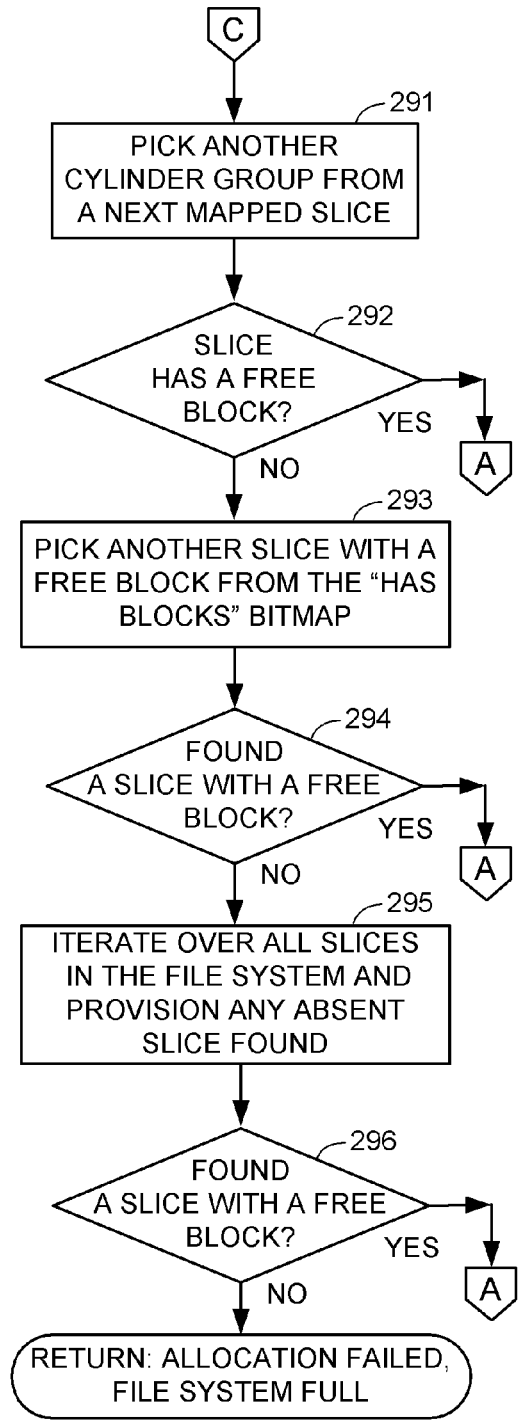

FIGS. 24, 25, and 26 show the process of selecting and allocating a block of a container file system. In addition to space reclamation, this process is used when allocating blocks for creating a new file or extending a file. At any given time, there is a current cylinder group in a current slice from which an attempt is made to allocate new blocks. The process begins by gathering information about the current slice, the current cylinder group in the slice, and free blocks in the current cylinder group. In a first step 271, the in-memory slice attributes structure is accessed to determine whether or not the slice map for the current cylinder group is in memory. If not, then execution branches to step 272 to read the slice attributes from disk and bring them into memory. Once the slice attributes are in memory, execution continues from step 271 or step 272 to step 273.

In step 273, if block metadata for the current cylinder group is not in memory, then execution branches to step 274 to read the block metadata from disk and put it in memory. Once the block metadata is in memory, execution continues from step 273 or step 274 to step 275. In step 275, if the sparse bitmap for the current cylinder group is not in memory, then execution branches to step 276 to read the sparse bitmap for the current cylinder group and put it in memory. Once the cylinder group sparse bitmap is in memory, execution continues to step 277.

In step 277, if the cylinder group sparse bitmap indicates that there are no free blocks in the cylinder group, then execution branches to step 278 to choose another cylinder group from the same slice. Another cylinder group from the same slice should have a free block if the slice has a free block, in which case execution loops from step 279 back to step 271 to get the slice attributes, block metadata, and cylinder group sparse bitmap for another cylinder group of the current slice. If the slice does not have a free block, then another slice is selected, as further described below with reference to FIG. 26.

In step 277, once a cylinder group has been found having free blocks, execution continues from step 277 to step 281 of FIG. 25. In step 281, the in-memory cylinder group sparse bitmap is locked, and in step 282, a block from the cylinder group is allocated, and the cylinder group sparse bitmap is updated. In step 283, the in-memory slice attributes for the cylinder group are locked, and in step 284, summary information is updated in the in-memory slice attributes for the cylinder group. In step 285, the in-memory block metadata for the cylinder group is locked, and in step 286, the "has blocks" bitmap and the block metadata is updated. After step 286, execution returns with a block from the cylinder group being allocated. The locks on the on the in-memory slice attributes, has blocks, and block metadata buffers are released when sync threads clean the buffers by logging changes in a UFS log transaction and writing the changes to the corresponding on-disk structures.

In step 279 of FIG. 24, if the current slice has no free blocks, then execution continues to step 291 of FIG. 26 to pick another cylinder group from a next mapped slice in the logical extent of the container file system. If the slice has a free block, then in step 292, execution loops back to step 271 of FIG. 24. If the slice does not have any free blocks, then execution continues from step 292 to step 293 to pick another slice with a free block from the "has blocks" bitmap. In step 294, if a slice is found with a free block, then execution loops back to step 271 of FIG. 24. If no slice having a free block is found in the "has blocks" bitmap, then execution continues from step 294 to step 295 to iterate over all slices in the container file system looking for unprovisioned slices and to provision a slice once an unprovisioned slice is found. In step 296, if a slice is found with a free block, then execution loops back to step 271 of FIG. 24. Otherwise, the file system is full and execution returns an error indicating that the block allocation process has failed.

Figure 27:
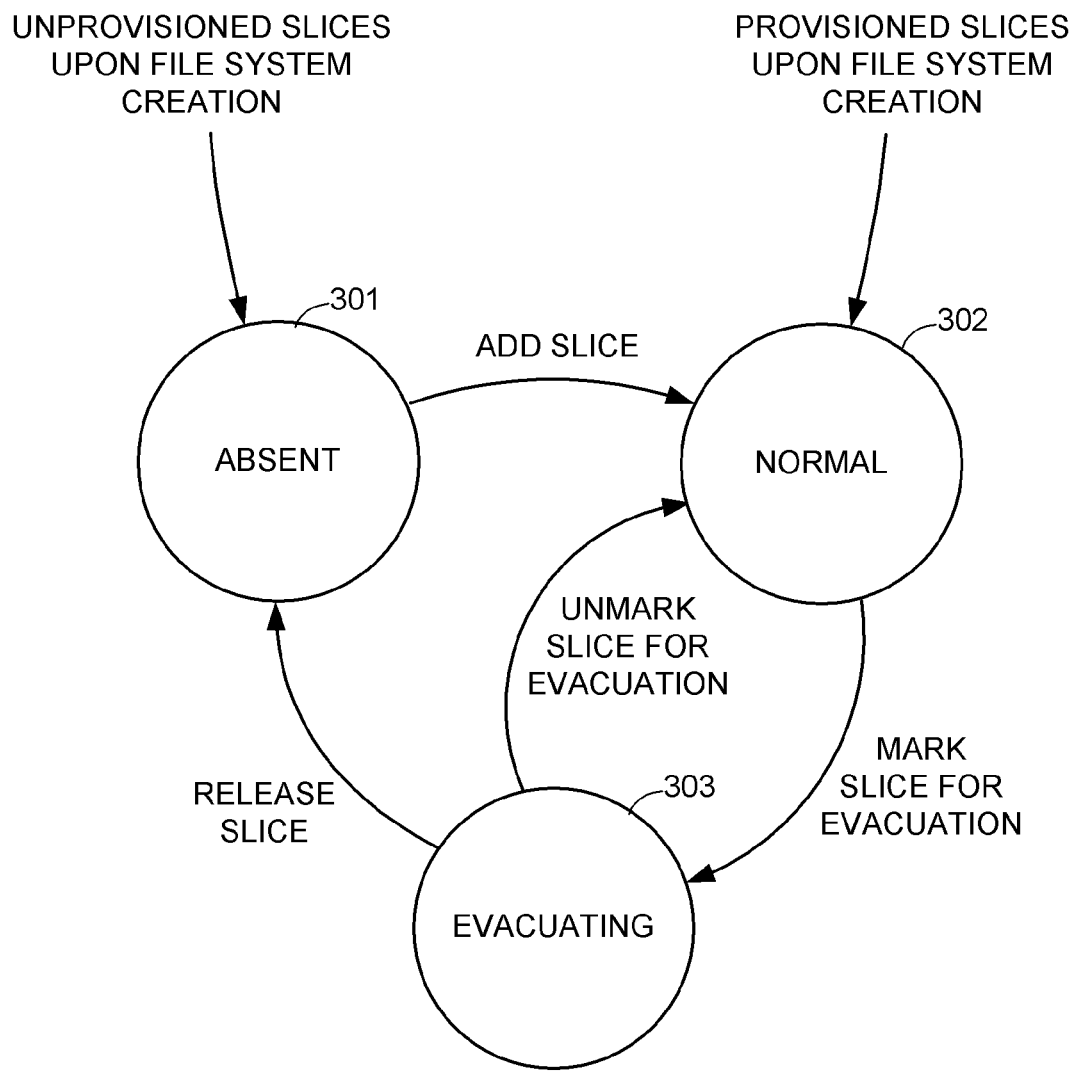
FIG. 27 is a state transition diagram for a slice in the logical extent of a sparse metavolume.

FIG. 27 shows a state transition diagram for a slice of a sparse metavolume. A slice of a sparse metavolume has an absent state 301, a normal state 302, or an evacuating state 303. Upon creation of a sparse metavolume for a container file system, only the provisioned slices are marked "normal." Unless otherwise specified, a sparse metavolume is only provisioned with its slice-0 upon creation. Unprovisioned slices, which constitute holes in the sparse metavolume, are marked "absent." As slices of the sparse metavolume are provisioned, they are marked "normal." A client may invoke a common bloc virtual (CBV) "add slice" API to provision an absent slice. The container file systems layer may start allocating blocks from the cylinder groups of the newly provisioned slice after initializing the cylinder groups and updating relevant block metadata, slice attributes, and "has blocks" entries.

To shrink a container file system, data blocks are transferred from some evacuating slices to other slices of the file system. The evacuation process can be aborted if new client I/O is performed on the evacuating slices. In this case, the client may invoke a CBV "unmark slices for evacuation" API to reset a slice state to normal. The storage reorganizer evacuates any slices marked for evacuation. After the storage reorganizer successfully completes the evacuation process, it invokes the CBV "release slice" API, which marks the slice "absent."

Figure 28:
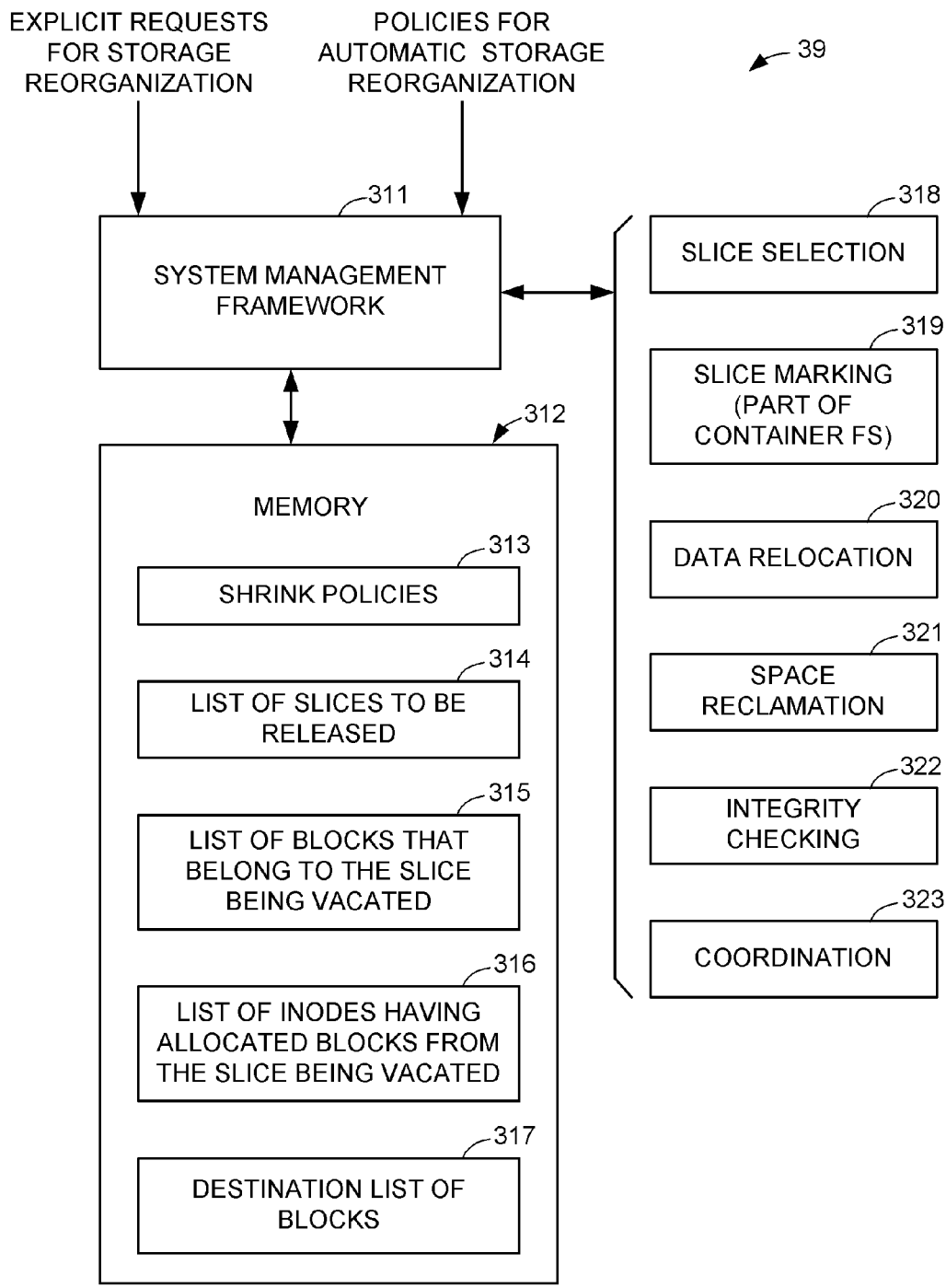
FIG. 28 is a block diagram of a storage reorganizer.

FIG. 28 shows the storage reorganizer 39. The storage reorganizer includes a system management framework 311 providing a set of interfaces to the CBV API library, the container file systems layer, and the sparse metavolumes layer. The system management framework 311 receives explicit requests for storage reorganization from the CBV API library, and also receives policies for automatic storage reorganization from the CBV API library. The system management framework is responsive to state changes resulting from actions of the container file systems layer and the sparse metavolumes layer in order to implement the policies for automatic storage reorganization.

In order to provide some independence from the actions of the container file systems layer and the sparse metavolumes layer, the systems management framework maintains it own in-memory data structures 312 of information that the storage reorganizer needs for determining the reorganization tasks to perform. The in-memory data structures 312 include shrink policies 313, a list 314 of slices to be released, a list 315 of blocks that belong to the slice being vacated, a list 316 of inodes having allocated blocks from the slice being vacated, and a destination list of blocks 317. The reorganization tasks are performed by respective program routines including program routines for slice selection 318, slice marking 319, data relocation 320, space reclamation 321, integrity checking 322, and coordination 323 to avoid conflict with operations of the container file systems layer and the sparse metavolumes layer.

Figure 29:
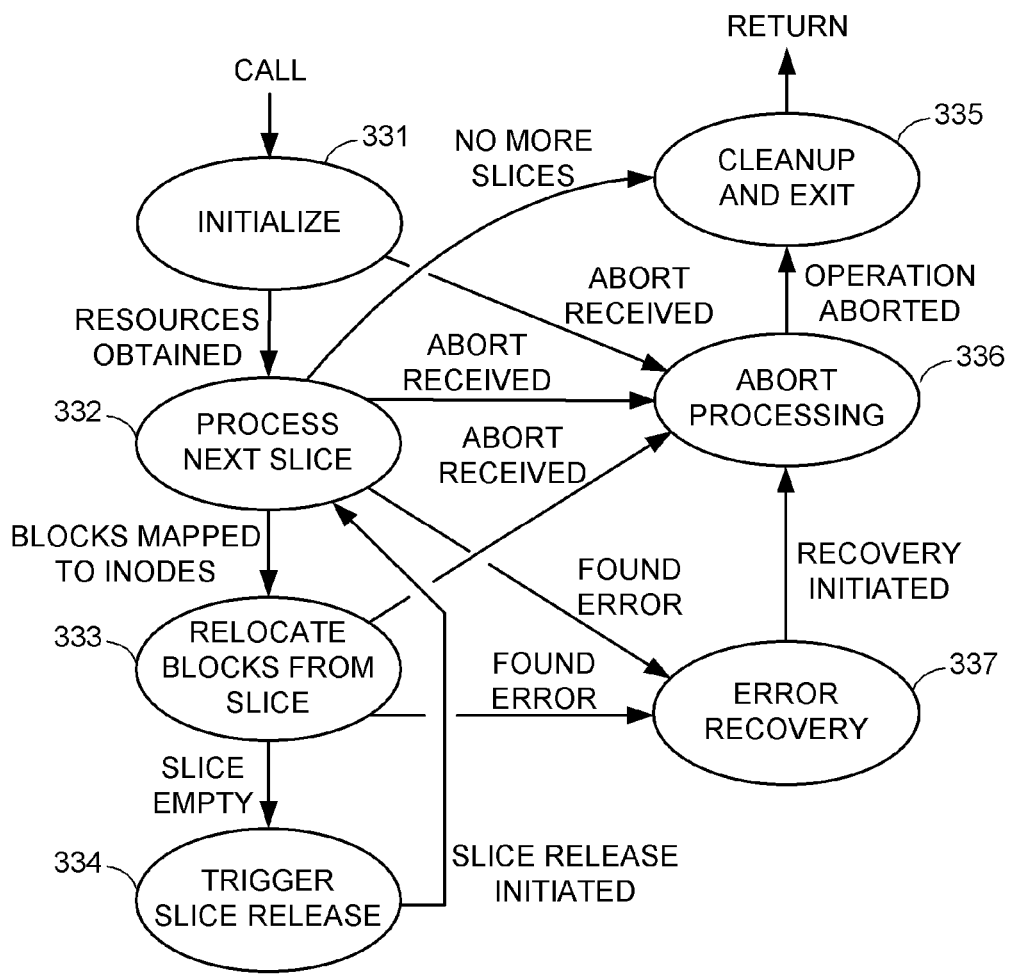
FIG. 29 is a state transition diagram for the storage reorganizer of FIG. 28.

FIG. 29 shows state transitions of the storage reorganizer. Reorganization of storage for a container file system begins with an initialization state 331 in response to an explicit call or upon detection of an event or condition triggering reorganization in accordance with a shrink policy (313 in FIG. 28) in memory (312 in FIG. 28). In the initialization state, resources are sought for the reorganization process (such as the lists 314) including slice selection (318 in FIG. 28) to obtain an identification of at least one provisioned slice to released, resulting in a list of slices to be released (314 in FIG. 28).

Once resources are obtained, a next slice is processed in a state 332 by accessing cylinder group bitmaps of cylinder groups in this next slice to obtain a list of blocks that belong to the slice being vacated (315 in FIG. 28), and reverse mapping these blocks to the inodes by accessing the per-block metadata for the cylinder groups in this slice to obtain a list of inodes having allocated blocks from the slice (316 in FIG. 28).

Once the blocks in the slice have been mapped to inodes, data relocation (320 in FIG. 28) occurs in state 333 by copying data from the old blocks in the storage of the slice to newly allocated blocks in another provisioned slice, and substituting the block numbers of the new blocks for the block number of the old blocks in the inodes or indirect blocks containing the block numbers of the old blocks. (The newly allocated blocks are indicated in the destination list 317 of blocks in FIG. 28.) When a block is being relocated, the "relocated extent" bit in the block number field (FIG. 10) is set so that the container file systems layer will hold off any writes to the block until the relocation of the block is finished. Therefore, client access to a block is blocked only when a block is actually being copied. The storage reorganizer calls a CBV API to do the copying of the block data from the source storage device of the slice being vacated to a destination storage device without a read-write cycle.

Once the slice has become empty by the data relocation, slice release is triggered in state 334. The system management framework (311 in FIG. 28) communicates with the sparse metavolumes layer to remove a specified slice from the volume structure and to relocate slice-0 if needed. Once slice release has been initiated, the next slice is processed in state 332. If there are no more slices to be released, then a cleanup state occurs 335 and execution returns.

During the initialization state 331, the next slice processing state 332, or the block relocation state 333, it is possible for the storage reorganizer to receive an abort request. In this case, an abort processing state 336 occurs, and once the operation is aborted, the cleanup and exit state 335 occurs. If an error is found during the processing of the next slice in state 332 or during the relocation of blocks from the slice in state 333, then an error recovery sate 337 occurs, and once recovery is initiated, the abort processing state 336 occurs.

The slice selection routine (318 in FIG. 28) may use various policies for choosing the slices to release. The logical "closeness" of the provisioned slices in the logical extent of the sparse metavolume is not a valid criterion for selecting a slice to be released, because the logical closeness is freely selectable by the logical-to-physical storage mapping of the slices that is performed by the sparse metavolumes layer. The default policy is to use the occupation of the slice. For example, the storage reorganizer chooses the least occupied slices and marks them for release.

Another relocation policy is to use the type of storage, as indicated in the slice map by the AVM type for each provisioned slice. For example, for relocating storage from a source tier to a destination tier, a source AVM type value is specified and a destination AVM type value is specified in a relocation request to the storage reorganizer. The relocation policy could also specify other conditions for automatically triggering the reorganization at some future time, such as an age limit for a snapshot copy to be retained in the storage of the source AVM type.

Another relocation policy is to use a specific storage device on which the slice is located. For example, it may be desirable to evacuate some old disk drives to replace them with new disk drives having a higher storage capacity or increased performance. By using policy based reorganization, specific storage devices can be evacuated during the snapshot copy lifecycle, so that there will be no noticeable loss of performance of the file server during the copying of data out of the disk drives to be removed. The storage devices to be removed are reverse mapped to provisioned slices configured from the storage devices, and then these provisioned slices are marked for evacuation.

It is possible that when storage is to be reorganized, more than one slice has been chosen and marked for release. When this occurs, an additional policy for space release is used for governing how the slices marked for release are evacuated. If the only reason for the storage reorganization is to avoid defragmentation, then the blocks to copy from the slices should be chosen to avoid fragmentation as much as possible, even at the cost of releasing slices slowly. For example, the additional policy should be to evacuate blocks from the same inode that are spread across more of the slices to be evacuated, in order to copy the data for this same inode to new blocks in the same provisioned slice not marked for evacuation.

If the reason for the storage reorganization policy is for relocation to move the data to a different AVM type of storage for a savings of cost or an increase in performance, then the additional policy should be to release slices as soon as possible, even at the cost of some fragmentation. According to this policy, one slice will be completely vacated before another will be processed. As a result, it is likely that some blocks allocated to the inode from the next slice will be relocated at a later time. The outcome can be that two sets of source blocks were from adjacent slices before relocation but are located in slices that are adjacent after relocation.

6. Self Healing File System

The container file system, as described above, provides a mechanism for detecting and containing faults within the contained objects and permits recovery from corruptions without having to bring down the container file system or the file server. Early detection of corruption contains or limits the extent of the damage, and smart isolation of faults at the contained object level improves data availability by constraining the access to the corrupted part of the object. In place recovery ensures that the corruption is repaired on the fly without having to bring down the container file system and therefore improves data availability.

The container file system is equipped with file block checksums and regenerative metadata infrastructure for improving the depth of recovery and minimizing data loss. The container file system also provides fault isolation for elimination of induced file server panics in order to improve service and data availability. Moreover, the container file system proactively detects and contains faults, errors, and corruptions, and does in place, online, and non-intrusive recovery.

The container file system provides early detection of various kinds of faults and errors, including but not limited to metadata inconsistency, silent on disk corruptions, in core memory corruptions, and file system level runtime dead locks. In particular, the container file system detects corruptions of the sparse map of the file system, cylinder group overhead (headers, bitmaps, etc), individual inodes, indirect blocks, and other extended metadata structures like access control lists (ACL) and quotas. The detection of such object level corruption is enabled by an object cyclic redundancy code (CRC) checksum and a compound block level CRC for tracking block level corruptions. The CRC for these objects and the contained blocks (along with other objects) are checked at various times throughout the life cycle, such as when reading the object from disk, and when updating the object in memory.

Automatic recovery from corruption of a contained object includes regeneration of metadata of the object. The container file system can recover the slice map (from the volume database and the cylinder group map), cylinder groups (from the block metadata, used inodes) partial inodes (from block metadata) and indirect blocks (from block metadata). To support error detection and metadata regeneration, the container file system maintains the per-block metadata (153 in FIG. 11). The cylinder group maintains the per-block metadata for the blocks that it owns. The file system populates the per-block block metadata as and when a block is allocated—either for an indirect block or any other metadata block. As and when the metadata objects contained within the block are updated, the CRC for that block is atomically updated and committed to disk. The CRC stored in the per-block metadata is computed and checked at various 'check-points' in the life cycle of the objects contained within the block. In addition to validating the object integrity in-place (at the time when it is referred to), the file system also runs background scrubber processes that proactively run integrity checks on the cached and on-disk file system objects using the per-block metadata.

Figure 30:
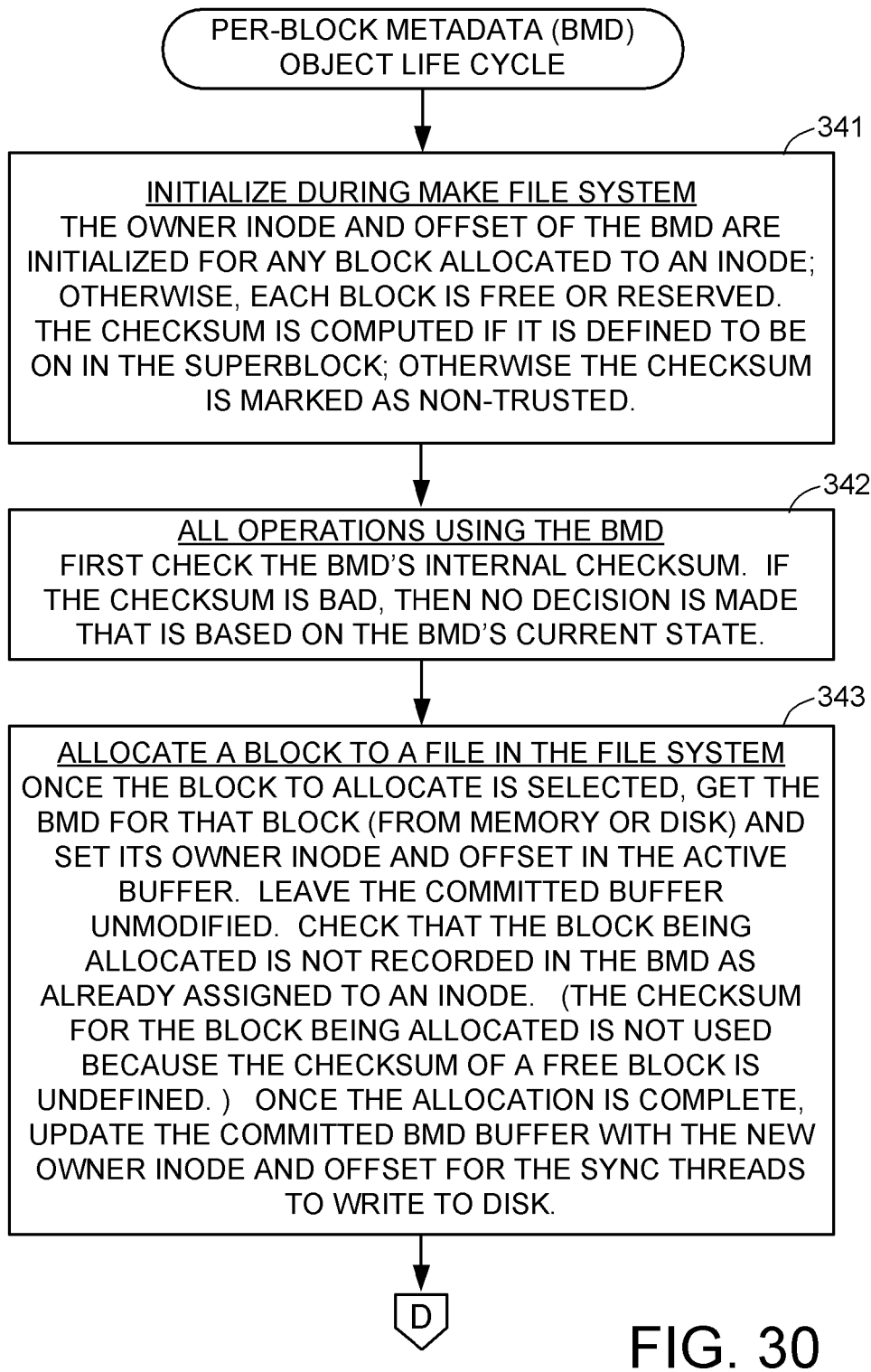
FIGS. 30, 31 and 32 together comprise a flowchart of the lifecycle of per-block metadata in a container file system.
Figure 31:
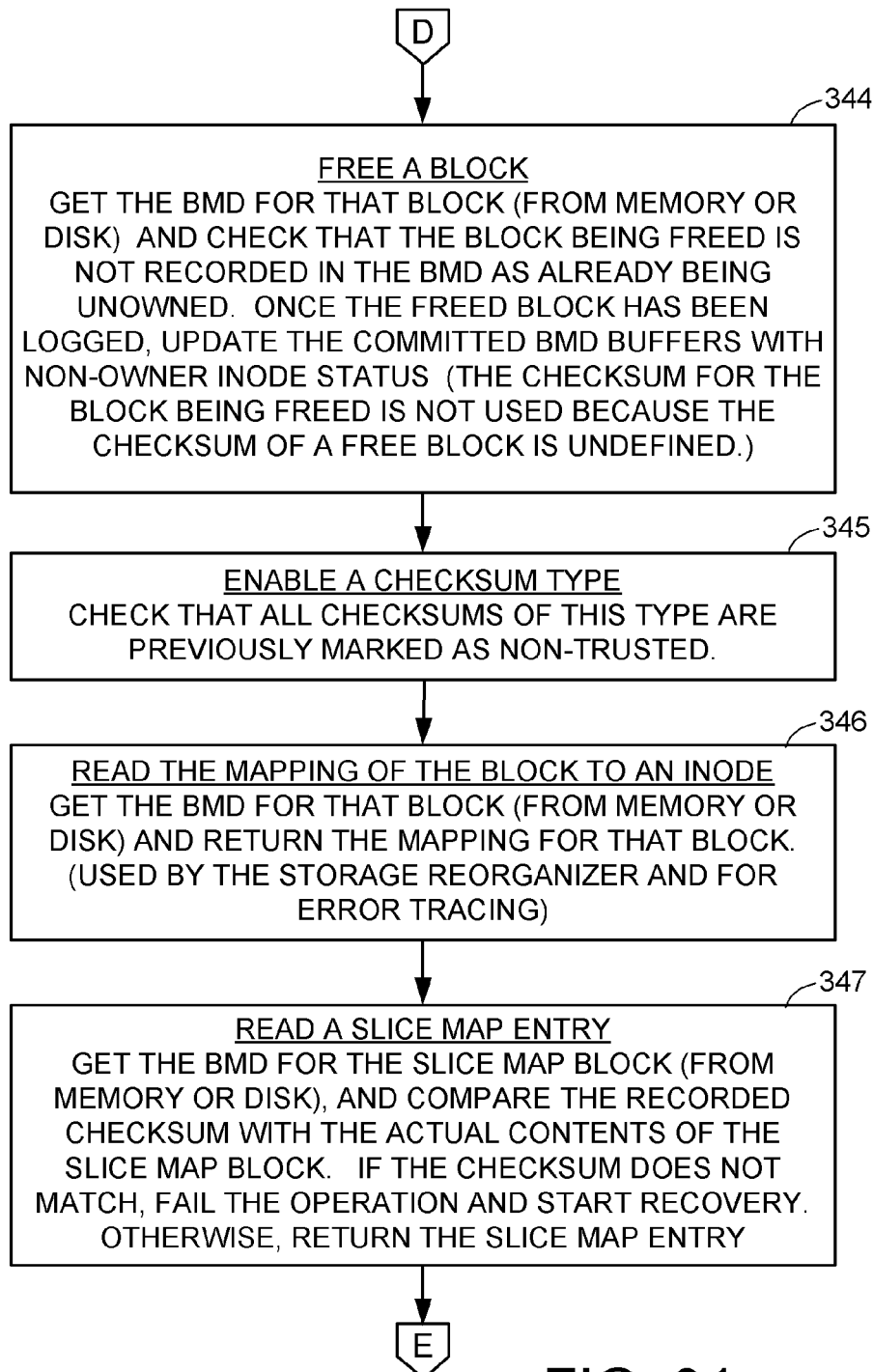
Figure 32:
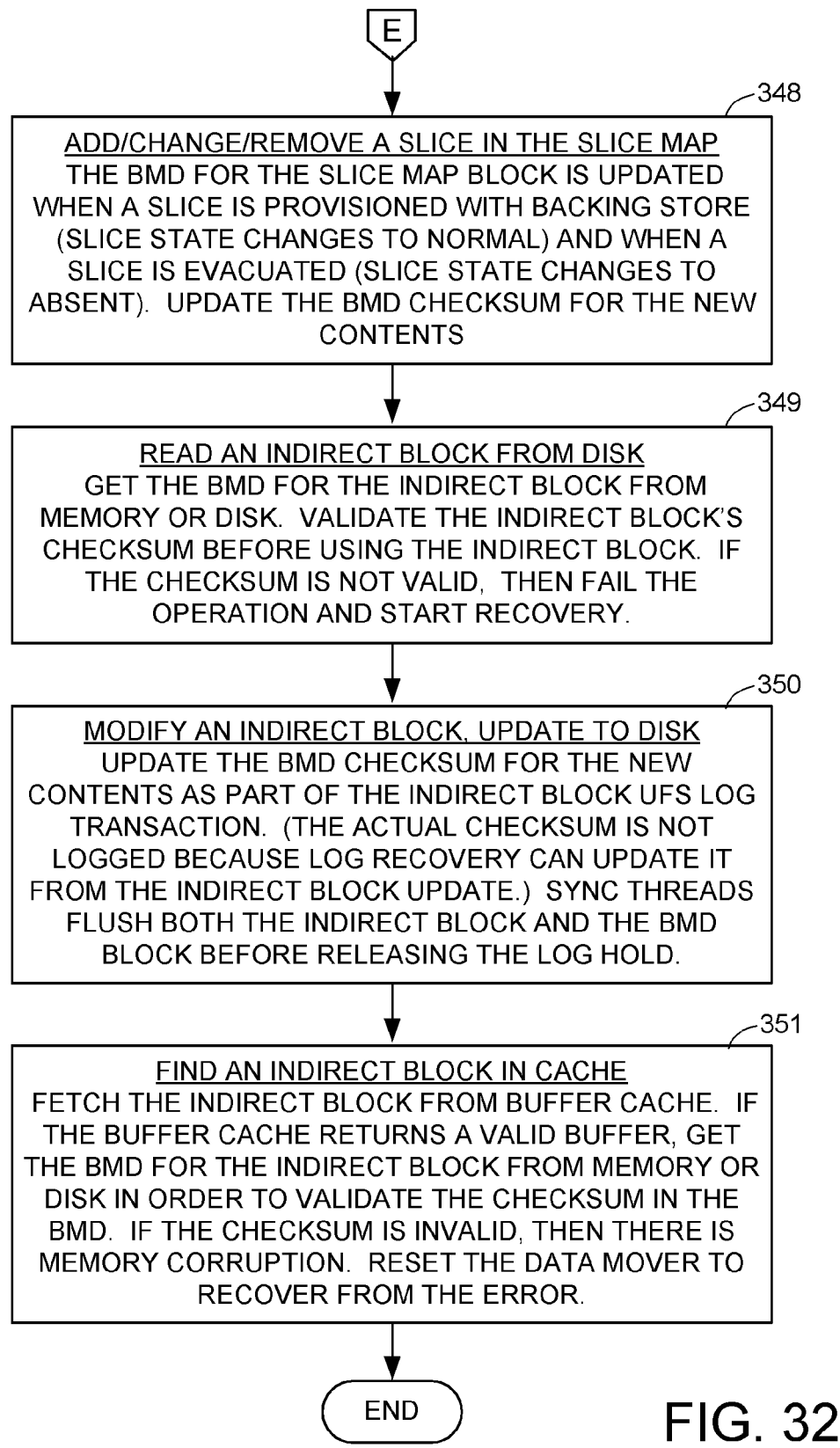

FIGS. 30-32 show the life cycle of a per-block metadata (BMD) object (153 in FIG. 11). In a first step 341 of FIG. 30, the BMD object is initialized during the task of making the container file system. The owner inode and offset of the file system block are initialized in the BMD for any file system block allocated to an inode. Otherwise, each file system block is either free or reserved. The CRC checksum is computed if it is defined to be on in the superblock; otherwise, the checksum is marked as "non-trusted." In step 342, for all operations using the BMD, the BMD's own internal checksum is checked against the contents of the BMD. If the checksum indicates an error in the BMD, then no decision is made that is based on the BMD's current state.

In step 343, the BMD for a file system block is updated when the block is allocated to a container file in the container file system. Once the block to allocate is selected, the BMD for that block is obtained (from memory or disk) and its owner inode and offset is set in the active one of the block metadata buffers (148 in FIG. 14). The committed one of the block metadata buffers is left unmodified. The BMD is checked to ensure that the block being allocated is not recorded in the BMD as already assigned to an inode. (The checksum for the block being allocated is not used at this time because the checksum of a free block is undefined.) Once the block allocation is complete, the committed one of the block metadata buffers is updated with the new owner inode and offset in order for the sync threads to write the contents of the committed buffer to disk.

In step 344, the BMD for a file system block is updated when the block is freed. The BMD for the block is obtained from memory or else disk, and checked to ensure that the block being freed is not recorded in the BMD as already being unowned. Once the freed block has been logged, the active and committed BMD buffers are updated to indicate that the block is not owned by an inode. (The checksum for the block being freed is not used because the checksum of a free block is undefined.)

In step 345, when a checksum type for the BMDs is enabled, a check is made to ensure that all checksums of this type are previously marked as non-trusted. If all checksums of this type are not previously marked as not-trusted, then an error is returned to the client requesting the enabling of the checksum type. This is done to prevent inadvertent on-off cycling of the protection provided by the checksums.

In step 346, the BMD for a file system block is accessed to read the mapping of the block to an inode. The BMD for the block is obtained from memory or disk, and that mapping for the block is returned to the requesting client or application. For example, the mapping is used by the storage reorganizer to find the inodes having blocks being relocated from a slice marked for released, and for error tracing to identify inodes having blocks found to be corrupted.

In step 347, the BMD for a file system block containing a slice map entry is read when a slice map entry is read. The BMD from memory or else disk is read to obtain the checksum for the file system block containing the slice map entry and compared against a checksum re-computed from the actual contents of the slice map block. If the checksum from the BMD does not match the checksum re-computed from the actual contents of the slice map block, then the operation needing the slice map entry is failed, and recovery is started in an attempt to restore the slice map from slice-0 and the slice marks of any other slices provisioned in the sparse metavolume of the container file system.

In step 348 of FIG. 32, the BMD for a file system block containing a slice map entry is also read when a slice map entry is updated when a slice is provisioned with backing store (the slice state changes to normal) and when a slice is evacuated (the slice state changes to absent). The checksum in the BMD for the file system block is updated with a new checksum for the new contents of the slice map block.

In step 349, the BMD for a file system block that is an indirect block is read when the indirect block is read from disk. The BMD is read from memory or else disk to obtain the checksum for the indirect block and to compare it against a checksum re-computed from the actual contents of the indirect block. If the checksum from the BMD does not match the checksum re-computed from the actual contents of the indirect block, then the operation needing the indirect block is failed, and recovery is started in an attempt to restore the container file system metadata using a "fsck" utility as further described below.

In step 350, the BMD for a file system block that is an indirect block is updated when an indirect block is modified and updated to disk. The checksum for the indirect block is updated in the BMD for the new contents of the indirect block as part of the indirect block UFS log transaction. (The actual checksum is not logged because log recovery can update the checksum from the indirect block update.) Sync threads flush both the indirect block and the BMD block before releasing the log hold.

In step 351, the BMD for a file system block that is an indirect block is read when the indirect block is fetched from buffer cache. If the buffer cache returns a valid buffer, then the BMD is read from memory or else disk to obtain the checksum for the indirect block and to compare it against a checksum re-computed from the actual contents of the indirect block. If the checksum from the BMD does not match the checksum re-computed from the actual contents of the indirect block, then there is memory corruption. The operation needing the indirect block is failed, and the data mover is reset to recover from the error.

Figure 33:
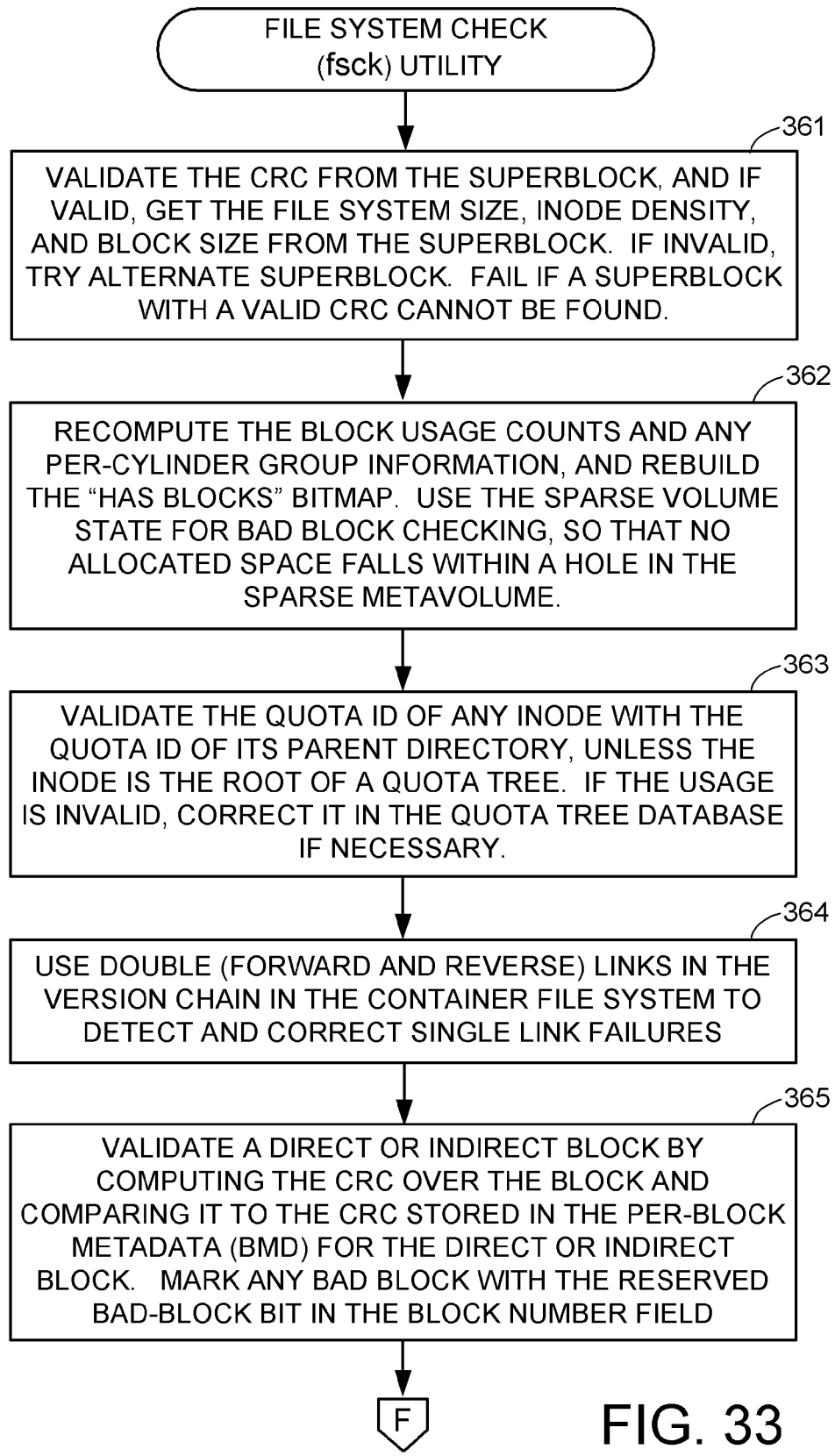
FIGS. 33 and 34 together comprise a flowchart of steps in a file system check utility using various error detection and recovery features of a container file system.
Figure 34:
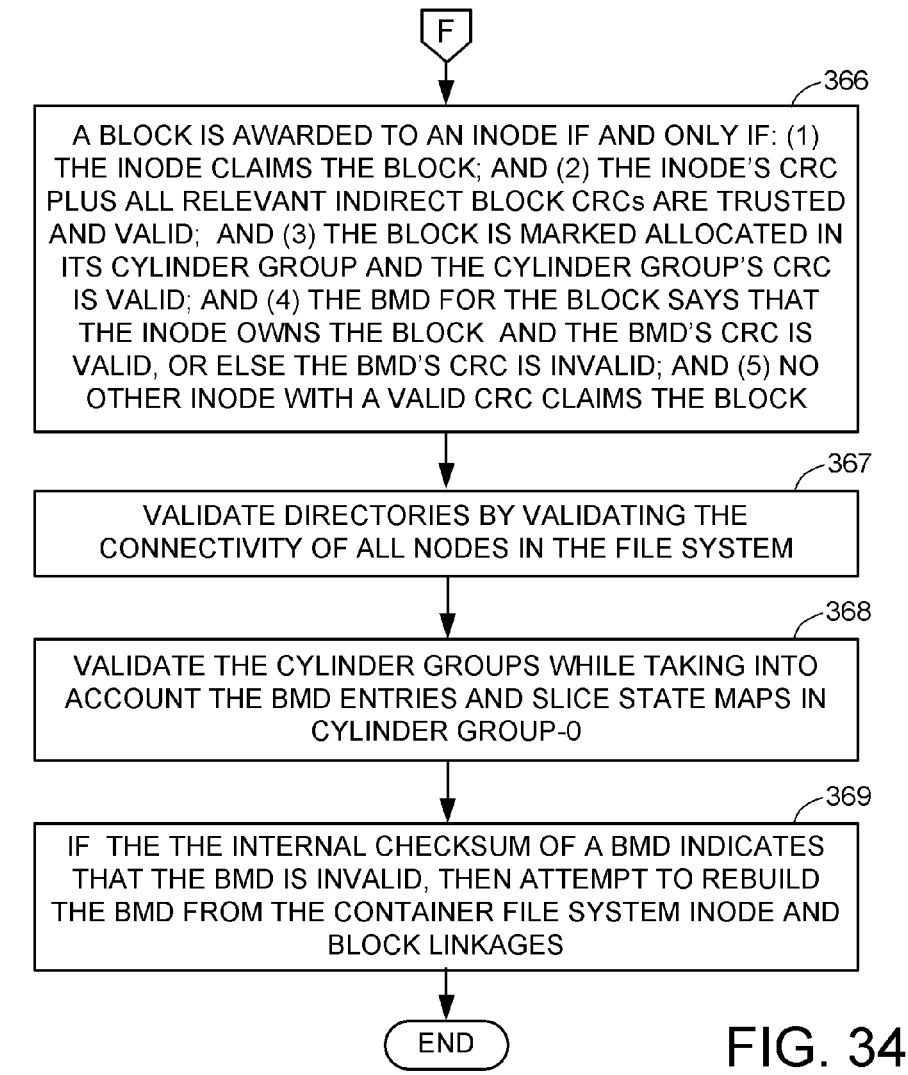

FIGS. 33 and 34 show how a file system checking (fsck) utility is modified to exploit the error detection and correction capabilities of the container file system. In a first step 361, a CRC from the superblock of the container file system is read and compared to a CRC re-computed from the contents of the superblock. If there is a match, then the CRC read from the superblock is valid. If valid, the file system size, inode density, and block size are read from the superblock. If invalid, then these operations are repeated on the alternate superblock. The fsck utility fails if a superblock with a valid CRC cannot be found.

In step 362, the block usage counts and any per-cylinder group information is recomputed. The "has blocks" bitmap is rebuilt. The sparse volume state is used for bad block checking, so that no allocated space falls within a hole in the sparse metavolume.

In step 363, the quota ID of any inode is validated with the quota ID of its parent directory, unless the inode is the root of a directory tree. If the usage is invalid, then it is corrected in the quota tree database if necessary.

In step 364, double links (forward and reverse) are used in the version chain in the container file system to detect and correct single link failures. This is further described below with reference to FIG. 35.

In step 365, a direct or indirect block is validated by computing the CRC over the block and comparing it to the CRC stored in the per-block metadata (BMD) for the direct or indirect block. If there is not a match, the block is marked as a bad block by setting the reserved bad-block bit in the block number field (160 in FIG. 10) of the pointers to the block in any inodes or indirect blocks that reference the block.

In step 366 of FIG. 34, a block is awarded to an inode if an only if: (1) the inode claims the block; and (2) the inode's CRC plus all relevant indirect block CRCs are trusted and valid; and (3) the block is marked allocated in its cylinder group and the cylinder group's CRC is valid; and (4) the BMD for the block says that the inode owns the block and the CRC is valid, or else the BMD's CRC is invalid; and (5) no other inode with a valid CRC claims the block.

In step 367, the directories are validated by validating the connectivity of all nodes in the file system.

In step 368, the cylinder groups are validated while taking into account that the format of cylinder group-0 is different from the other cylinder groups, for example because cylinder group-0 includes the slice state map (as shown in FIG. 15).

Finally, in step 369, if the internal checksum of a BMD indicates that the BMD is invalid, then an attempt is made to rebuild the BMD from the container file system inode and block linkages.

Figure 35:
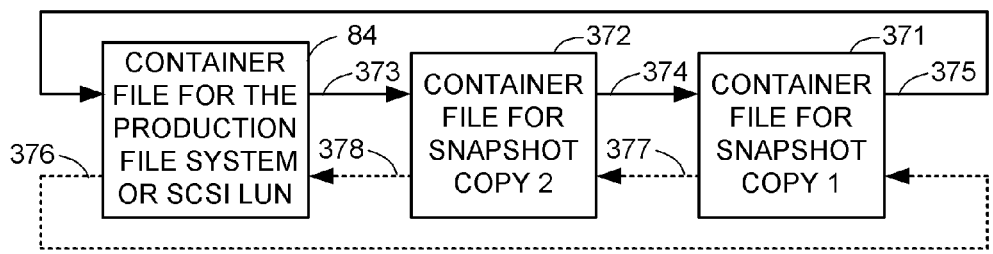
FIG. 35 shows a doubly-linked version chain of container files in a container file system.

FIG. 35 shows a version chain of container files in the container file system. The version chain includes the container file 84 for the production file system or iSCSI LUN, a container file 371 for a first snapshot copy of production file system or iSCSI LUN, and a container file 372 for a second snapshot copy of the production file system or iSCSI LUN. The version chain is a doubly-linked list by virtue of forward links 373, 374, and 375, and reverse links (shown in dotted lines) 377, 378, and 379. Each link is implemented as a pointer in an inode of the respective container file from which the link originates. The value of the pointer is the inode number of the respective container file to which the link is directed. Link corruption is detected when a link does not point from a source container file to a destination container file having a pointer in the reverse direction back to the source container file. If any one of the forward links is corrupted, then it is regenerated by tracing the chain of reverse links, and conversely, if any one of the reverse links is corrupted, then it is regenerated by tracing the chain of forward links. For example, if the forward link 273 is corrupted, then upon tracing the chain of reverse links, upon finding the link 378 matching the inode number of the container file 84 containing the corrupted link, it is discovered that the corrupted link should be restored with the inode number of the inode containing the link 378.

By tracing the forward and reverse links in the version chain, it may be possible to construct a valid version chain if some of the snapshot copies are found to be entirely corrupted. For example, if the container file 372 is so corrupted that its forward link pointer 374 and its reverse link pointer 378 are invalid and the container file 372 will be deleted, then a consistent version chain (without the corrupted container file 372) can be constructed by tracing the version chain so far as possible forward and reverse starting from the container file for the production file system or iSCSI LUN, and then linking together the two dangling ends of this chain. Specifically, for the case of the container file 372 being entirely corrupted, a valid version chain is constructed by setting the forward pointer 373 to the inode number of the container file 371 for the first snapshot copy, and by setting the reverse pointer 377 to the inode number of the container file 84 for the production file system or iSCSI LUN.

A conventional file system checking utility has two phases. A first phase checks the inodes, and a second phase checks the directory structure linking the inodes. The first phase is multithreaded in which a single thread checks a chunk of inodes. Each thread takes a segment of the file system inode space to process. This is unsuitable for the container file system, because the container file system is likely to have no more than a few inodes, at least for the case in which no snapshot copies have been made. It is also possible for the container file system to have one very large container file for a production file system or iSCSI LUN and a large number of small container files each containing file system blocks owned by respective snapshot copies of the production file system or iSCSI LUN in a version set in which shared blocks are kept in the container file of the production file system or iSCSI LUN or in the container file system of the younger snapshot copy. Therefore it is most likely that a conventional fsck utility would perform poorly because a single thread would end up doing all or most of the work processing the inode of the container file containing the production file system or iSCSI LUN.

Figure 36:
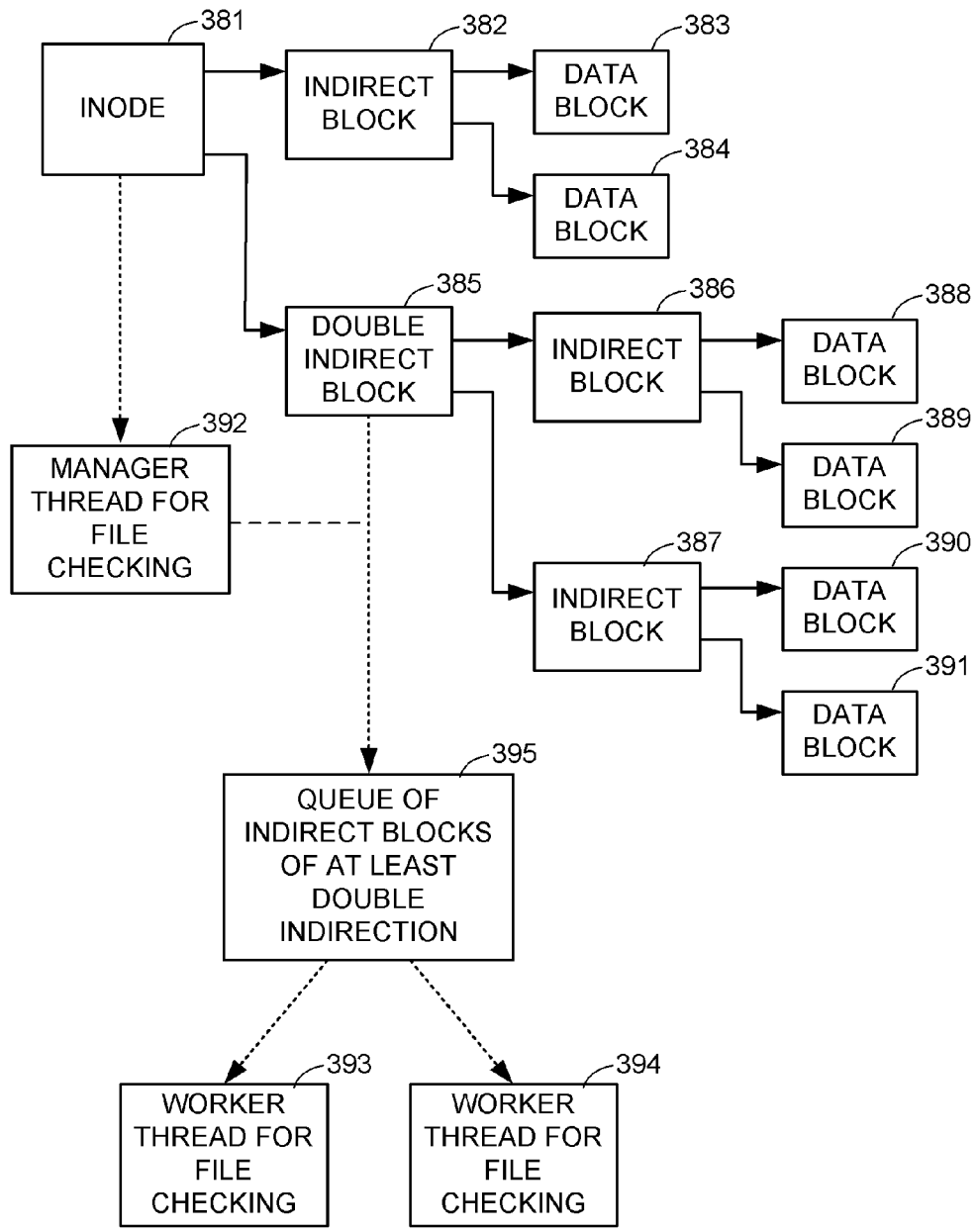
FIG. 36 shows data structures and threads used during a first phase of file checking by the file system check utility introduced in FIGS. 33 and 34.

FIG. 36 shows how the fsck utility should be multithreaded in the first phase so that multiple threads are used when appropriate to check a single inode 381 in a container file system. Any inode with at least double indirection will spawn additional threads to check the internal file structure in parallel. For example, the file of the inode 374 includes an indirect block 382 of single indirection to data blocks 383, 384. The file of the inode 374 also includes an indirect block 385 of double level indirection to indirect blocks 386 and 387 that point to data blocks 388, 389 and 390, 391, respectively. One thread 392 acts as a manager thread for checking the file of the inode 381, and other threads such as threads 393, 394 are worker threads. There is a queue 395 of indirect blocks of at least double indirection, which can be serviced by any of the threads.

Figure 37:
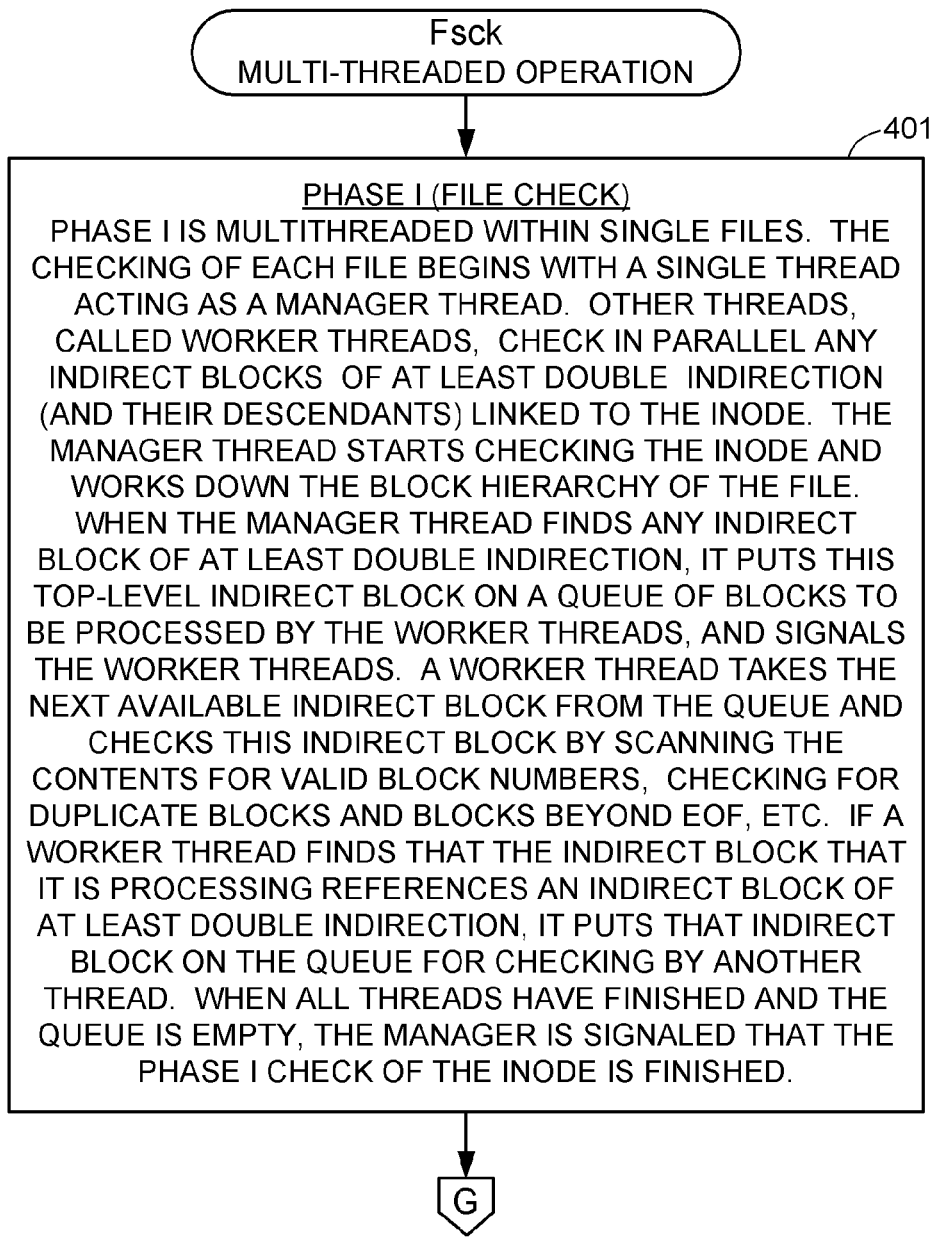
FIGS. 37 and 38 together comprise a flowchart of a first phase of file checking and a second phase of directory validation by the file system check utility.

As shown in FIG. 37, a first phase of the fsck utility begins in step 401. The checking of each file in the container file system begins with the manager thread starting to check the inode and working down the block hierarchy for the file of the inode. When the manager thread finds any indirect block of at least double indirection, it puts this top-level indirect block on the queue of blocks to be processed by the worker threads, and signals the worker threads. A worker thread takes the next available indirect block from the queue and processes it as usual, by scanning the contents for valid block numbers, handling duplicate blocks and blocks beyond EOF, etc. If a worker thread finds that the indirect block that it is processing references an indirect block of at least double indirection, then the worker thread adds the block number of that indirect block to the queue for other worker threads to handle. When all threads have finished and the queue is empty, the manager thread is signaled that this inode's phase 1 check is finished.

Figure 38:
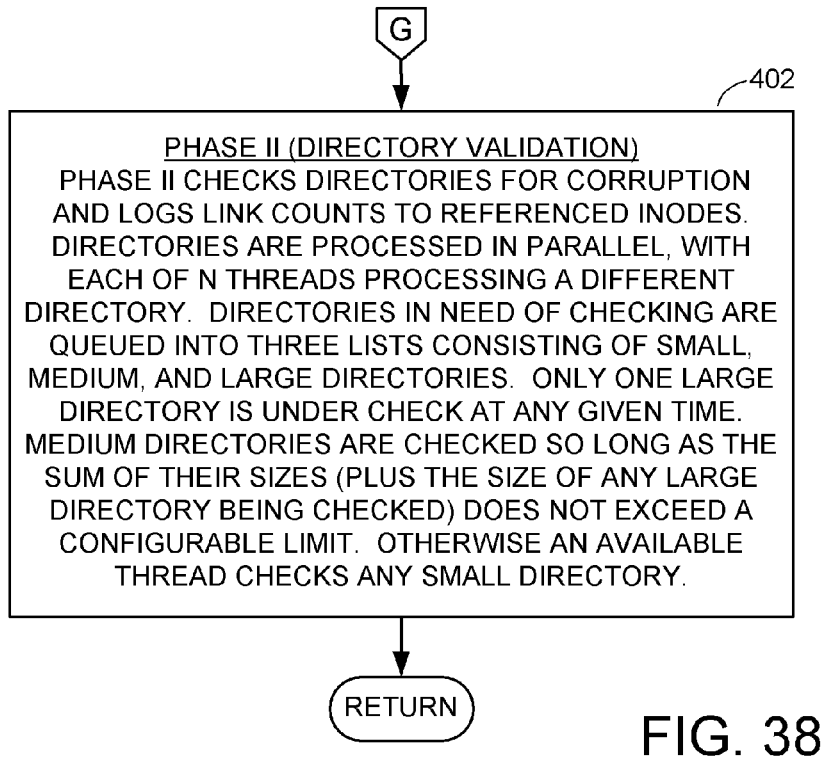
Figure 39:
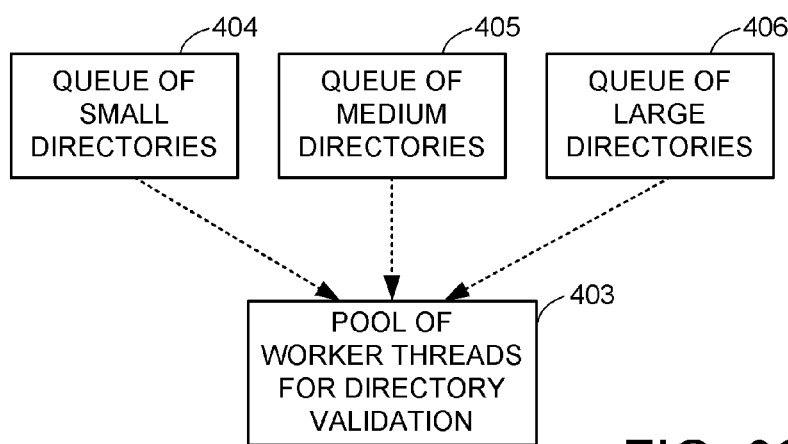
FIG. 39 shows data structures and threads used during the second phase of directory validation by the file system check utility.

As shown in FIG. 38, a second phase of the fsck utility begins in step 402. The second phase checks directories for corruption and logs link counts to referenced inodes. Directories are processed in parallel, with each thread in a pool of worker threads (403 in FIG. 39) processing a different directory. Processing of a very large directory or many large directories at once, however, consumes an inordinate amount of memory, because some directories have multiple associated entries that should be validated as a unit. For directories having such multiple associated entries, it is desired to have the multiple associated entries in memory at the same time. In practice, memory is consumed on the order of about one sixth the size of the directory for efficient processing.

To solve this problem, directories in need of checking are queued into three lists (404, 405, 406 in FIG. 39) consisting of small, medium, and large directories. Only one large directory is under check at any given time. Medium directories are checked so long as the sum of their sizes (plus the size of any large directory being checked) does not exceed a configurable limit. Otherwise an available thread checks any small directory.

7. Common Block Virtualization Services

As described above with reference to FIG. 5, a new file server architecture includes a container file system 81 built on a sparse metavolume 82 for enhanced decoupling of logical storage from physical storage. Use of this architecture has been described above primarily with respect to in-band virtualization capabilities for supporting client access using a network file access protocol such as NFS or CIFS or network block services using NBS and iSCSI, and supplementary services such as snapshots, replication, and backup. However, the new file server architecture has been designed to be generic and portable across multiple storage platforms including array, network (fabric and network appliances), and servers hosting various types and levels of virtualization services, including out-of-band services, which can be deployed to host block devices at network level (director class fabric switches) or on storage arrays. The full range of common block virtualization services provided by the new file server architecture is accessible to network clients and various application programs through the common block virtualization (CBV) API library 38 introduced in FIG. 2.

Figure 40:
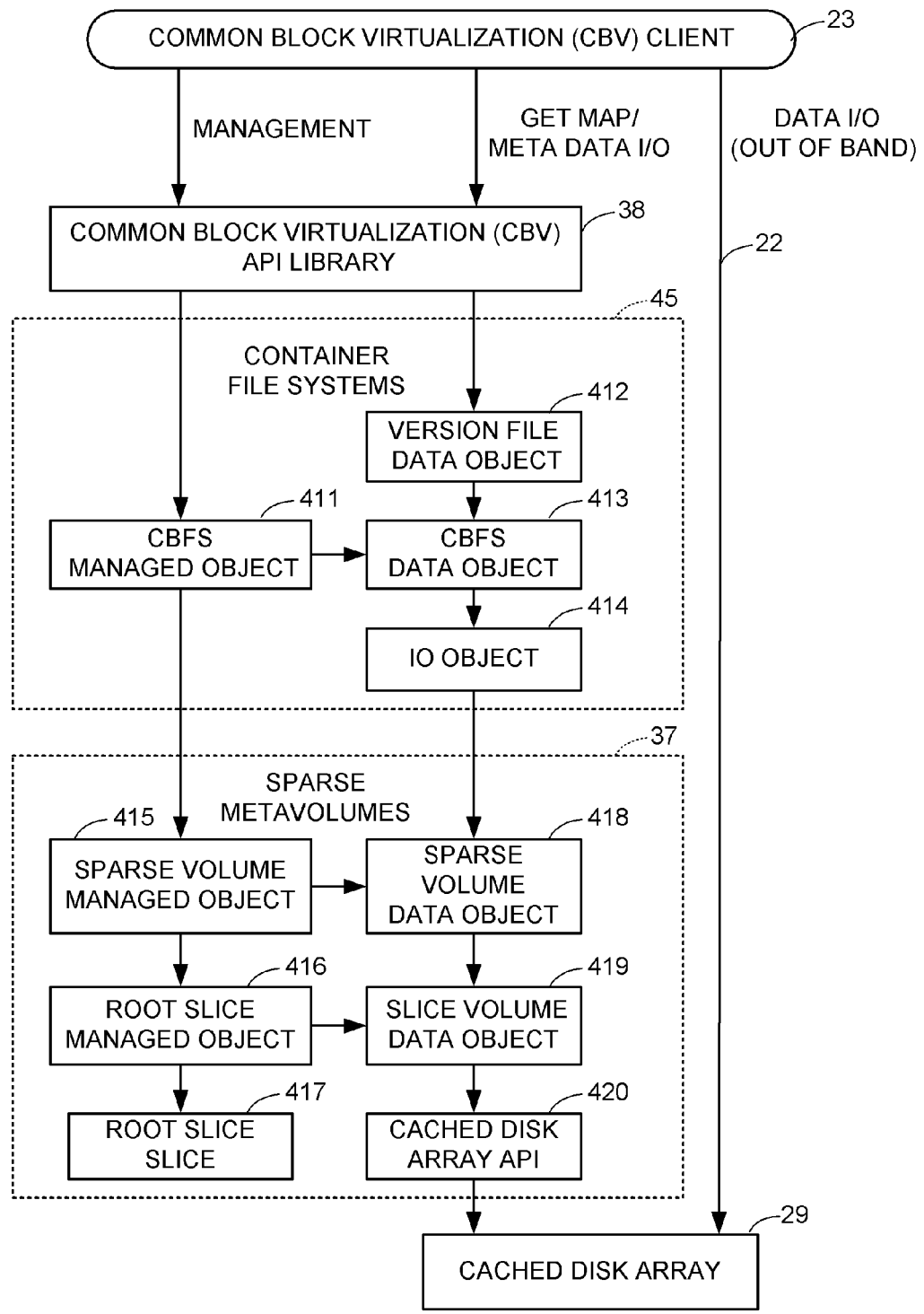
FIG. 40 shows programming objects in the container file systems layer and in the sparse metavolumes layer of programming of the data mover of FIG. 2.

FIG. 40 shows the CBV API library 38 providing management and metadata services to the client 23 in order to support out-of-band data I/O over the direct data link 22 from the client to the cached disk array 29. The CBV API library 38 provides the CBV client 23 with interfaces to a management path and a metadata path through program objects in the container file system layer 45 and the sparse metavolumes layer 37. The APIs are designed and implemented in such a way as to minimize platform specific changes for porting.

In the container file systems layer 45, the management path includes a common block file system (CBFS) managed object 411 responsible for management of the state of a container file system, including creating, mounting, performing input/output upon the mounted file system, unmounting the file system, and deleting the file system. In the container file systems layer 45, the metadata path includes a version file data object 412 for defining metadata of a container file for a production file system or iSCSI LUN or its snapshots, a CBFS data object 413 more generally defining any directory or file in the container file system, and an I/O object 414 used for reading from or writing to any directory or file in the container file system.

In the sparse metavolumes layer 37, the management path includes a sparse metavolume managed object 415 responsible for management of the state of a sparse metavolume, and a root slice managed object 416 for managing the slice map of the sparse metavolume. The root slice is defined by a root slice object 417.

In a preferred implementation, the root slice containing the slice map is stored in the data portion of slice-0 of the slice, but for generality, the root slice is defined independently of slice-0 so that the slice map could be stored anywhere. For example, the root slice includes the following structure:

```
typedef rootSlice_Header {
   ulong           fsid;        // 4 bytes for fsid
   volumeName_t    svName;      // Name of Sparse Volume
   ulong           sliceSize;   // Size of each slice
};
typedef sliceEntry {
   volumeName_t    sliceId;     // 16 characters for name of slice volume
   volumeName_t    cbvId;       // 16 characters for name of
// CBV volume or LUN information
   BlockIndex64_t  offsetOnCBV; // Slice Offset on CBVvolume or LUN
}
```

In the sparse metavolumes layer 37, the metadata data path includes a sparse volume data object 418 defining a sparse volume in terms of its logical slices. A populated slice is defined by a slice volume data object 419. Reading or writing to a populated slice is performed by invoking a cached disk array API 420.

Figure 41:
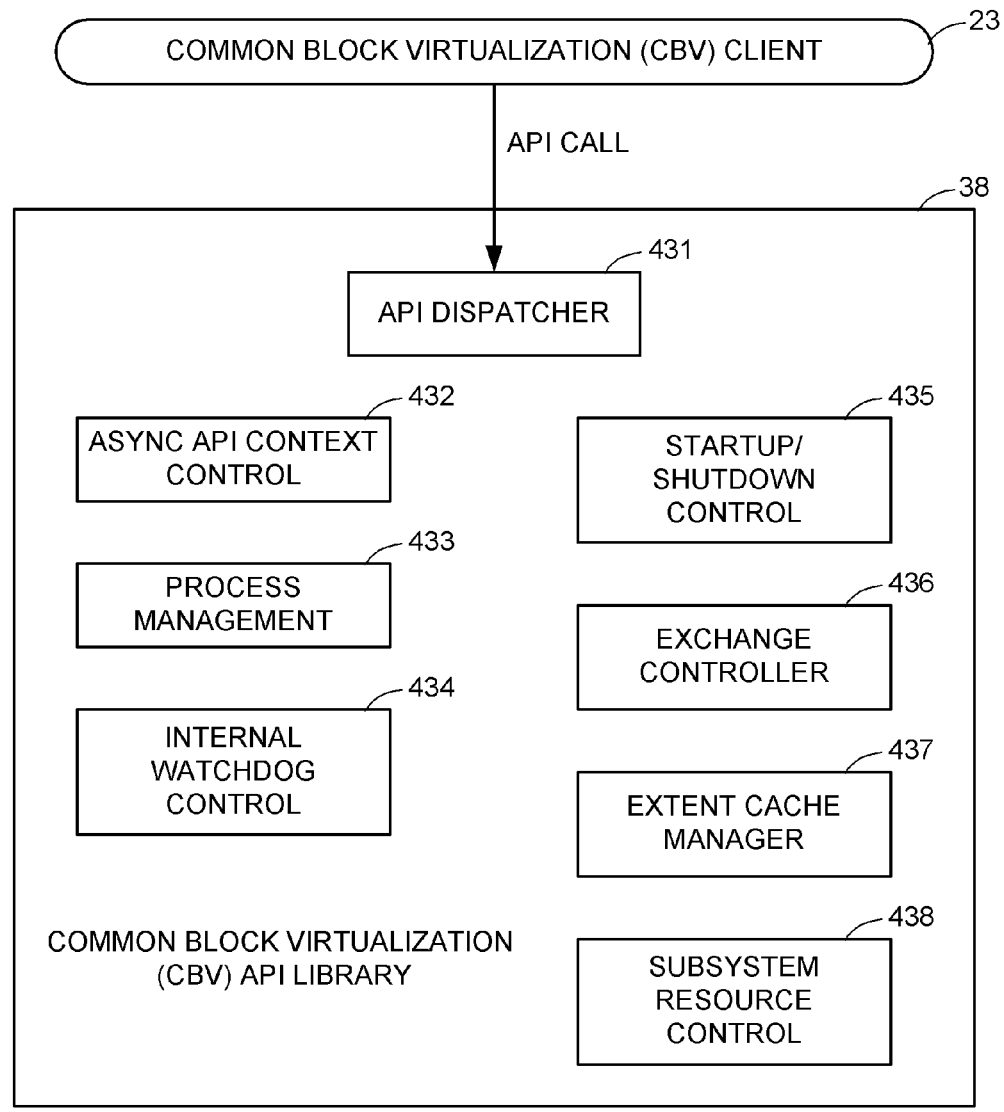
FIG. 41 shows program modules in the common block virtualization (CBV) API library of FIG. 40.

FIG. 41 shows program modules within the CBV API library 38. The program modules include an API dispatcher 431, async API context control 432, process management 433, internal watchdog control 434, startup/shutdown control 435, an exchange controller 436, an extent cache manager 437, and subsystem resource control 438.

The API dispatcher 431 is responsible for maintaining a queue of API objects for respective API calls, scheduling the servicing of the API objects using a pool of threads. Each of the API threads calls into the container file systems layer 45 CBFS stack either directly or by using a virtual file system interface (VFS) for file system operations or a file naming node interface for file operations.

The async API context control 432 is responsible for managing the life cycle of the API objects. It creates an internal object for each instance of an API. This internal object stores the context required to track and control the life cycle of the API.

The process management module 433 is responsible for managing long running commands. The process management module 433 permits an administrator to throttle or stop a process when system resources are insufficient and performance suffers. The process management module 433 generates a process entry object, returns it to the CBV client and caches it for future reference from the CBV client, container file system layer, or sparse volume. The process entry is generated within the existing thread context and is associated with the corresponding API object. The process entry's life cycle is managed by a process handler.

The internal watchdog control module 434 is responsible for detecting and resolving any thread deadlock.

The startup and shutdown control module 435 is responsible for initializing and shutting down the container file system layer. This includes the initialization of the CBV API library and the components of the container file system layer, and allocation and initialization of global objects such as a buffer cache pool.

The exchange controller 436 is responsible for tracking the life cycle of an exchange with a CBV client and the context of each exchange. The exchange controller 436 generates an exchange entry object, returns it to the CBV client, and caches it for future reference. The exchange entry is generated within the existing thread context and is associated with the corresponding API object. The life cycle of an exchange entry is managed by an exchange handler.

The extent cache manager 437 manages a respective extent cache for each container file system. The extent cache is primarily intended to serve two purposes. It caches the most recently referred, committed (provisioned storage) extents of a file in a container file system. The extent cache does a fast lookup in memory for resolving the (block) offsets that are requested in subsequent mapped for read and (committed portion of) mapped for write APIs. The extent cache also provides an infrastructure to co-ordinate the move of the (partial or full) extents (during shrink) being shared with a CBV client.

In a CBV API, an exchange is a transactional unit of interaction between the CBV client and the CBV API library. An exchange consists of one or more operations. In an exchange upon a container file system, all operations within the exchange translate into one UxFS transaction. Thus, the CBV API provides an interface between the transactional and synchronous nature of each exchange and the relatively asynchronous environment of the container file systems layer and the sparse metavolumes layer.

Figure 42:
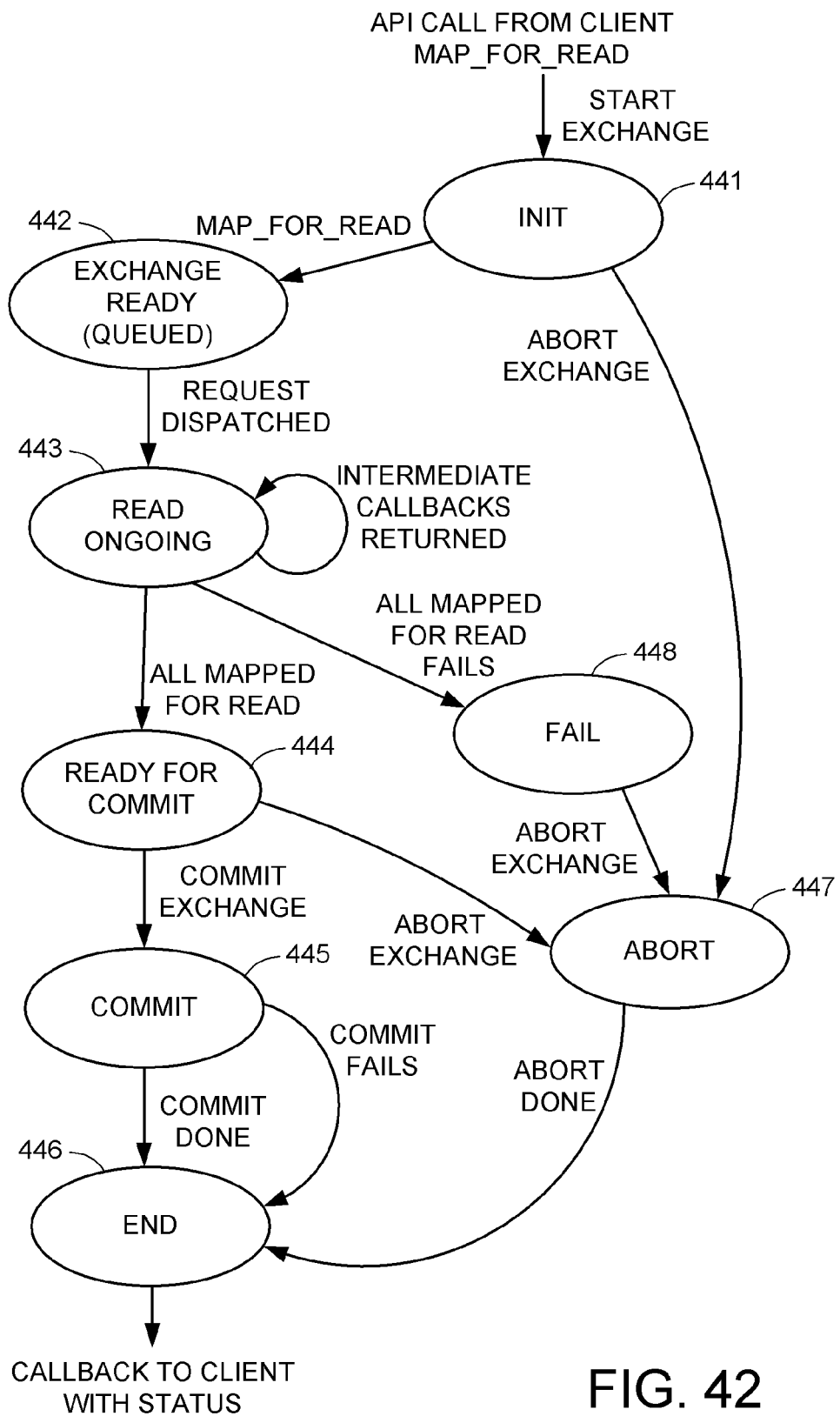
FIG. 42 is a state transition diagram for an exchange for a "map for read" API call from a client to the CBV API library.

FIG. 42 shows a state transitions of an exchange for a "map for read" API call from a CBV client. In an initialization state 441, an exchange object is created for the API call, and the parameters of the API call are checked for validity. If the parameters are found to be valid, then the request is accepted and the exchange object is put in a dispatch queue of the API dispatcher (431 in FIG. 41). The exchange remains in an exchange ready (queued) state 442 until the exchange object is dispatched. Once dispatched, in a read ongoing state 443, the reading of the requested mapping is ongoing. Depending on the requested extent of the read operation, mappings for multiple file system blocks may be requested and acknowledged in intermediate callbacks from the container file system layer. Once the mappings for the read are all obtained, then the exchange is in a ready for commit state 444. In this state, the exchange can be committed or aborted. If committed, then the exchange is committed in a commit state. If the commit succeeds, then the end state 446 is reached, in which a callback is returned to the client with a status of success, and the exchange object is deleted. If the commit fails, then a callback is returned to the client with a status of failure.

In the initial state 441, if the API call is rejected, then the exchange is aborted in an abort state 337, and when the abort is done, the end state 446 is reached, returning a callback to the client with a status of failure. From the read ongoing state 443, if all of the mapping for the read cannot be obtained, then the exchange enters a fail state 448 in which operations requested of the container file systems and the sparse metavolumes layer are terminated, and then the exchange enters the abort state 447.

In general, an exchange for an API includes similar states to the states shown in FIG. 42 for the map for read API. An exchange object for the API is initialized and queued if the API parameters are found to be valid. The exchange object is dispatched from the queue for execution by a thread managed by the API dispatcher. The thread requests one or more operations from the container file systems layer 45 or sparse metavolumes layer in order to prepare the transaction of the exchange. If the preparation is successful, then the transaction is committed. If the preparation is not successful, then the exchange is aborted so that any resources reserved for committing the transaction are released.

Figure 43:
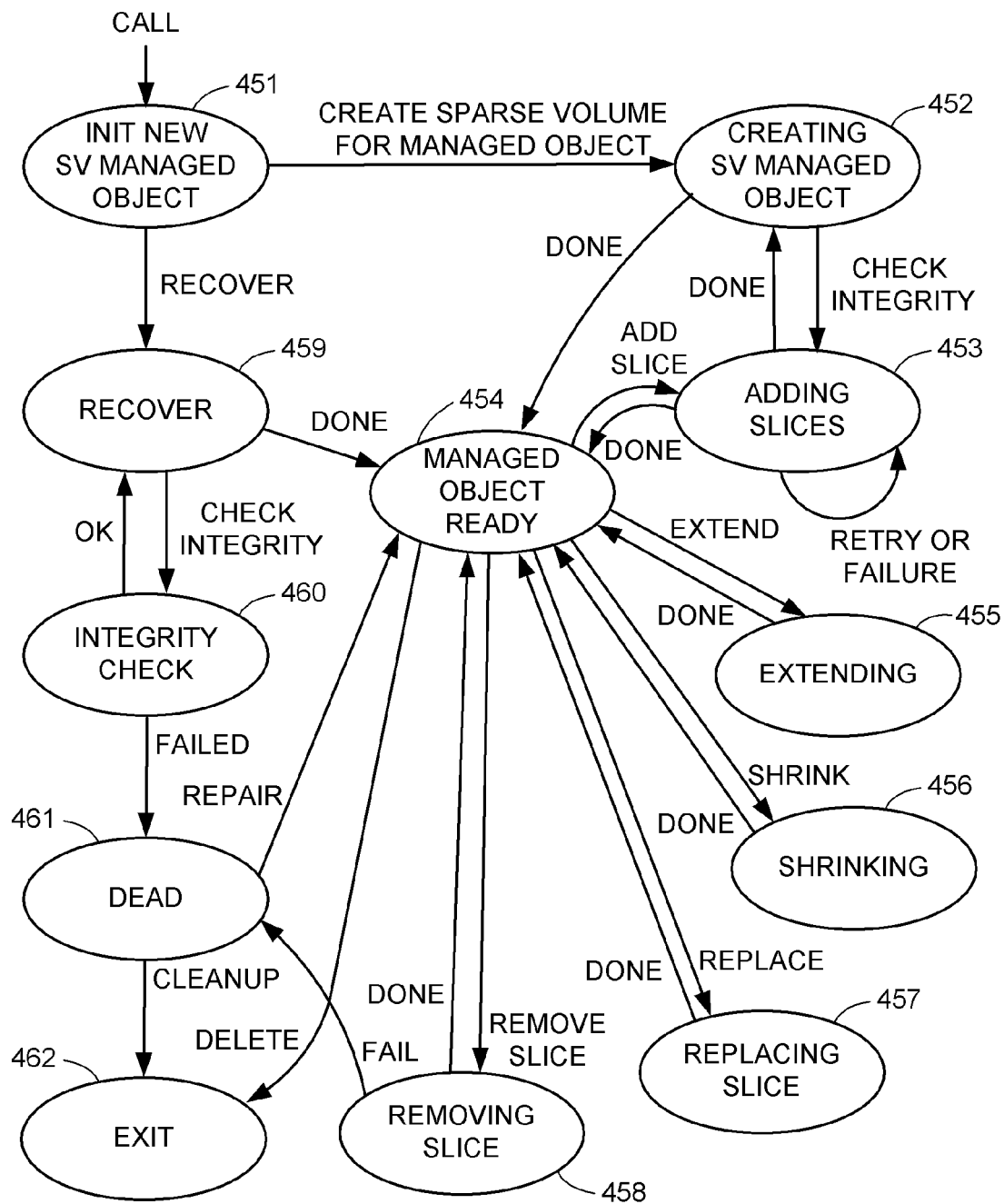
FIG. 43 is a state transition diagram for a sparse volume managed object introduced in FIG. 40.

FIG. 43 shows a state diagram for a sparse volume managed object. In response to a request for a new sparse volume managed object, the sparse volume (SV) managed object is created and put in an initial state 451. In response to a request to create a sparse volume including a specified root slice of specified slice information, and a specified slice-0 for the sparse volume managed object, the sparse volume managed object enters a creating sparse volume managed object state 452. In this state, the root slice is validated for overlap with slice-0, and slice-0 is stamped in the root slice, and an in-core sparse volume managed object is created in memory from slice-0. Additional provisioned slices, as called for by slice information specified in the root slice, are added in an adding slices state 453.

Once the sparse volume managed object has been created, the sparse volume enters a managed object ready state 454. In this state, the sparse volumes layer may respond to various requests to modify the sparse volume managed object. The sparse volume managed object may enter the adding slices state 453 to provision a specified logical slice of the sparse volume with a configured slice of storage. The new slice information is registered in the root slice, and then the configured slice of storage is added to the sparse volume. The sparse volume managed object may enter an extending state 455, in which the logical extent of the sparse volume is extended to a new size. The new size is recorded in the root slice.

The sparse volume managed object may enter a shrinking state 456, in which the logical extent of the sparse volume is reduced. The sparse volume managed object may enter a replacing slice state 457, in which a specified old configured slice of sparse volume is replaced with a specified new configured slice. The slice mark on the new slice is validated, the slice mark on the old slice is stamped with the state "replacing slice," and copying of blocks from the old slice to the new slice is initiated.

The sparse volume managed object may enter a removing slice state 458, in which a configured slice of storage is removed from a specified provisioned slice on the sparse volume, so that the configured slice of storage is freed. The slice is removed from the in-core sparse metavolume and then the slice is unmarked on the root slice and then updated in the slice mark. If there is a panic, then this slice state information is checked for consistency.

During recovery, the sparse volume managed object enters a recover state 495 in order to recover the sparse volume managed object after getting information of the slices from the root slice. During recovery, the sparse volume managed object transitions from the sparse volume recover state 495 to an integrity check state 460. In the integrity check state 460, the slice mark from the end of each provisioned slice in the sparse volume is read and compared with the slice information stored in the root slice. If this integrity check fails or if removing a slice 458 fails, then the sparse volume managed object enters a dead state. The sparse volume is marked "dead" and no I/O operations are supported in this state. If the sparse volume can be repaired, then the managed object transitions to the managed object ready state 454. Otherwise, the slices of the dead managed object are freed so that the dead sparse volume managed object transitions to an exit state 462 in which the sparse volume managed object is deleted from memory. The exit state is the destructor of the sparse volume managed object. Thus, when a ready managed object is deleted, it transitions from the ready state 454 to the exit state.

Figure 44:
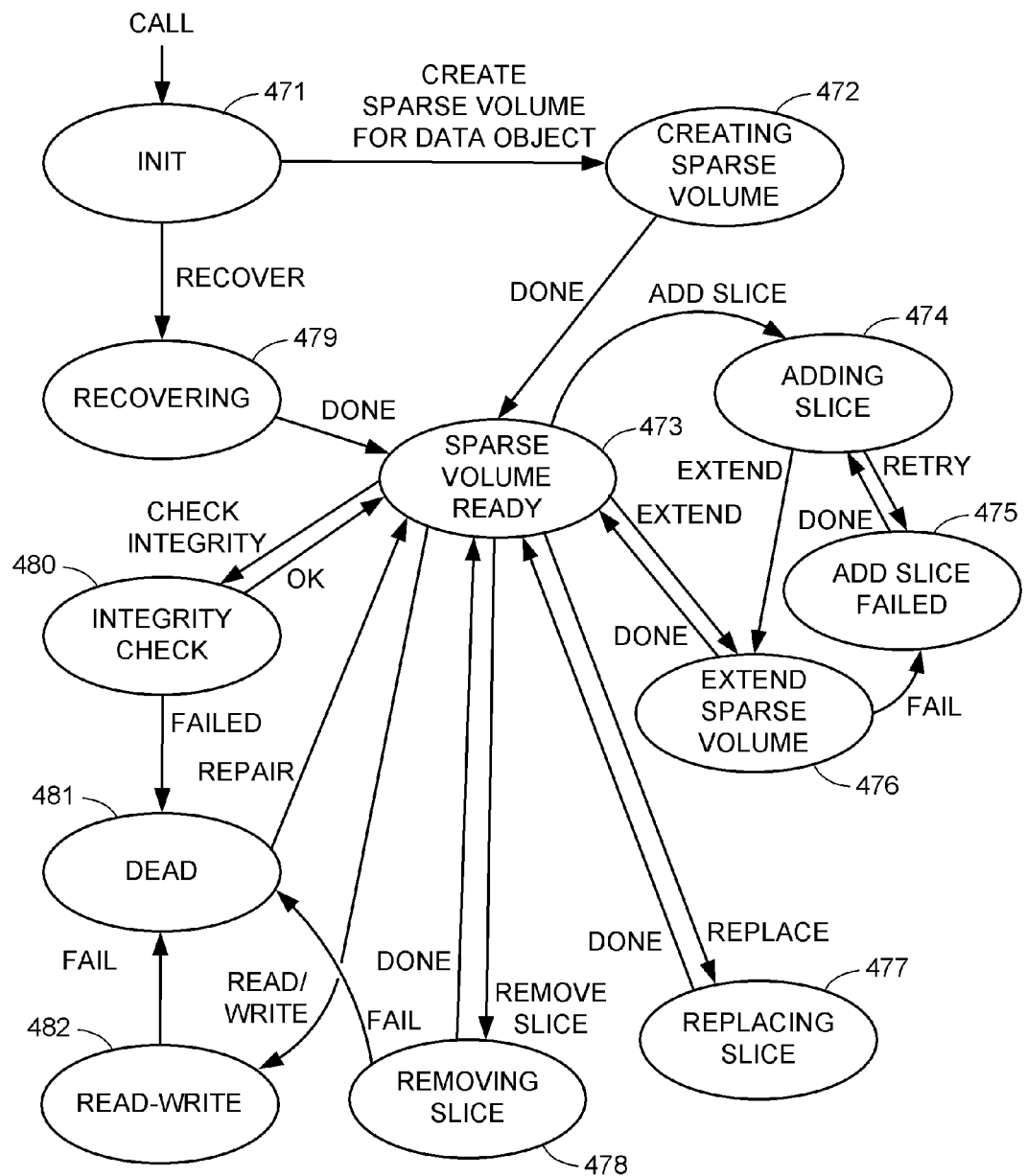
FIG. 44 shows a state transition diagram for a sparse volume data object introduced in FIG. 40.

FIG. 44 shows a state transition diagram for the sparse volume data object. In general, state transitions occur in response to calls from an associated sparse volume managed object, or upon completion of an operation requested by the call. The sparse volume data object performs all preconditions for completion of the operation before the operation is completed by committing a state change in the sparse volume data object.

A new sparse volume data object is created in an initial state 471. The sparse volume data object transitions to creating sparse volume state 472 in response to a call for adding a specified slice-0 to the sparse volume data object. Once this is done, the sparse volume data object transitions to a sparse volume ready state 473.

In response to a call for provisioning a logical slice at a specified offset with a configured slice of storage, the sparse volume data object transitions from the ready state 473 to an adding slice state 474. The configured slice of storage is added after registering the configured slice of storage in the root slice. If adding a slice fails, for example because a free configured slice of the required size or a desired AVM type is not presently available, then the sparse volume data object transitions to an add slice failed state 475 in order to retry at a later time.

An extend sparse volume state 476 is entered when the associated sparse volume managed object calls an extend function of the sparse volume data object. For example, the extend function is called at the time of extending the container file system built upon the sparse volume. The sparse volume managed object will extend itself and then extend the sparse volume data object.

A replacing slice state 477 is entered when the associated sparse volume managed object provides a new configured slice of storage to the sparse volume in order to replace an old configured slice of storage provisioned in the sparse volume. New I/O operations go to the new configured slice of storage. A configured slice of storage is defined by an instance of a slice volume data object.

A removing slice state 478 is entered when the associated sparse volume managed object calls a remove slice function of the sparse volume data object in order to free a configured slice of storage from the sparse volume data object. The sparse volume managed object releases the slice from the root slice and then calls the remove slice function of the sparse volume data object.

A recovering state 479 is entered when the associated sparse volume managed object calls a recover function of the sparse volume data object. After the sparse volume data object has entered the recovering state, the sparse volume is recovered by "add slice" calls for all slices that were provisioned in the sparse metavolume.

An integrity check state 480 is entered when a check integrity function of the sparse volume data object is called. The allocated sparse volume managed object calls this function at the time of mounting the sparse volume. The CBFS managed object may call this function for a periodic check of integrity of the sparse volume. If any problem with the integrity of the sparse volume data object is found, then the sparse volume data object transitions to a dead state 481. If repaired, the dead sparse volume data object returns to the sparse volume ready state 473.

The container file systems layer calls a read or write I/O Request Packet (IRP) function in order to perform asynchronous read or write operations on the sparse volume data object in a read-write state 482. The sparse volume data object maps the logical block address of each IRP to an absent or provisioned slice, and if the target is a provisioned slice, the request is sent to a slice volume data object of the provisioned slice. The slice volume data object uses its storage configuration information (stored in the volume database 60 in FIG. 2) for translating the logical block address of the IRP to a logical address in the cached disk array, and calls a cached disk array API to read from or write to the cached disk array.

Figure 45:
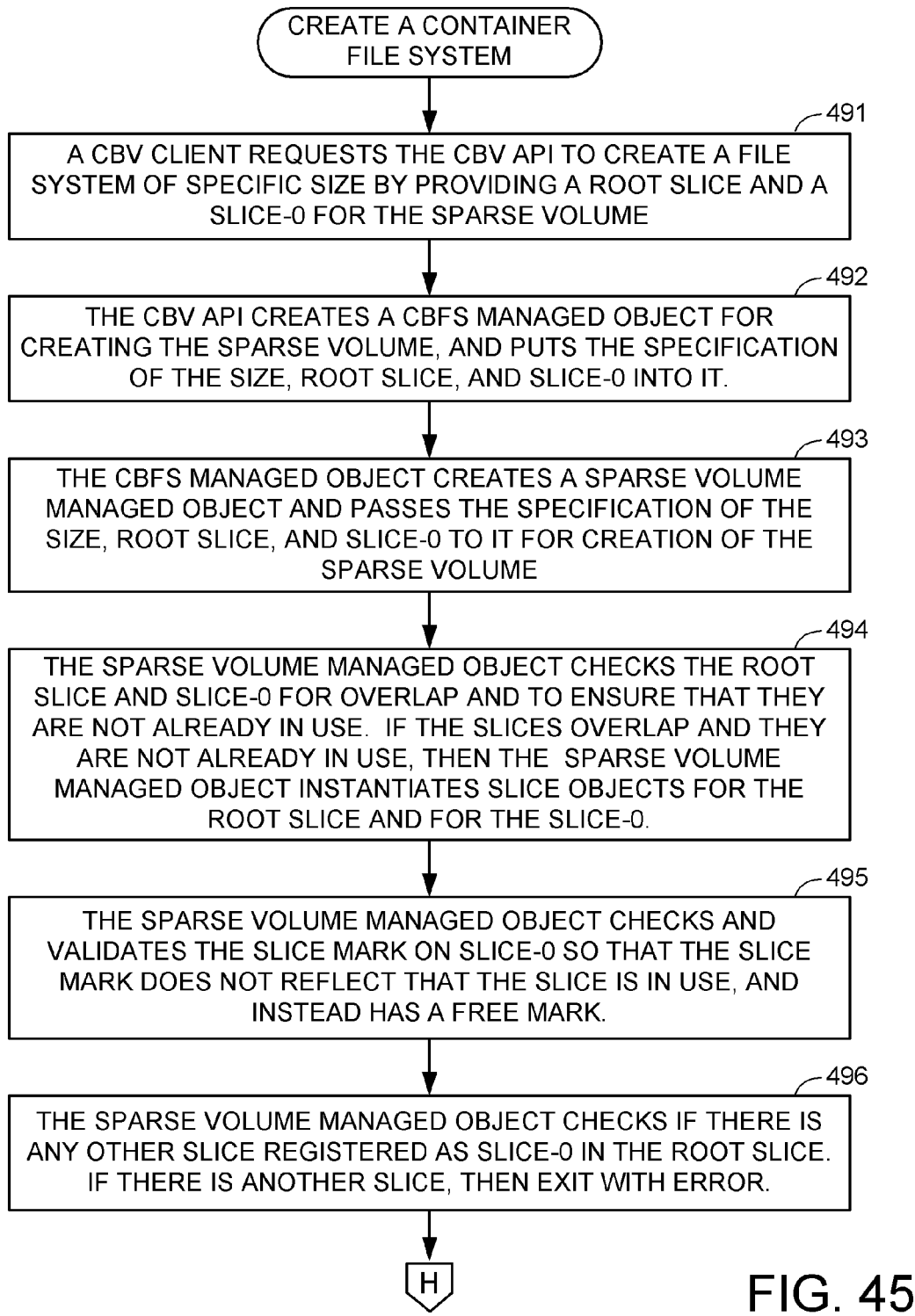
FIGS. 45 and 46 together comprise a flowchart of an exchange for creating a container file system.

FIG. 45 shows an exchange for creating a container file system. In step 491, a CBV client requests the CBV API to create a file system of a specified size using a specified root slice and a specified slice-0 for the underlying sparse metavolume. In step 492, the CBV API creates a CBFS managed object for creating the sparse volume, and puts the specification of the size, root slice, and slice-0 into it. In step 493, the CBFS managed object creates a sparse volume managed object, and passes the specification of the size, root slice, and slice-0 into it for creation of the sparse volume. In step 494, the sparse volume managed object checks the root slice and slice-0 for overlap and to ensure that they are not already in use. If the slices overlap and they are not already in use, then the sparse volume managed object instantiates the slice objects for the root slice and for the slice-0. In step 495, the sparse volume managed object checks and validates the slice mark on slice-0 so that the slice mark does not reflect that the slice is in use, and instead has a free mark. In step 496, the sparse volume managed object checks if there is any other slice registered as slice-0 in the root slice. If there is another slice, then exit with error. Execution continues to step 497 in FIG. 46.

Figure 46:
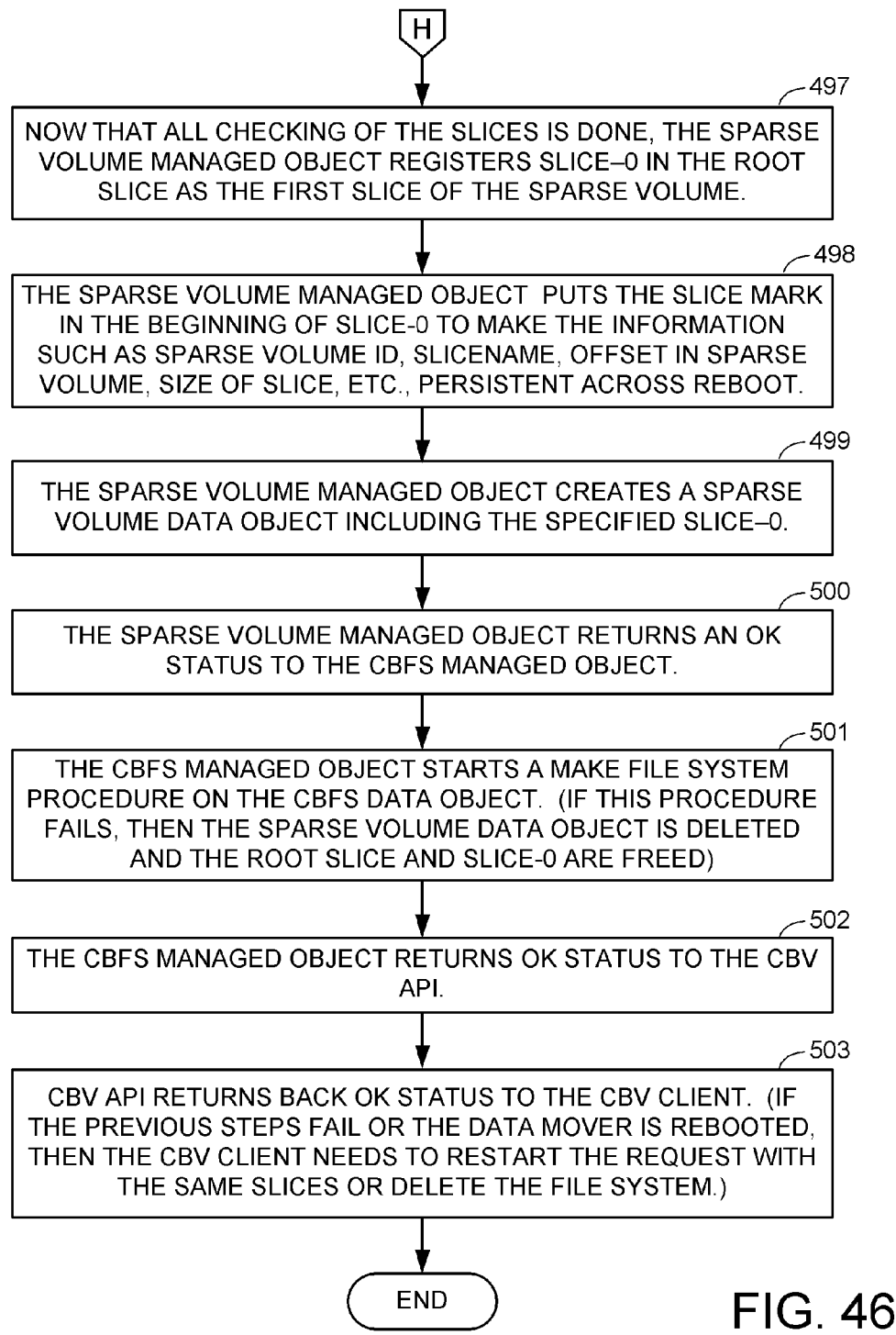

In step 497 of FIG. 46, now that all checking of the slices is done, the sparse volume managed object registers slice-0 in the root slice as the first slice of the sparse volume. In step 498, the sparse volume managed object puts the slice mark in the beginning of slice-0 to make the information such as sparse volume ID, slicename, offset in sparse volume, size of slice, etc., persistent across reboot. In step 499, the sparse volume managed object creates a sparse volume data object including the specified slice-0. In step 500, the sparse volume managed object returns an OK status to the CBFS managed object. In step 501, the CBFS managed object starts a make file system procedure on the CBFS data object. (If this procedure fails, then the sparse volume data object is deleted and the root slice and slice-0 are freed.) In step 502, the CBFS managed object returns an OK status to the CBV API. In step 503, the CBV API returns back OK status to the CBV client. (If the previous steps fail or the data mover is rebooted, then the CBV client needs to restart the request with the same slices, or delete the container file system.) The exchange is finished.

Figure 47:
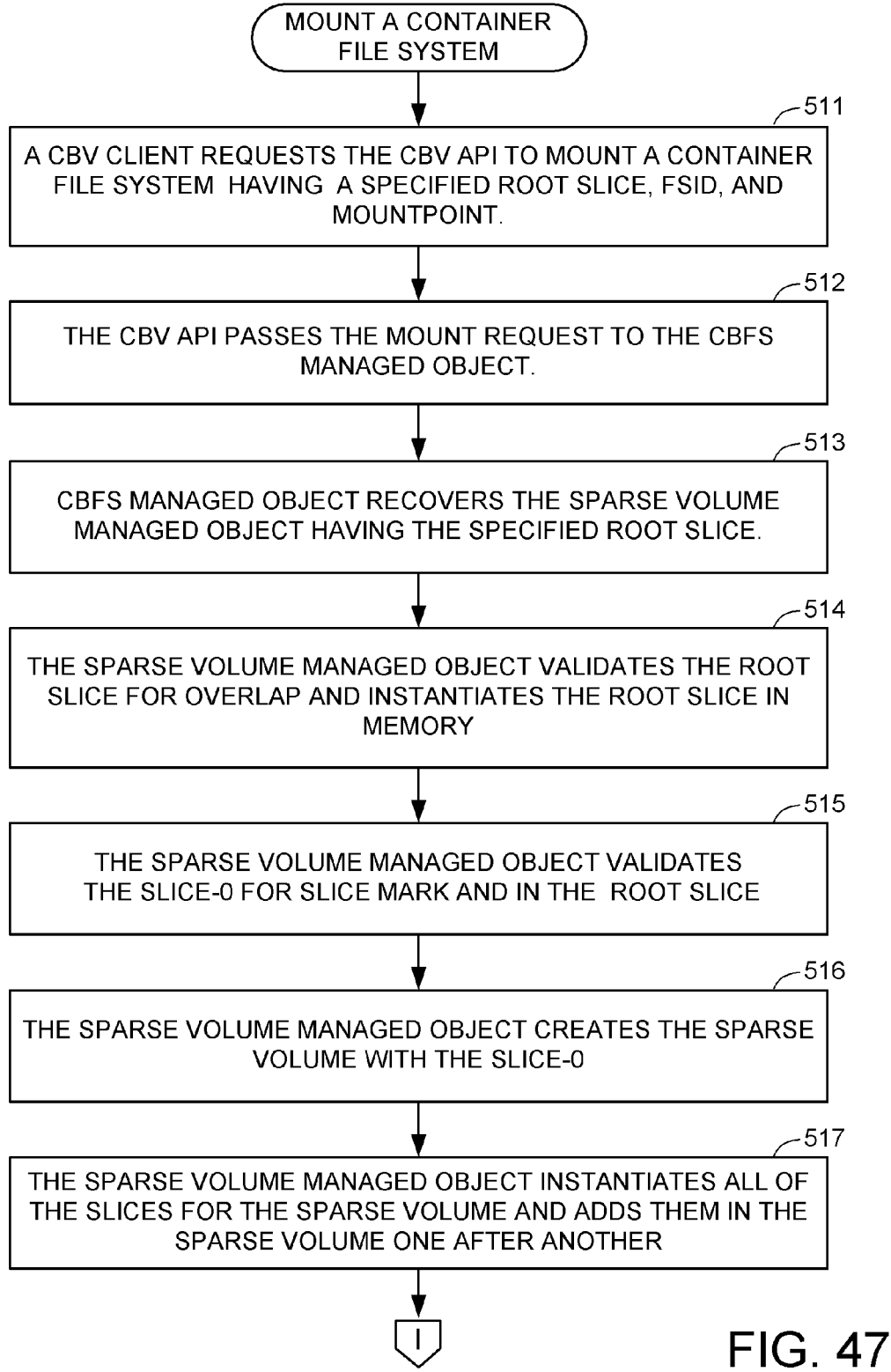
FIGS. 47 and 48 together comprise a flowchart of an exchange for mounting a container file system.

FIG. 47 shows an exchange for mounting a container file system. In a first step 511, a CBV client requests the CBV API to mount a container file system having a specified root slice, file system identifier (FSID), and mount point. In step 512, the CBV API passes the mount request to the CBFS managed object. In step 513, the CBFS managed object recovers the sparse volume managed object having the specified root slice. In step 514, the sparse volume managed object validates the root slice for overlap and instantiates the root slice in memory. In step 515, the sparse volume managed object validates the slice-0 for slice mark and in the root slice. In step 516, the sparse volume managed object creates the sparse volume with the slice-0. In step 517, the sparse volume managed object instantiates all of the slices for the sparse volume and adds them in the sparse volume one after another. Execution continues from step 517 to step 518 in FIG. 48.

Figure 48:
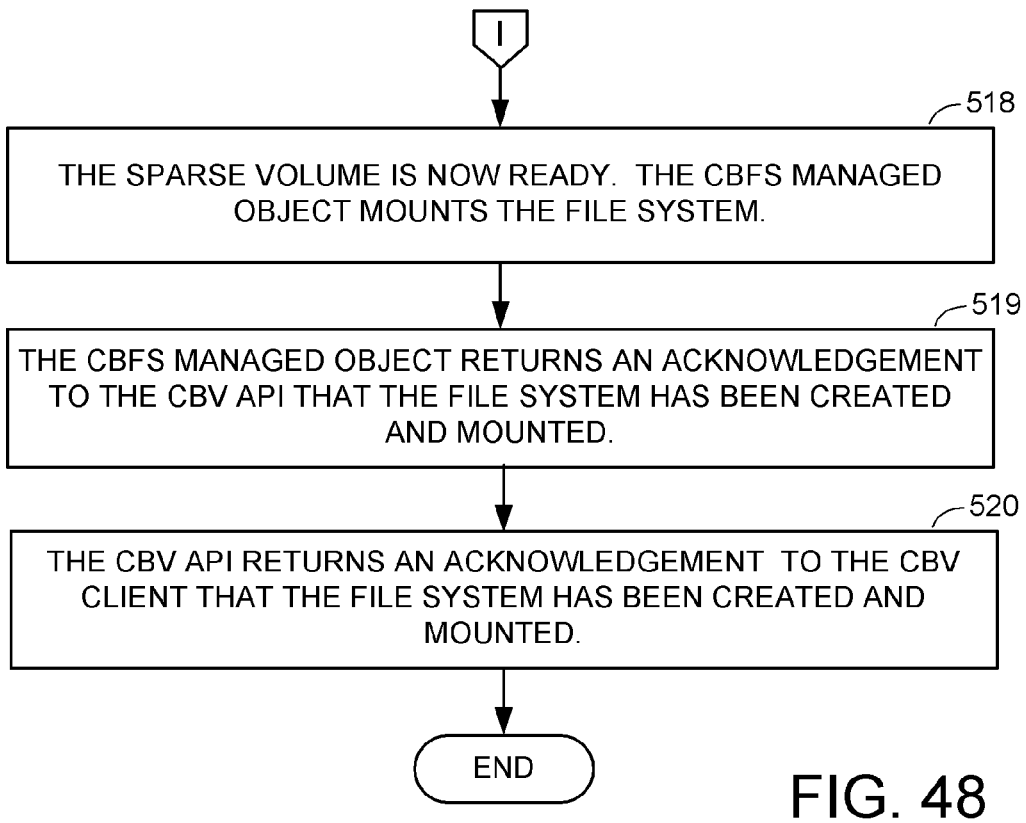

In step 518 of FIG. 48, the sparse volume is now ready. The CBFS managed object mounts the file system. In step 519, the CBFS managed object returns an acknowledgement to the CBV API that the file system has been created and mounted. In step 520, the CBV API returns an acknowledgement to the CBV client that the file system has been created and mounted. The exchange is finished.

Figure 49:
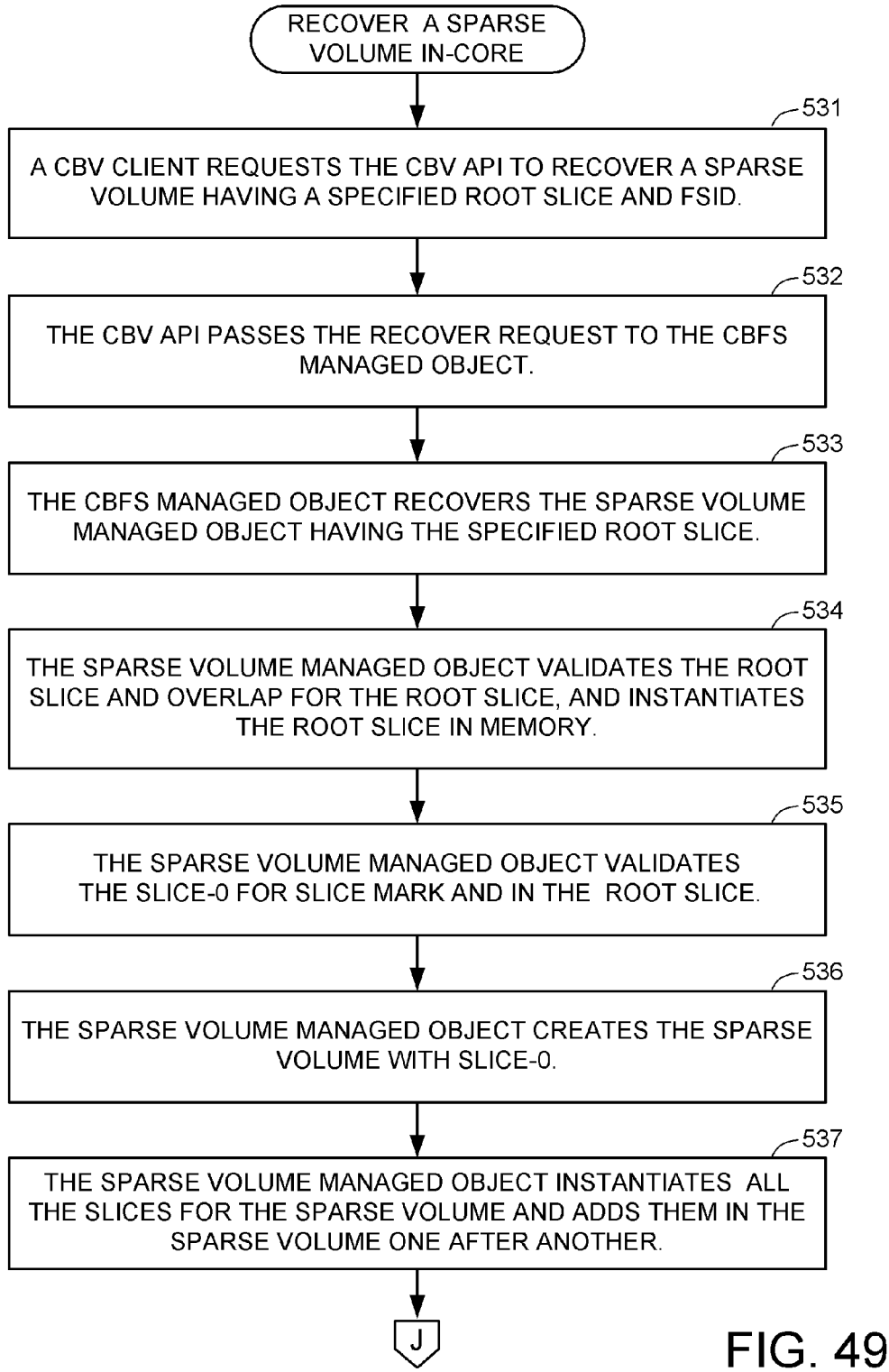
FIGS. 49 and 50 together comprise a flowchart of an exchange for recovering a sparse volume in-core.

FIG. 49 shows an exchange for recovering a sparse volume in-core object. In a first step 531, a CBV client requests the CBV API to recover a sparse volume having a specified root slice and FSID. In step 532, the CBV API passes the recover request to the CBFS managed object. In step 533, the CBFS managed object recovers the sparse volume managed object having the specified root slice. In step 534, the sparse volume managed object validates the root slice and overlap for the root slice, and instantiates the root slice in memory. In step 535, the sparse volume managed object validates the slice-0 for slice mark and in the root slice. In step 536, the sparse volume managed object creates the sparse volume with slice-0. In step 537, the sparse volume managed object instantiates all the slices for the sparse volume and adds them in the sparse volume one after another. Execution continues from step 537 to step 538 in FIG. 50.

Figure 50:
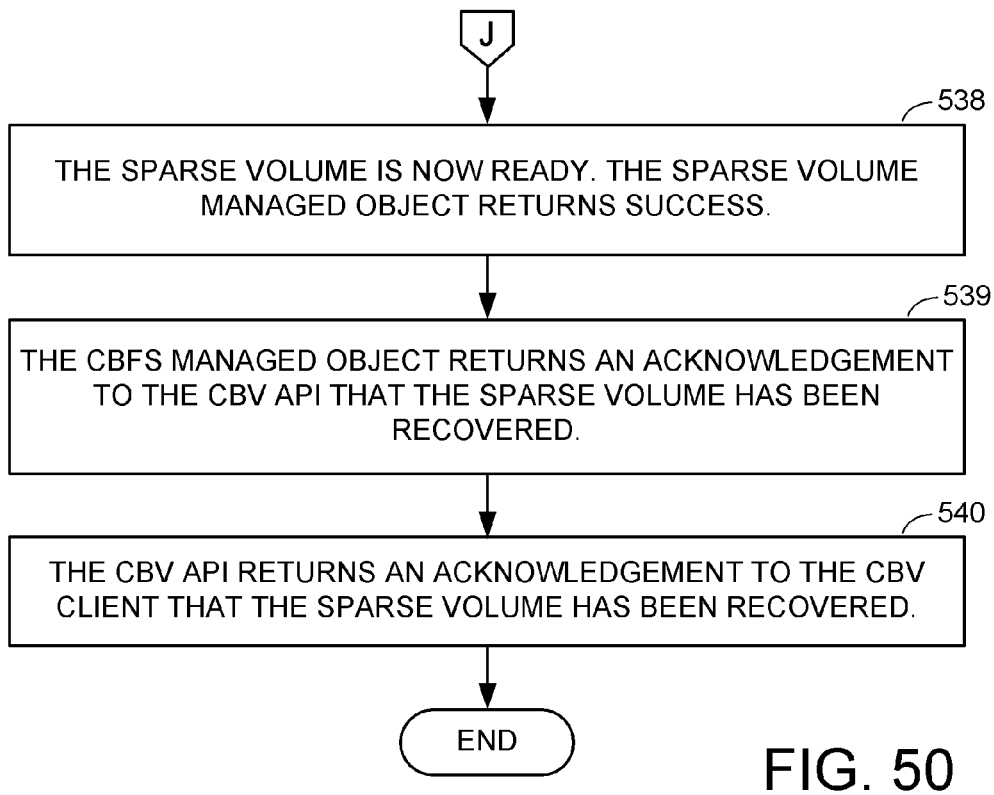

In step 538 of FIG. 50, the sparse volume is now ready. The sparse volume managed object returns success. In step 539, the CBFS managed object returns an acknowledgement to the CBV API that the sparse volume has been recovered. In step 540, the CBV API returns an acknowledgement to the CBV client that the sparse volume has been recovered. The exchange is finished.

Figure 51:
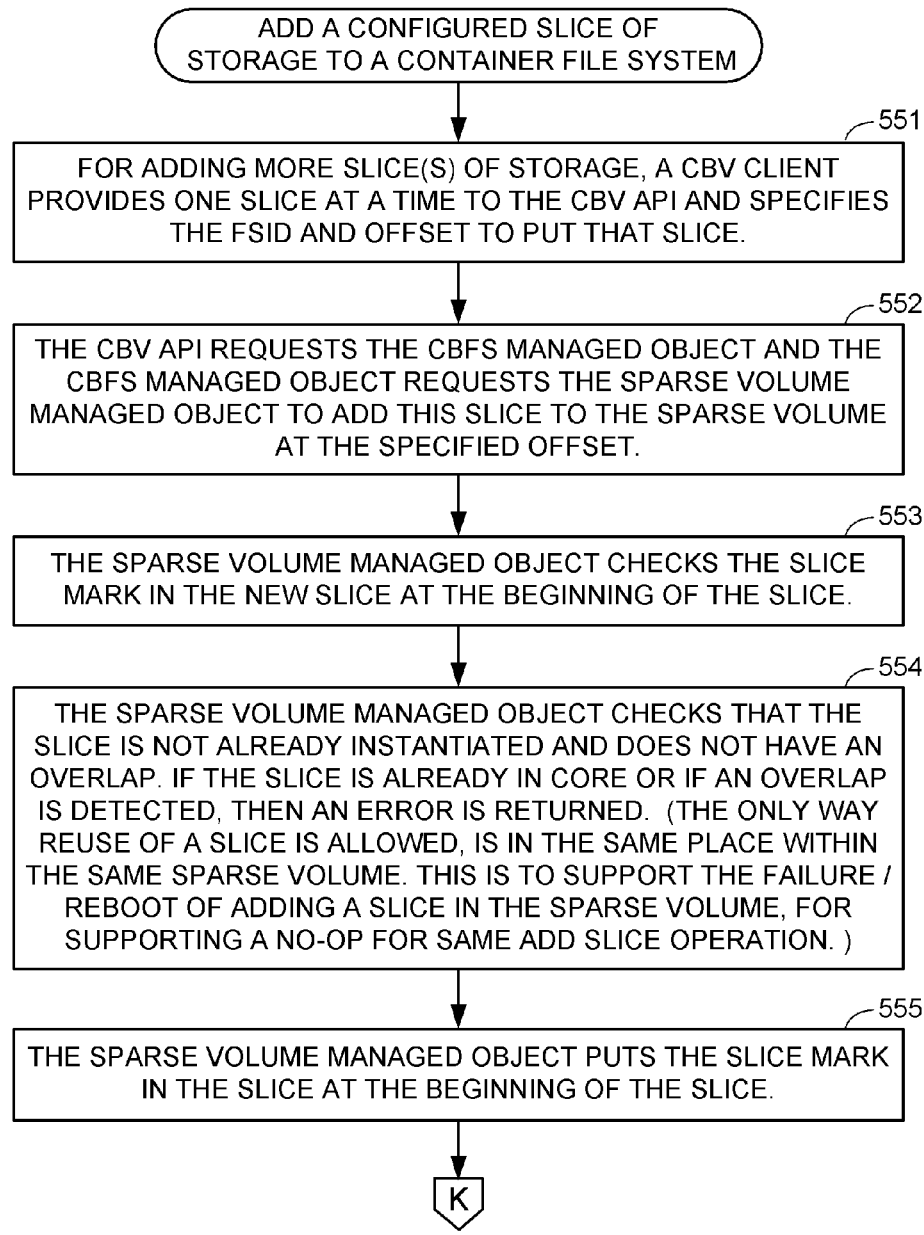
FIGS. 51 and 52 together comprise a flowchart of an exchange for adding a configured slice of storage to a container file system.

FIG. 51 shows an exchange for adding a configured slice of storage to a container file system. In a first step 551, for adding one or more slices of storage, a CBV client provides one slice at a time to the CBV API and specifies the FSID and offset to put that slice. In step 552, the CBV API requests the CBFS managed object and the CBFS managed object requests the sparse volume managed object to add this slice to the sparse volume at the specified offset. In step 553, the sparse volume managed object checks the slice mark in the new slice at the beginning of the slice. In step 554, the sparse volume managed object checks that the slice is not already instantiated and does not have an overlap. If the slice is already in core or if an overlap is detected, then an error is returned. (The only way reuse of a slice is allowed, is in the same place within the same sparse volume. This is to support the failure/reboot of adding a slice in the sparse volume, for supporting a no-op for the same add slice operation.) In step 555, the sparse volume managed object puts the slice mark in the slice at the beginning of the slice. Execution continues from step 555 to step 556 of FIG. 52.

Figure 52:
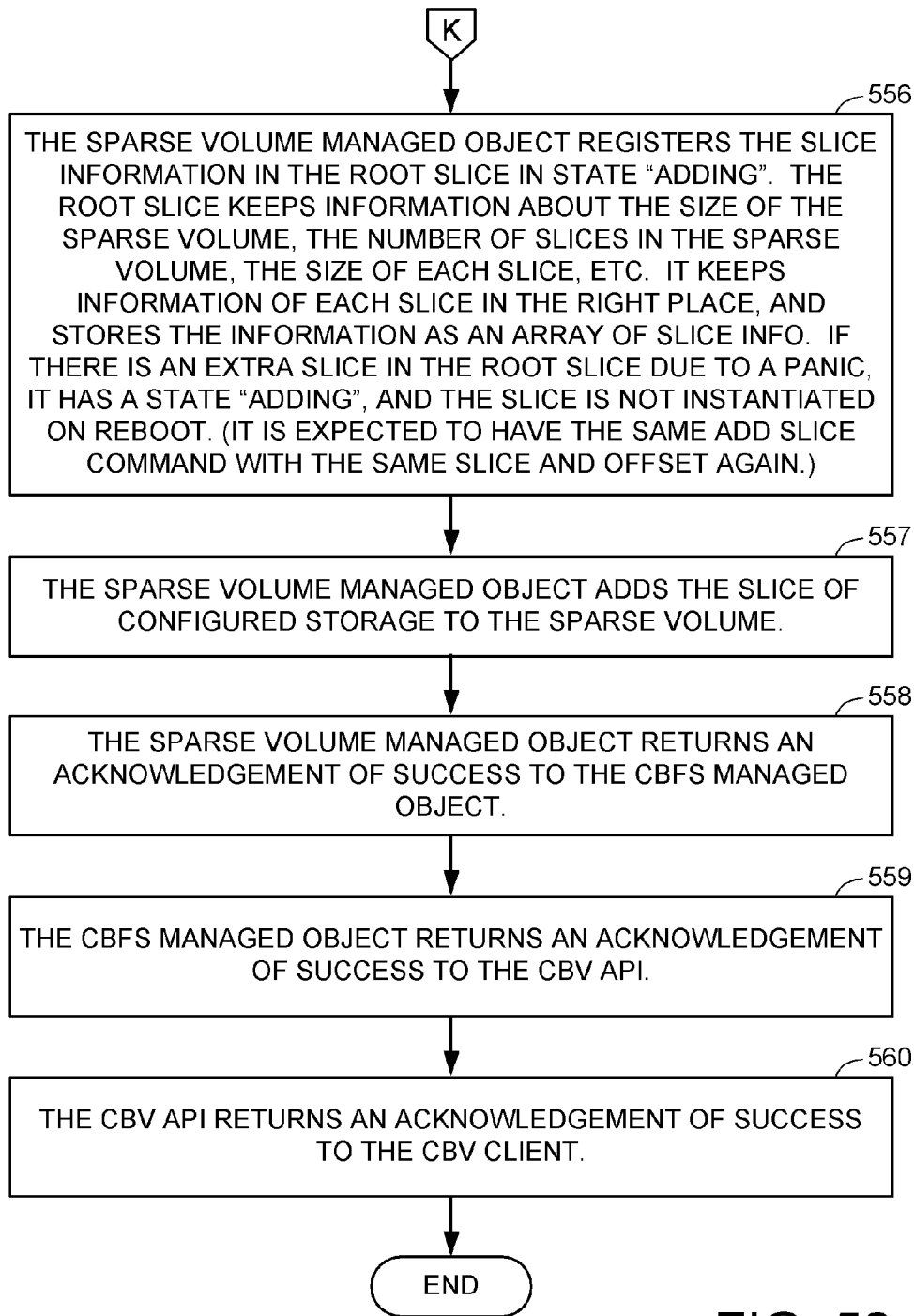

In step 556 of FIG. 52, the sparse volume managed object registers the slice information in the root slice in state "adding." The root slice keeps information about the size of the sparse volume, the number of slices in the sparse volume, the size of each slice, etc. It keeps information of each slice in the right place, and stores the information as an array of slice information. If there is an extra slice in the root slice due to a panic, it has a state "adding," and the slice is not instantiated on reboot. (It is expected to have the same add slice command with the same slice and offset again.) In step 557, the sparse volume managed object adds the slice of configured storage to the sparse volume. In step 558, the sparse volume managed object returns an acknowledgement of success to the CBFS managed object. In step 559, the CBFS managed object returns an acknowledgement of success to the CBV API. In step 560, the CBV API returns an acknowledgement of success to the CBV client. The exchange is finished.

Figure 53:
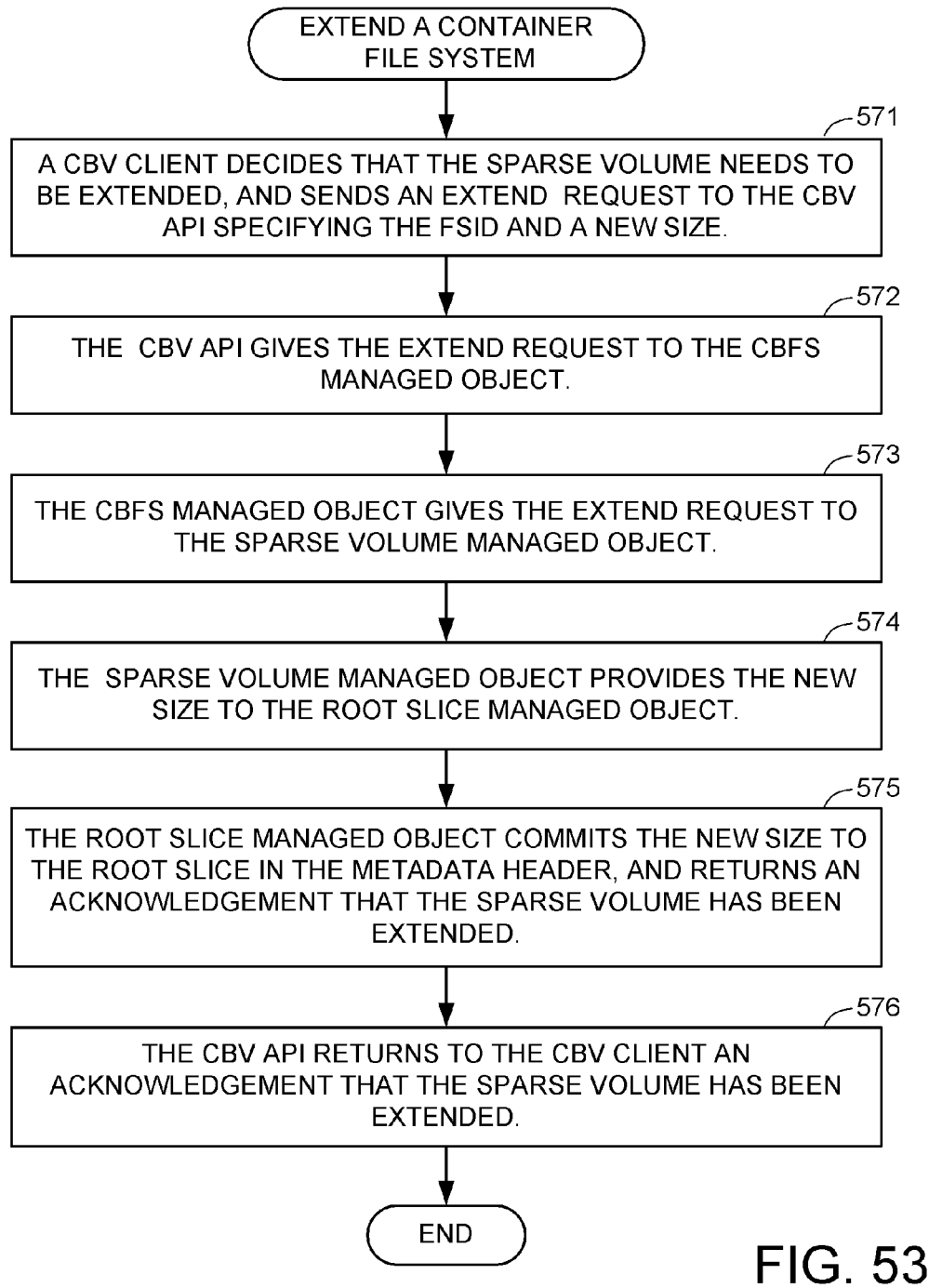
FIG. 53 is a flowchart of an exchange for extending a container file system.

FIG. 53 shows an exchange for extending a container file system. In a first step 571, a CBV client decides that the sparse volume needs to be extended, and sends an extend request to the CBV API specifying the FSID and a new size. In step 572, the CBV API gives the extend request to the CBFS managed object. In step 573, the CBFS managed object gives the extend request to the sparse volume managed object. In step 574, the sparse volume managed object provides the new size to the root slice managed object. In step 575, the root size managed object commits the new size to the root slice in the metadata header, and returns an acknowledgement that the sparse volume has been extended. In step 576, the CBV API returns to the CBV client an acknowledgement that the sparse volume has been extended. The exchange is finished.

Figure 54:
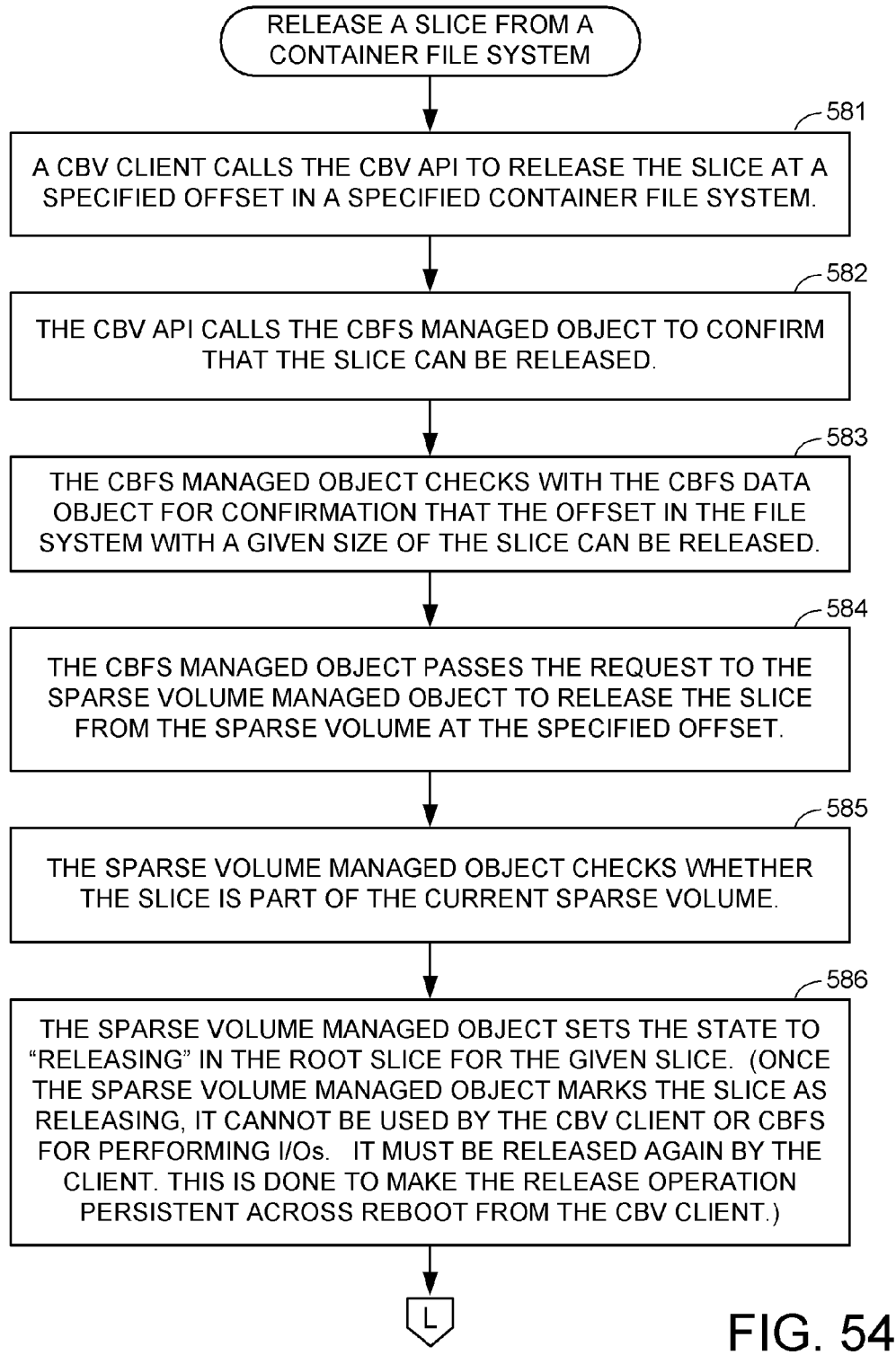
FIGS. 54 and 55 together comprise a flowchart of an exchange for releasing a slice form a container file system.

FIG. 54 shows an exchange for releasing a slice from a container file system. In a first step 581, a CBV client calls the CBV API to release the slice at a specified offset in a specified container file system. In step 582, the CBV API calls the CBFS managed object to confirm that the slice can be released. In step 583, the CBFS managed object checks with the CBFS data object for confirmation that the offset in the file system with a given size of slice can be released. In step 584, the CBFS managed object passes the request to the sparse volume managed object to release the slice from the sparse volume at the specified offset. In step 585, the sparse volume managed object checks whether the slice is part of the current sparse volume. In step 586, the sparse volume managed object sets the state to "releasing" in the root slice for the given slice. (Once the sparse volume managed object marks the slice as releasing, it cannot be used by the CBV client or CBFS for performing I/Os. It must be released again by the client. This is done to make the release operation persistent across reboot from the CBV client.) From step 586, execution continues to step 587 in FIG. 55.

Figure 55:
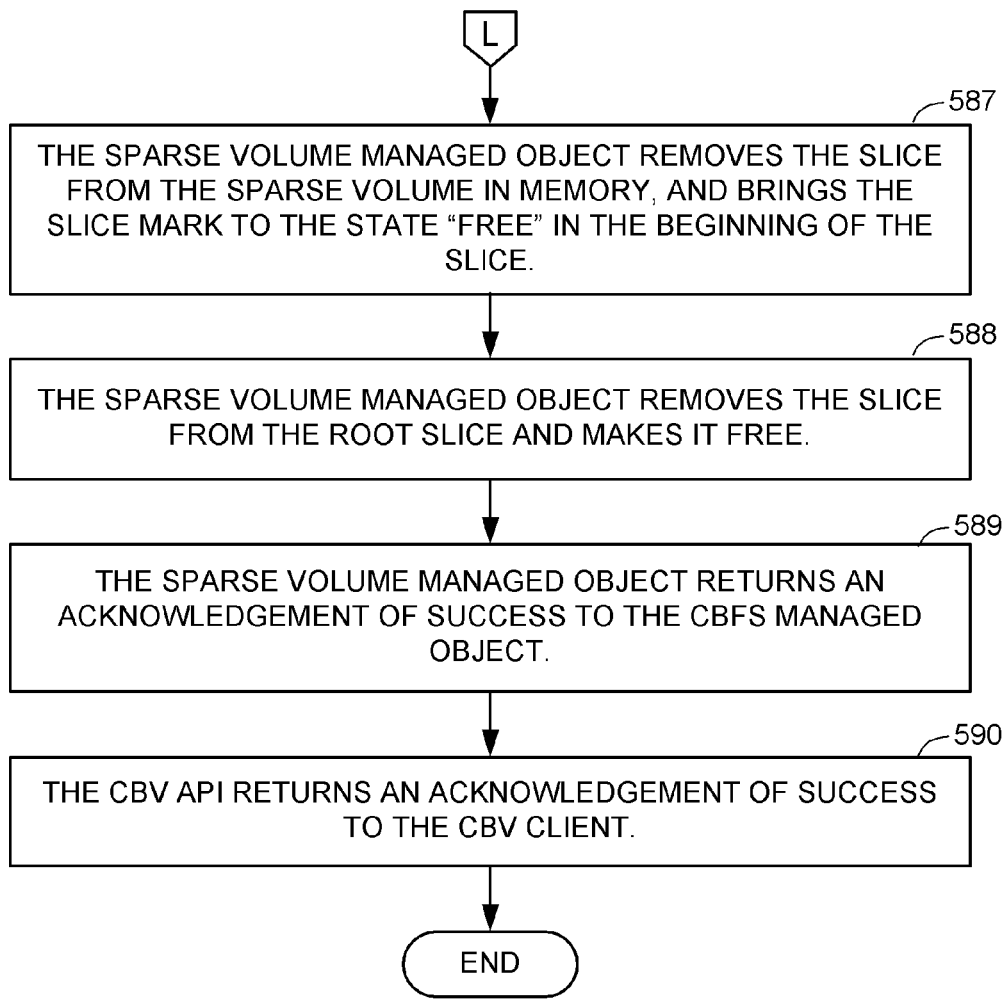

In step 587 of FIG. 55, the sparse volume managed object removes the slice from the sparse volume in memory, and brings the slice mark to the state "free" in the beginning of the slice. In step 588, the sparse volume managed object removes the slice from the root slice and makes it free. In step 589, the sparse volume managed object returns an acknowledgement of success to the CBFS managed object. In step 590, the CBV API returns an acknowledgement of success to eh CBV client. The exchange is finished.

Figure 56:
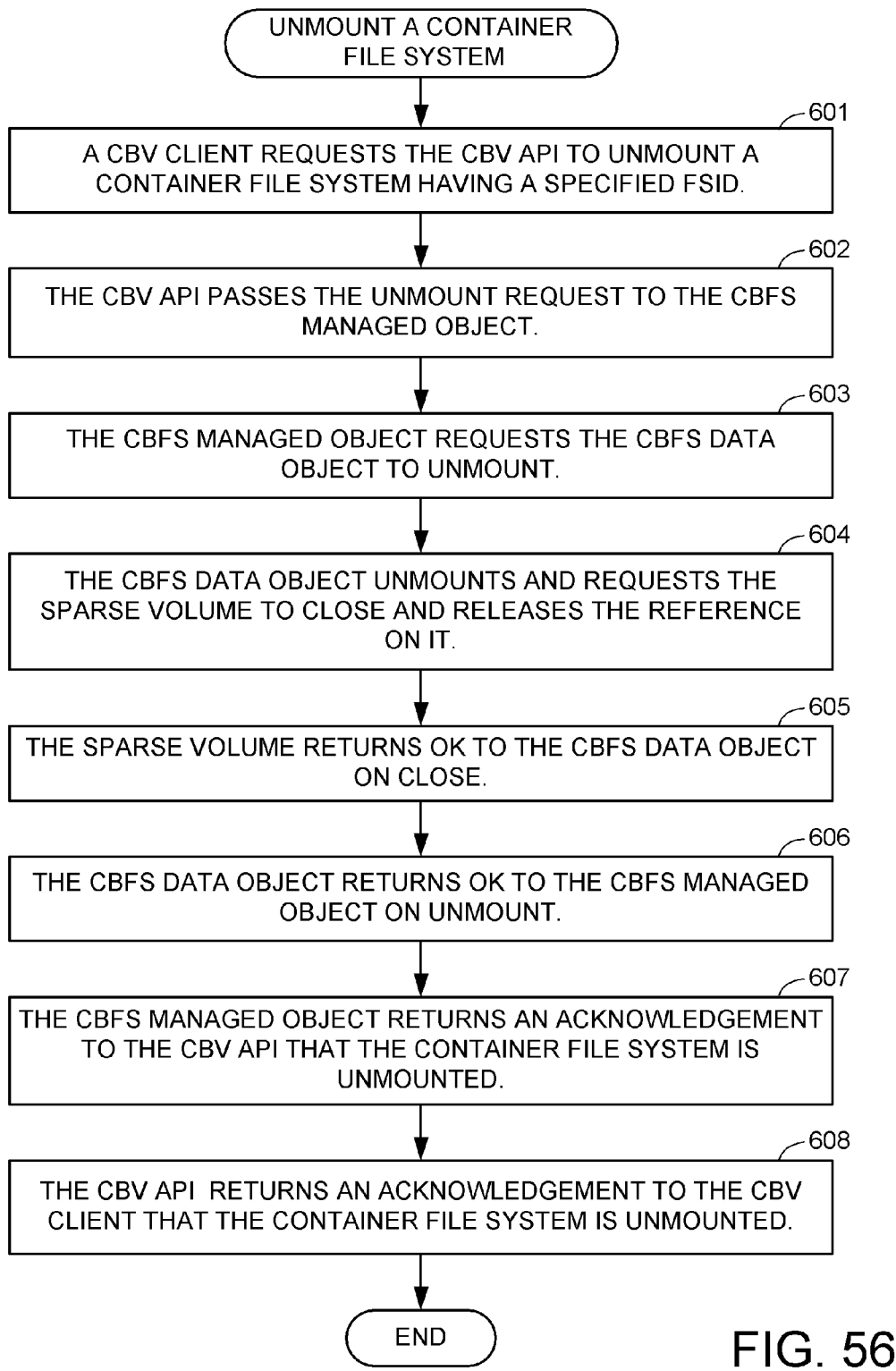
FIG. 56 is a flowchart of an exchange for unmounting a container file system.

FIG. 56 shows an exchange for unmounting a container file system. In a first step 601, a CBV client requests the CBV API to unmount a container file system having a specified FSID. In step 602, the CBV API passes the unmount request to the CBFS managed object. In step 603, the CBFS managed object requests the CBFS data object to unmount. In step 604, the CBFS data object unmounts and requests the sparse volume to close and releases the reference on it. In step 605, the sparse volume returns OK to the CBFS data object on close. In step 606, the CBFS data object returns OK to the CBFS managed object on unmount. In step 607, the CBFS managed object returns an acknowledgement to the CBV API that the container file system is unmounted. In step 608, the CBV API returns an acknowledgement to the CBV client that the container file system is unmounted. The exchange is finished.

Figure 57:
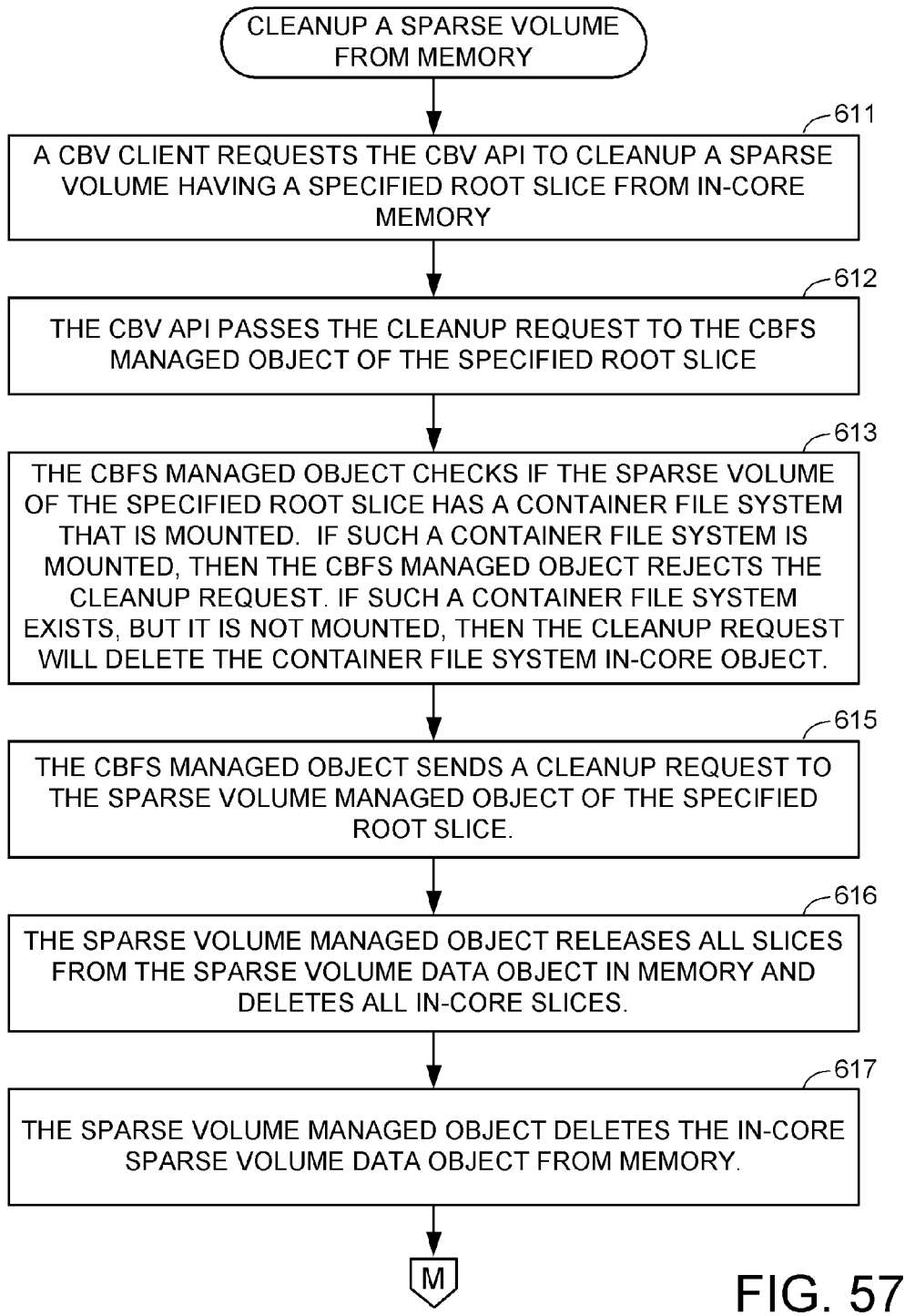
FIGS. 57 and 58 together comprise a flowchart of an exchange for cleanup of a sparse volume from memory.

FIG. 57 shows an exchange for cleanup of a sparse volume from memory. In a first step 611 a CBV client requests the CBV API to cleanup a sparse volume having a specified root slice from in-core memory. In step 612, the CBV API passes the cleanup request to the CBFS managed object of the specified root slice. In step 613, the CBFS managed object checks if the sparse volume of the specified root slice has a container file system that is mounted. If such a container file system is mounted, then the CBFS managed object rejects the cleanup request. If such a container file system exists, but it is not mounted, then the cleanup request will delete the container file system in-core object. In step 615, the CBFS managed object sends a cleanup request to the sparse volume managed object of the specified root slice. In step 616, the sparse volume managed object releases all slices from the sparse volume data object in memory and deletes all in-core slices. In step 617, the sparse volume managed object deletes the in-core sparse volume data object from memory. Execution continues from step 617 to step 618 in FIG. 58.

Figure 58:
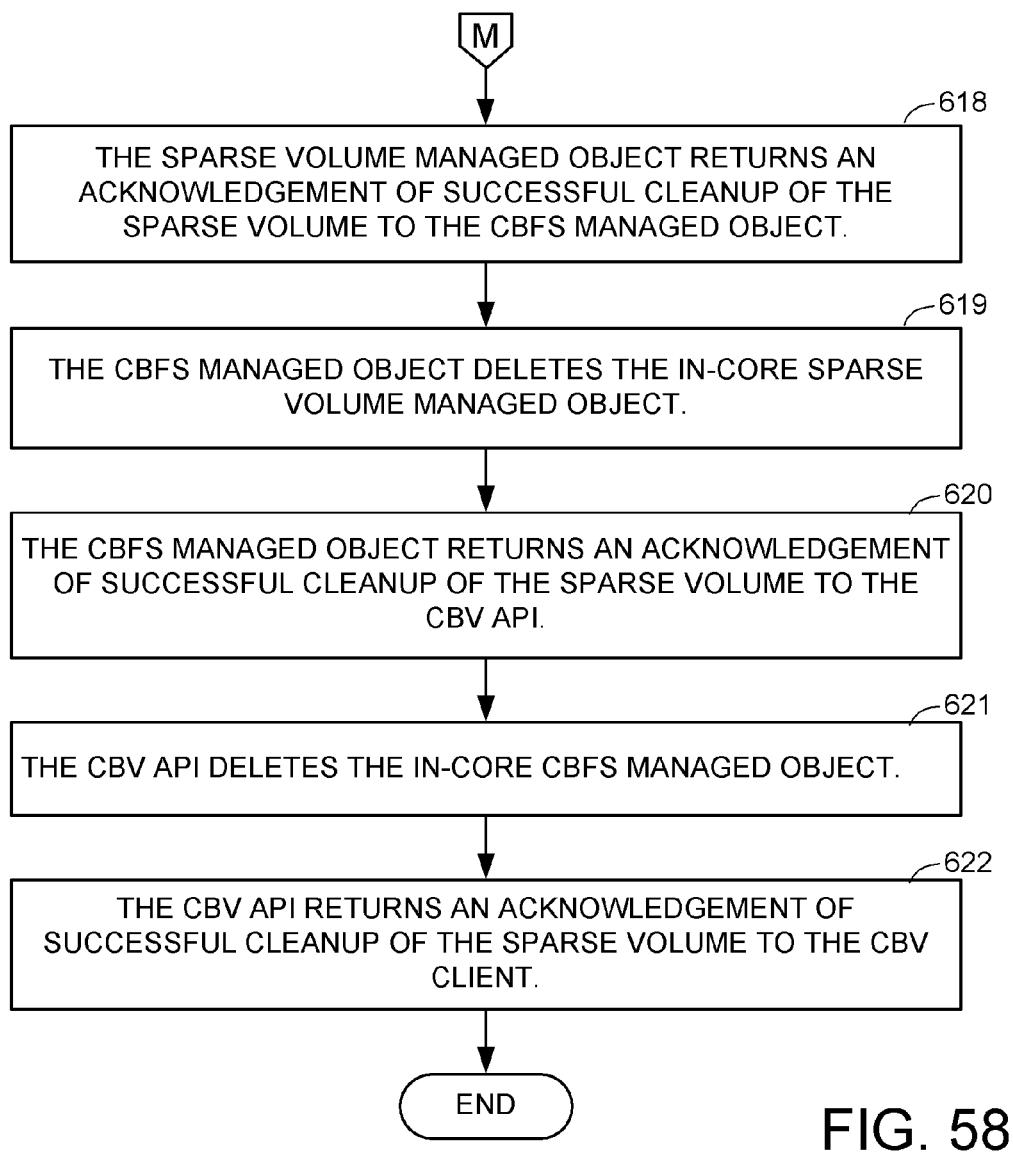

In step 618 of FIG. 58, the sparse volume managed object returns an acknowledgement of successful cleanup of the sparse volume to the CBFS managed object. In step 619, the CBFS managed object deletes the in-core sparse volume managed object. In step 620, the CBFS managed object returns an acknowledgement of successful cleanup of the sparse volume to the CBV API. In step 621, the CBV API deletes the in-core CBFS managed object. In step 622, the CBV API returns an acknowledgement of successful cleanup of the sparse volume to the CBV client. The exchange is finished.

Figure 59:
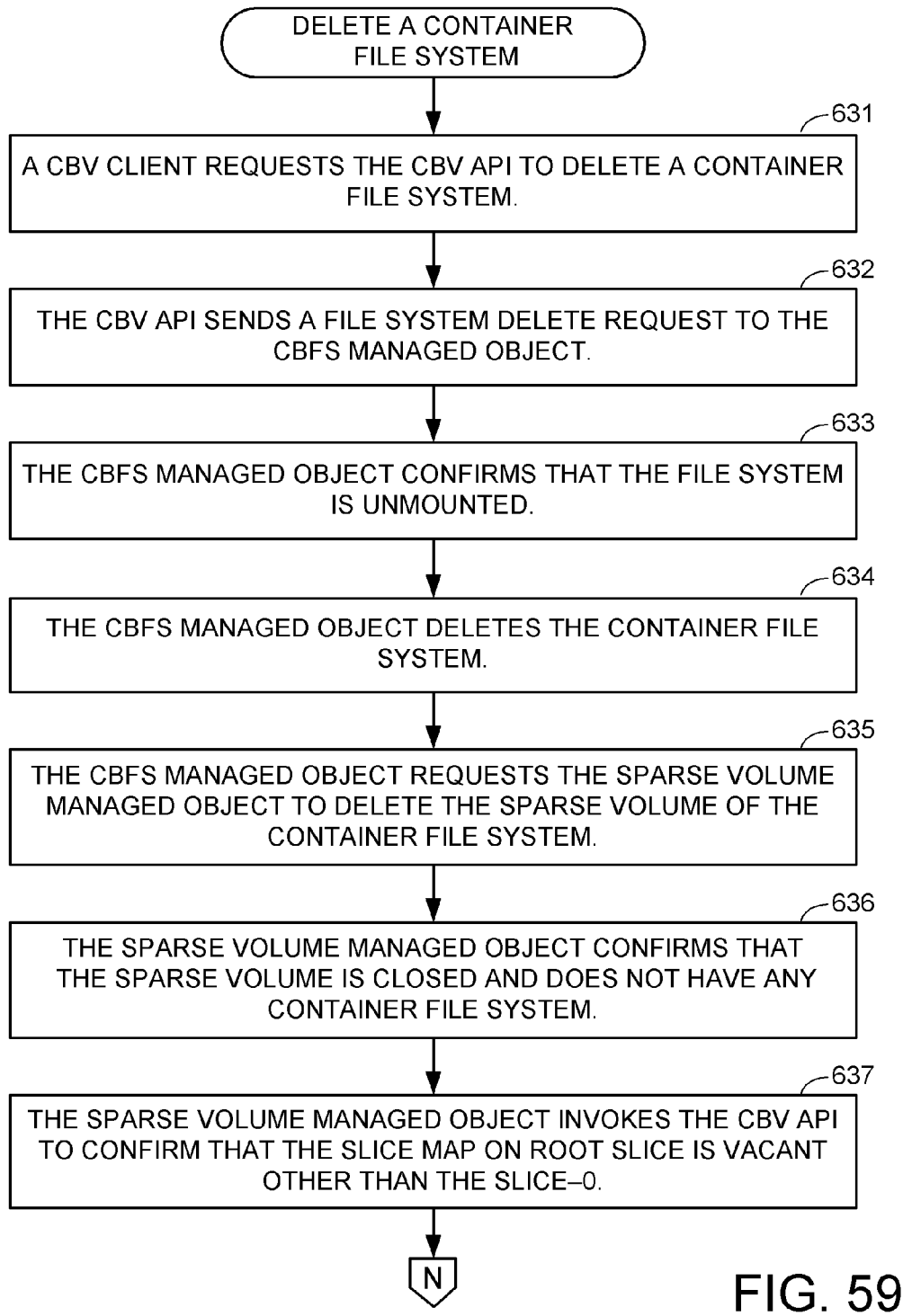
FIGS. 59 and 60 together comprise a flowchart of an exchange for deleting a container file system.

FIG. 59 shows an exchange for deleting a container file system. In a first step 631, a CBV client requests the CBV API to delete a container file system. In step 632, the CBV API sends a file system delete request to the CBFS managed object. In step 633, the CBFS managed object confirms that the file system is unmounted. In step 634, the CBFS managed object deletes the container file system. In step 635, the CBFS managed object requests the sparse volume managed object to delete the sparse volume of the container file system. In step 636, the sparse volume managed object confirms that the sparse volume is closed and does not have any container file system. In step 637, the sparse volume managed object invokes the CBV API to confirm that the slice map on the root slice is vacant other than the slice-0. Execution continues from step 637 to step 638 of FIG. 60.

Figure 60:
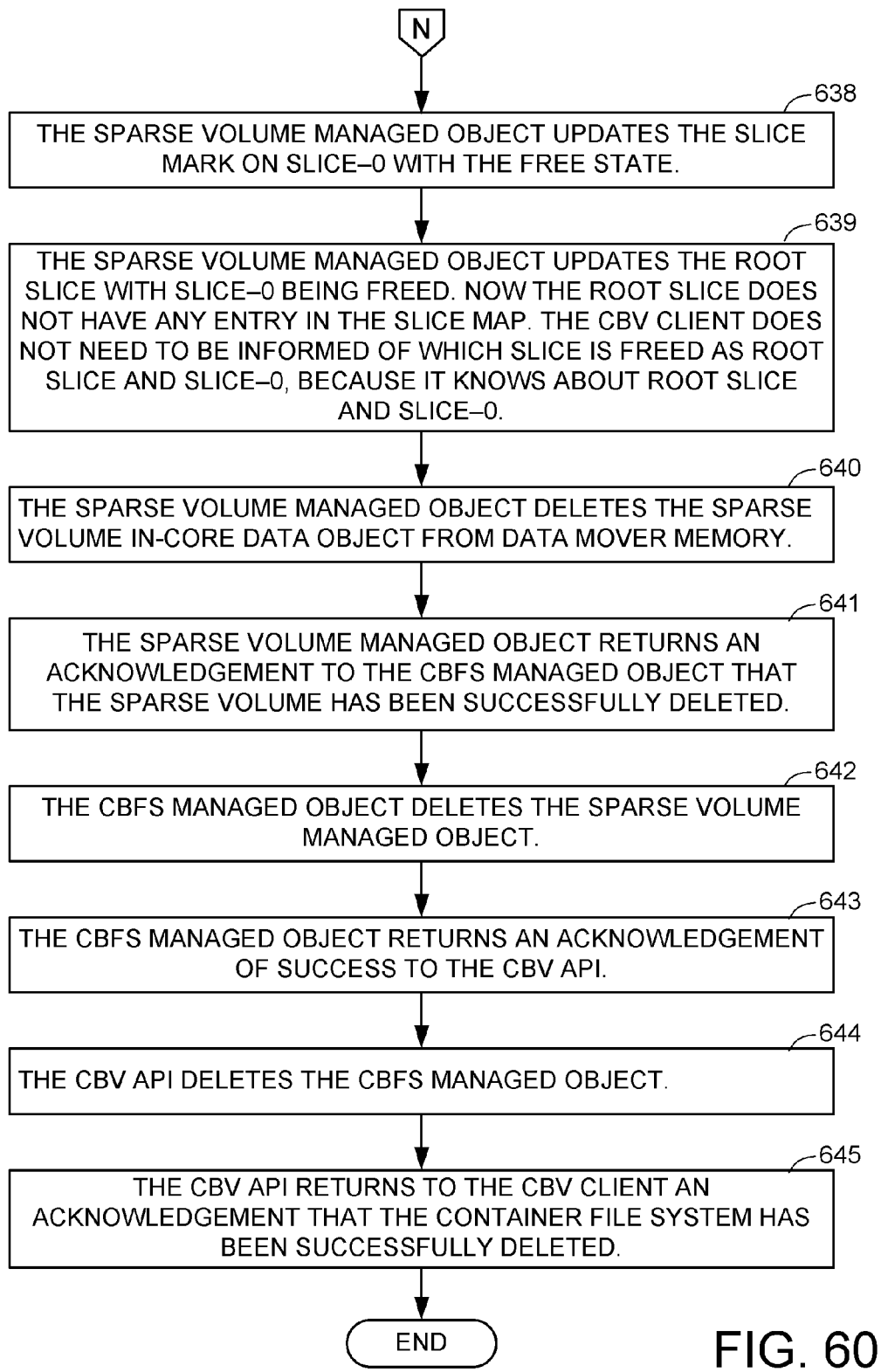

In step 638 of FIG. 60, the sparse volume managed object updates the slice mark on slice-0 with the free state. In step 639, the sparse volume managed object updates the root slice with slice-0 being freed. Now the root slice does not have any entry in the slice map. The CBV client does not need to be informed of which slice is freed as root slice and slice-0, because it knows about root slice and slice-0. In step 640, the sparse volume managed object deletes the sparse volume in-core data object from memory of the data mover. In step 641, the sparse volume managed object returns an acknowledgement to the CBFS managed object that the sparse volume has been successfully deleted. In step 642, the CBFS managed object deletes the sparse volume managed object. In step 643, the CBFS managed object returns an acknowledgement of success to the CBV API. In step 644, the CBV API deletes the CBFS managed object. In step 645, the CBV API returns to the CBV client an acknowledgement that the container file system has been successfully deleted.

Figure 61:
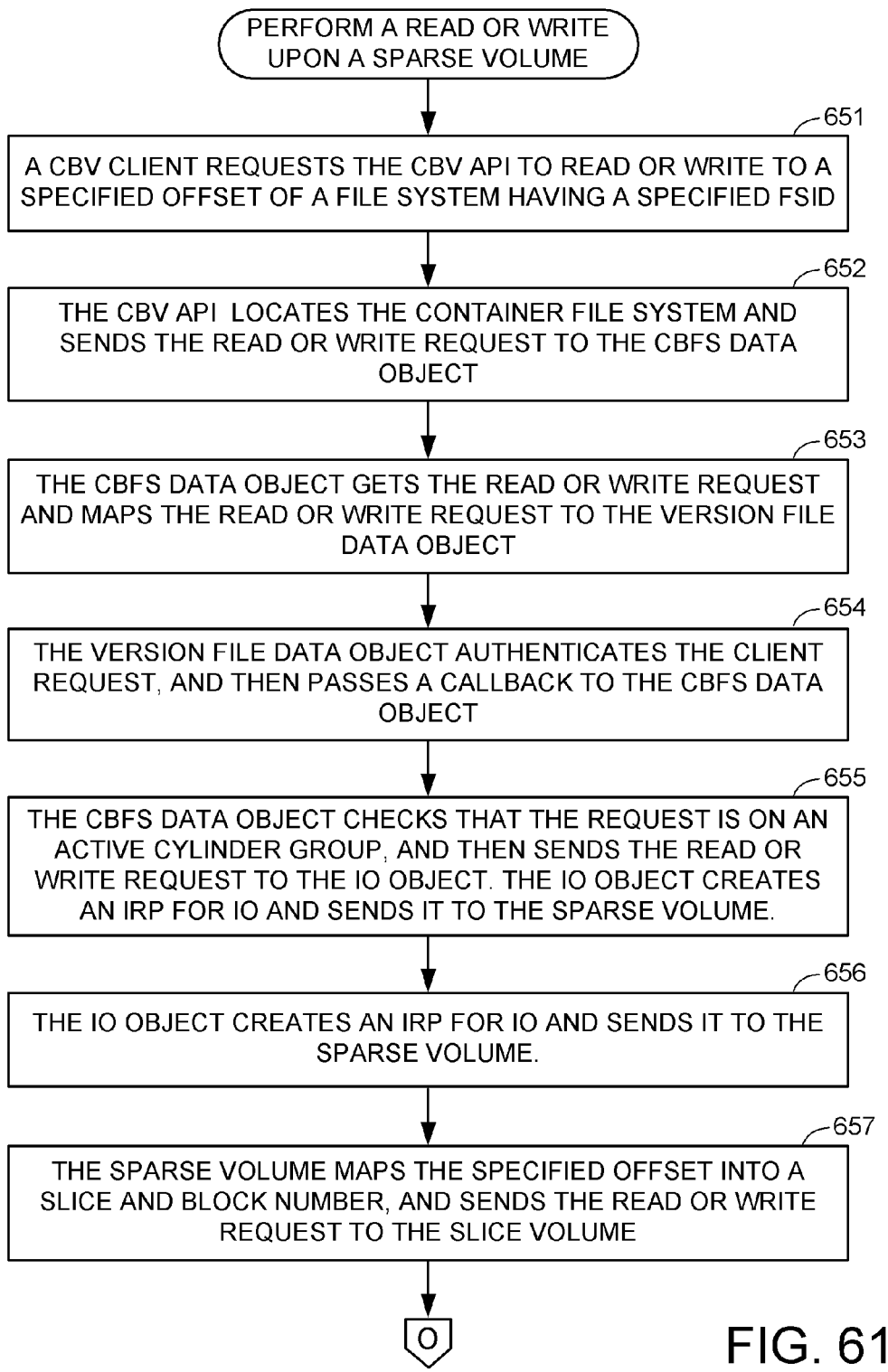
FIGS. 61 and 62 together comprise a flowchart of an exchange for performing a read or write upon a sparse volume.

FIG. 61 shows an exchange for performing a read or write upon a sparse volume. In a first step 651, a CBV client requests the CBV API to read or write to a specified offset of a file system having a specified FSID. In step 652, the CBV API locates the container file system and sends the read or write request to the CBFS data object. In step 653, the CBFS data object gets the read or write request and maps the read or write request to the version file data object. In step 654, the version file data object authenticates the client request, and then passes a callback to the CBFS data object. In step 655, the CBFS data object checks that the request is on an active cylinder group, and then sends the read or write request to the IO object. In step 656, the IO object creates an IRP for IO and sends it to the sparse volume data object. In step 657, the sparse volume data object maps the specified offset into a slice and block number, and sends the read or write request to the slice volume data object. Execution continues from step 657 to step 658 in FIG. 62.

Figure 62:
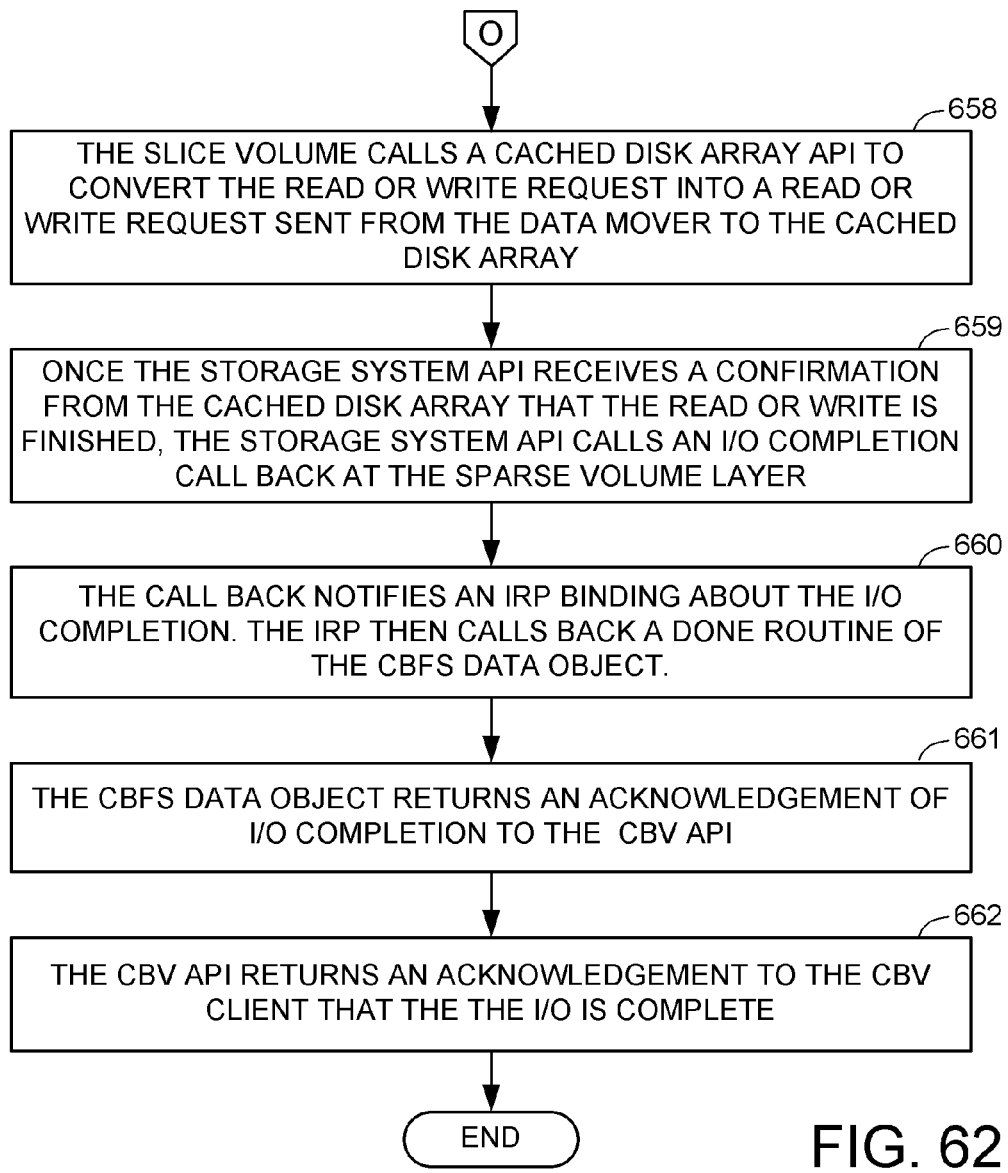

In step 658 of FIG. 62, the slice volume data object calls a cached disk array API to convert the read or write request into a read or write request sent from the data move to the cached disk array. In step 659, once the storage system API receives a confirmation from the cached disk array that the read or write is finished, the storage system API calls an I/O completion call back at the sparse volume layer. In step 660, the call back notifies an IRP binding about the I/O completion. The IRP then calls back a done routine of the CBFS data object. In step 661, the CBFS data object returns an acknowledgment of I/O completion to the CBV API. In step 662, the CBV API returns an acknowledgement to the CBV client that the I/O is complete. The exchange is finished.

Figure 63:
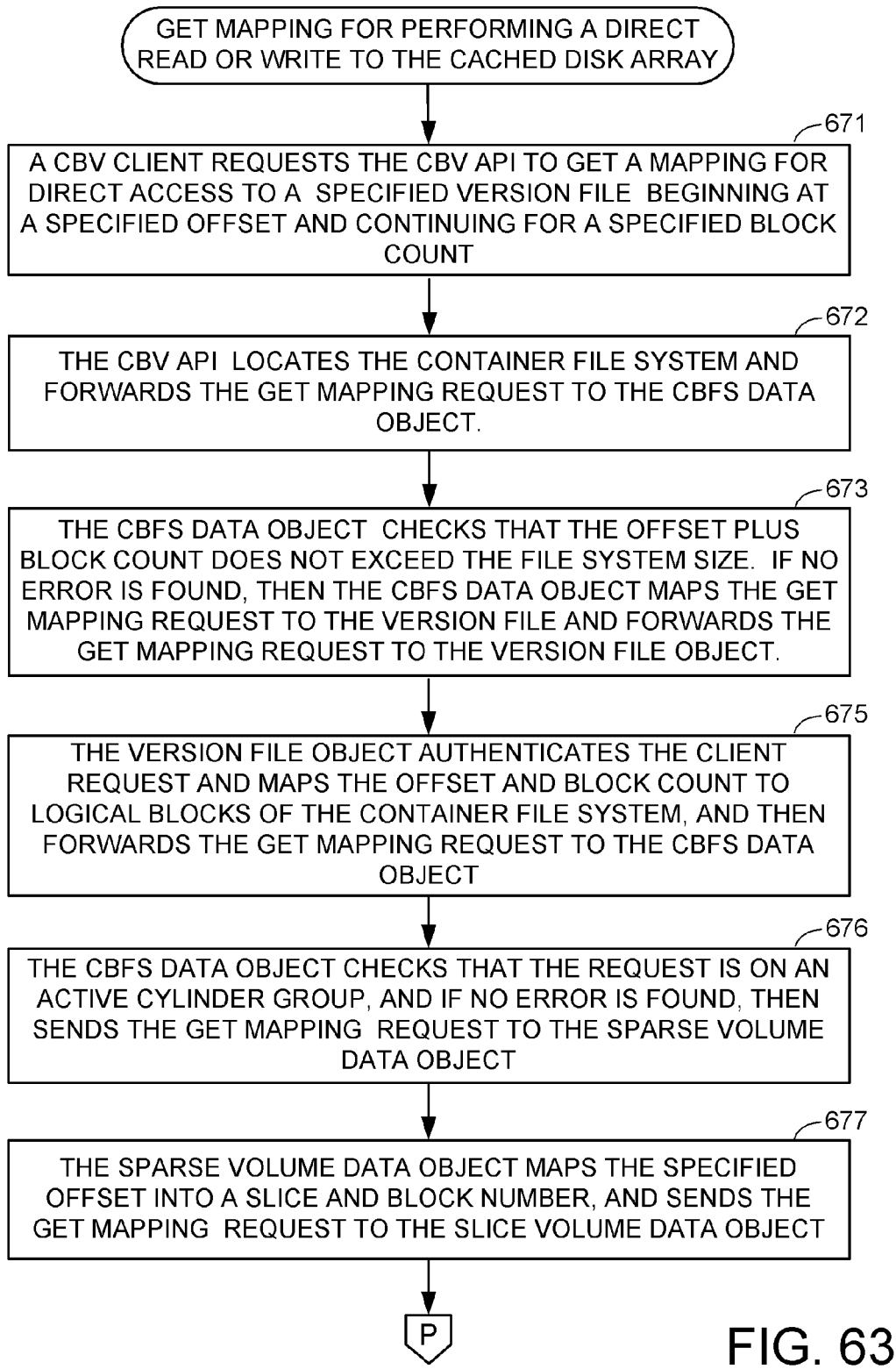
FIGS. 63 and 64 together comprise a flowchart of an exchange for getting mapping information for performing a direct read or write to the cached disk array.

FIG. 63 shows an exchange for getting a mapping for performing a direct read or write to the cached disk array. In a first step 671, a CBV client requests the CBV API to get a mapping for access to a specified version file beginning at a specified offset and continuing for a specified block count. In step 672, the CBV API locates the container file system, and forwards the get mapping request to the CBFS data object. In step 673, the CBFS data object checks that the offset plus block count does not exceed the file system size. If no error is found, then the CBFS data object maps the get mapping request to the version file and forward the get mapping request to the version file object. In step 675, the version file object authenticates the client request and maps the offset and block count to logical blocks of the container file system, and then forwards the get mapping request to the CBFS data object. In step 676, the CBFS data object checks that the request is on an active cylinder group, and if no error is found, then sends the get mapping request to the sparse volume data object. In step 677, the sparse volume data object maps the specified offset into a slice and block number, and sends the get mapping request to the slice volume data object. Execution continues from step 677 to step 678 in FIG. 64.

Figure 64:
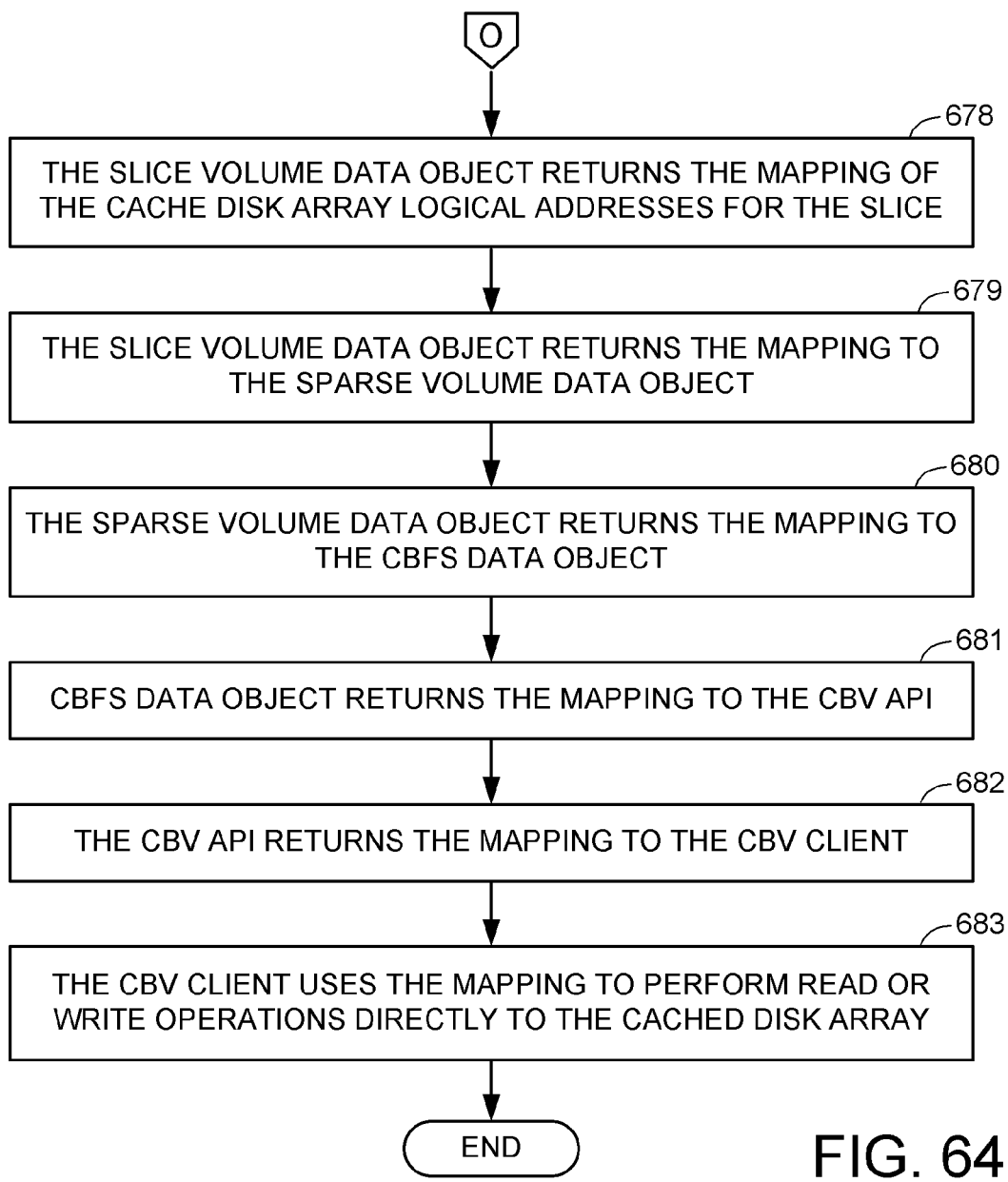

In step 678 of FIG. 64, the slice volume data object returns the mapping of the cache disk array logical addresses for the slice. In step 679, the slice volume data object returns the mapping to the sparse volume data object. In step 680, the sparse volume data object returns the mapping to the CBFS data object. In step 681, the CBFS data object returns the mapping to the CBV API. In step 682, the CBV API returns the mapping to the CBV client. At this point, the exchange is finished. In step 683, the CBV client uses the mapping to perform read or write operations directly to the cached disk array 29. For example, the client 23 in FIG. 1 uses the mapping information to formulate read and write requests sent from the client 23 over the data link 22 to the cached disk array 29.

In view of the above, there has been described a new file server architecture for enhanced decoupling of logical storage from physical storage and for providing common supplementary storage services for iSCSI block access and for NFS or CIFS file system access. Each client storage object such as an iSCSI LUN or a user file system and its snapshots are implicitly organized and managed as files in a container file system for the client storage object. The implicit container organization of the version set provides a consistent storage management paradigm without compromising on flexibility of customizing individual types of client storage objects. The numbers of iSCSI LUNs, user file systems, and snapshots are limited only by the platform configuration. The modularized and file system focused infrastructure makes scalability less complex and considerably reduces software development risks.

The container file system is built upon a sparse metavolume providing on demand, policy-based storage provisioning. A storage reorganizer implements smart allocation to minimize the effect of fragmentation. Storage reorganization at the sparse metavolume level is particularly effective in combination with a file-based snapshot copy mechanism, because this avoids a copy on first write to the production iSCSI LUN or user file system after each snapshot is taken, and storage for the writes to the production iSCSI LUN or user file system is reclaimed and consolidated automatically upon deletion of old snapshot copies. The snapshot copy process is made more instantaneous by including a UFS log in the sparse metavolume, so that there is no need to suspend write access while flushing the UFS log when a snapshot is taken.

The sparse metavolume may include different classes or tiers of storage, and the metavolume is storage class aware in order to monitor aging and migrate aged objects on demand to make storage provisioning more effective. Management overhead is eliminated because there is no need to create multiple file systems to migrate storage objects between different storage classes. The migration of the storage objects between different storage classes is automatic and seamlessly integrated with the thin provisioning of the sparse metavolume.

The container file systems improve data availability by localizing faults to the contained storage objects. The sparse metavolume provides storage for extended block metadata including a redundancy check for each metadata block and an inode number for each block. In a preferred implementation, an offline-computed redundancy check is also provided for data blocks of snapshots. The redundancy checks provide early detection of corruption to initiate proactive recovery in order to reduce the recovery time and reduce the corruption zone. Graceful error recovery facilitates fault isolation and avoids panics. The inode number for each block permits errors to be traced to the faulted objects and reported offline.

What is claimed is:

1. A computer-implemented method of operating a file server, the file server including data storage and a data processor, the data storage storing a logical volume and a file system built on the logical volume, the file system including multiple cylinder groups, each of the cylinder groups including file system blocks, the file system blocks including allocated blocks of the data storage allocated to files in the file system, and free blocks of the data storage that are not allocated to the files in the file system, the logical volume including slices of the data storage, and each of the slices of the data storage storing a number of the cylinder groups, the method comprising the data processor executing computer instructions stored on a non-transitory computer-readable storage medium to perform the steps of:
    (a) selecting one of the slices of the data storage for evacuation; and then
    (b) evacuating the selected one of the slices of the data storage by identifying allocated blocks of the data storage in the selected one the slices of the data storage, and for each of the identified allocated blocks of the data storage in the selected one the slices of the data storage, (1) reverse mapping said each of the identified allocated blocks to identify a file to which said each of the identified allocated blocks is allocated, (2) allocating a new block of the data storage in another one of the slices of the data storage in the logical volume upon which the file system is built, (3) copying data from said each of the identified allocated blocks to the allocated new block of the data storage in another one of the slices of the data storage in the logical volume upon which the file system is built, and (4) in the identified file to which said each of the identified allocated blocks is allocated, substituting the allocated new block of the data storage for said each of the identified allocated blocks.

2. The method as claimed in claim 1, wherein step (a) further includes stopping new allocations of file system blocks from the cylinder groups in the selected one of the slices of data storage; and which further includes changing each cylinder group in the selected one of the slices of data storage from a read-only state to an inactive state once said each cylinder group in the selected one of the slices of data storage is empty of allocated file system blocks.

3. The method as claimed in claim 1, which further includes a step (c) of removing the selected one of the slices of the data storage from the logical volume once the selected one of the slices of the data storage is empty of allocated file system blocks.

4. The method as claimed in claim 1, wherein the logical volume is a sparse metavolume including slices of logical storage, and the method further includes maintaining in the data storage a respective state for each of the slices of logical storage, the respective state for each of the slices of logical storage indicating whether said each of the slices of logical storage is provisioned or not with a respective slice of the data storage, and when said each of the slices of logical storage is provisioned with a respective slice of the data storage, also indicating whether or not said each of the slices of logical storage has been selected for evacuation.

5. The computer-implemented method as claimed in claim 1, wherein the substituting of the allocated new block of the data storage for said each of the identified allocated blocks includes substituting a block number of the allocated new block of the data storage for a block number of said each of the identified allocated blocks in an inode or indirect block of the identified file to which said each of the identified allocated blocks is allocated.

6. The computer-implemented method as claimed in claim 1, which includes:

maintaining per-block metadata in the data storage, the per-block metadata indicating, for each of the allocated blocks of the data storage allocated to files in the file system, a list of the files in the file system to which said each of the allocated blocks of the file system has been allocated, and accessing the per-block metadata during the reverse mapping of said each of the identified allocated blocks to identify the files to which said each of the identified allocated blocks is allocated, and in each of the identified files to which said each of the identified allocated blocks is allocated, substituting the allocated new blocks of the data storage for said each of the identified allocated blocks.

7. The computer-implemented method as claimed in claim 1, which further includes the file server providing read access and write access to the identified file to which said each of the identified allocated blocks is allocated during the step (b) of evacuating the selected one of the slices.

8. The computer-implemented method as claimed in claim 7, which includes blocking client write access to said each of the identified allocated blocks only when data of said each of the identified allocated blocks is being copied from said each of the identified allocated blocks to the allocated new block of the data storage in another one of the slices of the data storage in the logical volume upon which the file system is built.

9. The computer-implemented method as claimed in claim 8, which includes:

setting an indication, in a block number field of the inode or indirect block of the identified file to which said each of the identified allocated blocks is allocated, when data of said each of the identified allocated blocks is being copied from said each of the identified allocated blocks to the allocated new block of the data storage in another one of the slices of the data storage in the logical volume upon which the file system is built, and during client write access to said each of the identified allocated blocks, inspecting the indication, in the block number field of the inode or indirect block of the identified file to which said each of the identified allocated blocks is allocated, in order to block client write access to said each of the identified allocated blocks only when data of said each of the identified allocated blocks is being copied from said each of the identified allocated blocks to the allocated new block of the data storage in another one of the slices of the data storage in the logical volume upon which the file system is built.

10. The method as claimed in claim 1, wherein:

the files in the file system include inodes, and some of the inodes are in the selected one of the slices of the data storage, and the step (b) of evacuating the selected one of the slices of the data storage includes relocating each of the inodes in the selected one of the slices from an original inode number at an original location in the selected one of the slices of the data storage to a new inode number at a new location in the data storage, and recording, in a database in the file server, the new inode number in association with the original inode number, and the method further includes responding to a request to lookup one of the inodes having a specified inode number by indexing the database with the specified inode number to read a new inode number associated with the specified inode number, and then using the new inode number to lookup said one of the inodes having the specified inode number.

11. A file server comprising:

data storage; and a data processor coupled to the data storage for accessing data stored in the data storage;

the data storage storing a logical volume and a file system built on the logical volume, the file system including multiple cylinder groups, each of the cylinder groups including file system blocks, the file system blocks including allocated blocks of the data storage allocated to files in the file system, and free blocks of the data storage that are not allocated to the files in the file system, the logical volume including slices of the data storage, and each of the slices of the data storage storing a number of the cylinder groups; and the data processor having a non-transitory computer-readable storage medium storing computer instructions that, when executed by the data processor, perform the steps of:

(a) selecting one of the slices of the data storage for evacuation; and then (b) evacuating the selected one of the slices of the data storage by identifying allocated blocks of the data storage in the selected one the slices of the data storage, and for each of the identified allocated blocks of the data storage in the selected one the slices of the data storage: (1) reverse mapping said each of the identified allocated blocks to identify a file to which said each of the identified allocated blocks is allocated, (2) allocating a new block of the data storage in another one of the slices of the data storage in the logical volume upon which the file system is built, (3) copying data from said each of the identified allocated blocks to the allocated new block of the data storage in another one of the slices of the data storage in the logical volume upon which the file system is built, and (4) in the identified file to which said each of the identified allocated blocks is allocated, substituting the allocated new block of the data storage for said each of the identified allocated blocks.

12. The file server as claimed in claim 11, wherein step (a) further includes stopping new allocations of file system blocks from the cylinder groups in the selected one of the slices of data storage; and which further includes changing each cylinder group in the selected one of the slices of data storage from a read-only state to an inactive state once said each cylinder group in the selected one of the slices of data storage is empty of allocated file system blocks.

13. The file server as claimed in claim 11, wherein the computer instructions, when executed by the data processor, further perform a step (c) of removing the selected one of the slices of the data storage from the logical volume once the selected one of the slices of the data storage is empty of allocated file system blocks.

14. The file server as claimed in claim 11, wherein the logical volume is a sparse metavolume including slices of logical storage, and wherein the computer instructions, when executed by the data processor, further maintain in the data storage a respective state for each of the slices of logical storage, the respective state for each of the slices of logical storage indicating whether said each of the slices of logical storage is provisioned or not with a respective slice of the data storage, and when said each of the slices of logical storage is provisioned with a respective slice of the data storage, also indicating whether or not said each of the slices of logical storage has been selected for evacuation.

15. The file server as claimed in claim 11, wherein the substituting of the allocated new block of the data storage for said each of the identified allocated blocks includes substituting a block number of the allocated new block of the data storage for a block number of said each of the identified allocated blocks in an inode or indirect block of the identified file to which said each of the identified allocated blocks is allocated.

16. The file server as claimed in claim 11, wherein the computer instructions, when executed by the data processor, further maintain per-block metadata in the data storage, the per-block metadata indicating, for each of the allocated blocks of the data storage allocated to files in the file system, a list of the files in the file system to which said each of the allocated blocks of the file system has been allocated, and access the per-block metadata during the reverse mapping of said each of the identified allocated blocks to identify the files to which said each of the identified allocated blocks is allocated, and in each of the identified files to which said each of the identified allocated blocks is allocated, substitute the allocated new blocks of the data storage for said each of the identified allocated blocks.

17. The file server as claimed in claim 11, wherein the computer instructions, when executed by the data processor, further provide read access and write access to the identified file to which said each of the identified allocated blocks is allocated during the step (b) of evacuating the selected one of the slices.

18. The file server as claimed in claim 17, wherein the computer instructions, when executed by the data processor, further block client write access to said each of the identified allocated blocks only when data of said each of the identified allocated blocks is being copied from said each of the identified allocated blocks to the allocated new block of the data storage in another one of the slices of the data storage in the logical volume upon which the file system is built.

19. The file server as claimed in claim 18, wherein the computer instructions, when executed by the data processor, further set an indication, in a block number field of the inode or indirect block of the identified file to which said each of the identified allocated blocks is allocated, when data of said each of the identified allocated blocks is being copied from said each of the identified allocated blocks to the allocated new block of the data storage in another one of the slices of the data storage in the logical volume upon which the file system is built, and during client write access to said each of the identified allocated blocks, inspect the indication, in the block number field of the inode or indirect block of the identified file to which said each of the identified allocated blocks is allocated, in order to block client write access to said each of the identified allocated blocks only when data of said each of the identified allocated blocks is being copied from said each of the identified allocated blocks to the allocated new block of the data storage in another one of the slices of the data storage in the logical volume upon which the file system is built.

20. The file server as claimed in claim 11, wherein:
the files in the file system include inodes, and some of the inodes are in the selected one of the slices of the data storage, and
the step (b) of evacuating the selected one of the slices of the data storage includes relocating each of the inodes in the selected one of the slices from an original inode number at an original location in the selected one of the slices of the data storage to a new inode number at a new location in the data storage, and recording, in a database in the file server, the new inode number in association with the original inode number, and
the computer instructions, when executed by the data processor, further respond to a request to lookup one of the inodes having a specified inode number by indexing the database with the specified inode number to read a new inode number associated with the specified inode number, and then using the new inode number to lookup said one of the inodes having the specified inode number.

* * * * *